(12) United States Patent
Takahashi et al.

(10) Patent No.: US 9,105,076 B2
(45) Date of Patent: Aug. 11, 2015

(54) IMAGE PROCESSING APPARATUS, IMAGE PROCESSING METHOD, AND PROGRAM

(75) Inventors: Yoshitomo Takahashi, Kanagawa (JP); Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 14/002,185

(22) PCT Filed: Feb. 28, 2012

(86) PCT No.: PCT/JP2012/054856
§ 371 (c)(1),
(2), (4) Date: Aug. 29, 2013

(87) PCT Pub. No.: WO2012/121052
PCT Pub. Date: Sep. 13, 2012

(65) Prior Publication Data
US 2013/0336589 A1    Dec. 19, 2013

(30) Foreign Application Priority Data

Mar. 8, 2011    (JP) ................................. 2011-050583

(51) Int. Cl.
*G06K 9/62*    (2006.01)
*G06T 9/00*    (2006.01)
*G06T 3/40*    (2006.01)
*H04N 13/00*   (2006.01)

(52) U.S. Cl.
CPC ................. *G06T 9/00* (2013.01); *G06T 3/4007* (2013.01); *H04N 2013/0081* (2013.01)

(58) Field of Classification Search
None
See application file for complete search history.

(56) References Cited

U.S. PATENT DOCUMENTS

2010/0220791 A1*  9/2010  Lin et al. ............... 375/240.16
2011/0255592 A1* 10/2011  Sung et al. ............. 375/240.02

FOREIGN PATENT DOCUMENTS

| JP | 2010-520697 A | 6/2010 |
| JP | 2010-157822 A | 7/2010 |
| JP | 2010-524381 A | 7/2010 |
| WO | WO 2009/091383 A2 | 7/2009 |

OTHER PUBLICATIONS

Jin Young Lee, "A Novel Approach for Efficient Multi-View Depth Map Coding", 28th Picture Coding Symposium, PCS2010, Dec. 8-10, 2010, pp. 302-305.

* cited by examiner

*Primary Examiner* — Daniel Mariam
(74) *Attorney, Agent, or Firm* — Sony Corporation

(57) ABSTRACT

The present technology relates to an image processing apparatus, an image processing method, and a program capable of improving the image quality of decoded images of images from multiple viewpoints. A warping unit 461 warps a picture of an image of a viewpoint #1 between the image of the viewpoint #1 and an image of a viewpoint #2 different of the viewpoint #1 to generate a picture of a warped image obtained by converting the picture of the image of the viewpoint #1 into an image obtainable in the viewpoint #2. A disparity prediction unit 463 acquires, from header information, a reference index indicating a reference picture that is referred to generate a predicted image of an object block to be decoded of a picture of the image of the viewpoint #2, and selects the reference picture from among reference picture candidates including at least the picture of the warped image based on the reference index. The present technology is applicable, for example, to coding and decoding of images from multiple viewpoints.

18 Claims, 41 Drawing Sheets

IMAGE PROCESSING APPARATUS, IMAGE PROCESSING METHOD, AND PROGRAM

TECHNICAL FIELD

The present technology relates to an image processing apparatus, an image processing method, and a program, and relates to an image processing apparatus, an image processing method, and a program capable of improving image quality of decoded images of images from multiple viewpoints.

BACKGROUND ART

As a coding scheme of coding images from multiple viewpoints such as three dimensional (3D) images, there is a multi-view video coding (MVC) scheme that extends an advanced video coding (AVC) (H.264/AVC) scheme, for example.

In the MVC scheme, an image to be coded is a color image having a value corresponding to light from an object as a pixel value, and each of color images from multiple viewpoints is coded with reference to the color image of the viewpoint as well as color images from other viewpoints.

That is, in the MVC scheme, among the color images from multiple viewpoints, a color image from one viewpoint serves as an image of a base view and color images from other viewpoints serve as images of dependent views.

The base view image (color image) is coded with reference to only the image of the base view, and a dependent view image (color image) is decoded with reference to the image of the dependent view as well as the images of other dependent views, as necessary.

By the way, in recent years, standards such as MPEG3DV scheme have been established as a scheme that employs a disparity information image (depth image) including, as the images from multiple viewpoints, disparity information related to a disparity of each pixel of a color image from each viewpoint as a pixel value, other than the color image of the viewpoint, and codes the color image from each viewpoint and the disparity information image of the viewpoint.

In the MPEG3DV scheme, the color image from each viewpoint and the disparity information image from each viewpoint are respectively coded in principle, similarly to the MVC scheme. As to the disparity information image, various coding methods have been proposed for the purpose of improving coding efficiency and the like, (for example, see Non-Patent Document 1).

CITATION LIST

Non-Patent Document

Non-Patent Document 1: Jin Young Lee, Hochen Wey, and Du-Sik Park, "A NOVEL APPROACH FOR EFFICIENT MULTI-VIEW DEPTH MAP CODING", 28th Picture Coding Symposium, PCS2010, Dec. 8-10, 2010, Nagoya, Japan

SUMMARY OF THE INVENTION

Problems to be Solved by the Invention

A proposal of a coding method (and a decoding method) in consideration of improvement of the image quality of decoded images has been asked in addition to the improvement of the coding efficiency as to the color images from multiple viewpoints and the disparity information images from multiple viewpoints as the images from multiple viewpoints.

The present technology has been made in view of the foregoing, and improves the image quality of decoded images of the images from multiple viewpoints.

Solutions to Problems

An image processing apparatus or a program according to a first aspect of the present technology is an image processing apparatus including: a warping unit configured to warp, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint; and a reference picture selection unit configured to acquire a reference index indicating a reference picture to be referred to generate a predicted image of an object block to be decoded of a picture of the image of the second viewpoint, and to select the reference picture from reference picture candidates including at least the picture of the warped image based on the reference index, or a program for causing a computer to function as an image processing apparatus.

An image processing method according to the first aspect of the present technology is an image processing method including the steps of: warping, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint; and acquiring a reference index indicating a reference picture to be referred to generate a predicted image of an object block to be decoded of a picture of the image of the second viewpoint, and selecting the reference picture from reference picture candidates including at least the picture of the warped image based on the reference index.

In the first aspect as described above, between an image of a first viewpoint and an image of a second viewpoint different from the first viewpoint, a picture of the image of the first viewpoint is warped to generate a picture of an warped image obtained by converting the picture of the image of the first viewpoint into an image obtainable in the second viewpoint. Then, a reference index that indicates a reference picture to be referred to generate a predicted image of an object block to be decoded of a picture of the image of the second viewpoint is acquired, and the reference picture is selected from reference picture candidates including at least the picture of the warped image based on the reference index.

An image processing apparatus or a program according to a second aspect of the present technology is an image processing apparatus including: a warping unit configured to warp, between an image of a first viewpoint and an image of a second viewpoint different from the first viewpoint, a picture of the image from the first viewpoint to generate a picture of an warped image obtained by converting the picture of the image of the first viewpoint into an image obtainable in the second viewpoint; a cost calculation unit configured to calculate, for each of reference picture candidates referred to generate a predicted image of an object block to be coded of a picture of the image of the second viewpoint and including at least the picture of the warped image, a coding cost required for coding the object block; and a selection unit configured to select and output a reference index allocated to a reference picture candidate to be used for coding the object block from among reference indexes respectively allocated to the reference picture candidates based on the coding cost, or a program for causing a computer to function as an image processing apparatus.

An image processing method according to the second aspect of the present technology is an image processing method including the steps of: warping, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint; calculating, for each of reference picture candidates referred to generate a predicted image of an object block to be coded of a picture of the image of the second viewpoint and including at least the picture of the warped image, a coding cost required for coding the object block; and selecting and outputting a reference index allocated to a reference picture candidate to be used for coding the object block from among reference indexes respectively allocated to the reference picture candidates based on the coding cost.

In the second aspect as described above, between an image of a first viewpoint and an image of a second viewpoint different from the first viewpoint, a picture of the image of the first viewpoint is warped to generate a picture of an warped image obtained by converting the picture of the image of the first viewpoint into an image obtainable in the second viewpoint. Further, a coding cost required for coding the object block is calculated, for each of reference picture candidates referred to generate a predicted image of an object block to be coded of a picture of the image of the second viewpoint, and including at least the picture of the warped image. Further, a reference index allocated to a reference picture candidate to be used for coding the object block is selected from among reference indexes respectively allocated to the reference picture candidates based on the coding cost, and the reference index is output.

Note that the image processing apparatus may be an independent apparatus, or may be internal blocks that configure one apparatus.

In addition, the program can be provided by being transmitted through a transmission medium or by being recoded on a recording medium.

Effects of the Invention

According to the present technology, the image quality of decoded images can be improved.

MODE FOR CARRYING OUT THE INVENTION

[Description of a Depth Image (Disparity Information Image) in the Present Specification]

Figure 38:
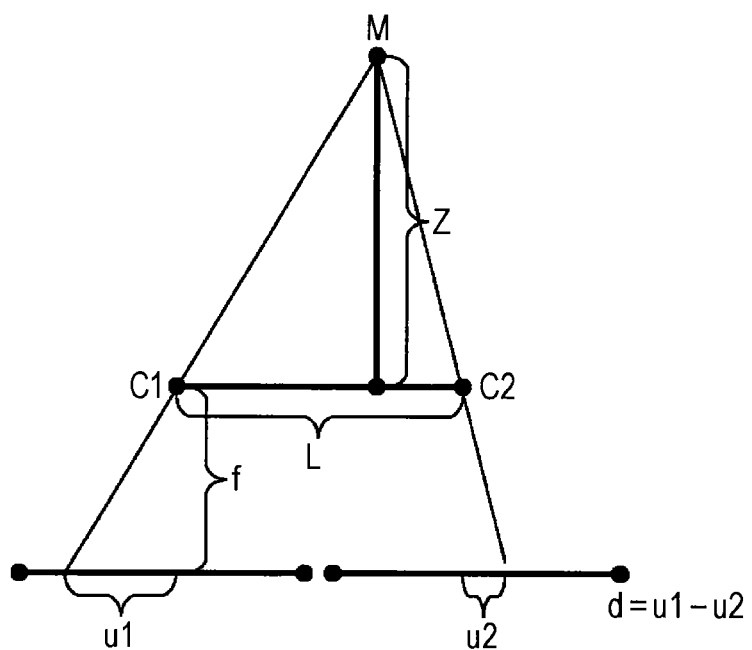
FIG. 38 is a diagram describing a disparity and a depth.

FIG. 38 is a diagram describing a disparity and a depth.

As illustrated in FIG. 38, when a color image of an object M is taken with a camera c1 arranged at a position C1 and a camera c2 arranged at a position C2, a depth Z that is a distance of the object M from the camera c1 (camera c2) is defined by the following expression (a).

$$Z = (L/d) \times f \qquad (a)$$

Note that L represents a distance between the position C1 and the position C2 in the horizontal direction (hereinafter, referred to as a distance between cameras). Further, d represents a value obtained by subtracting a distance u2 between the position of the object M on the color image taken with the camera c2 and the center of the color image in the horizontal direction from a distance u1 between the position of the object M on the color image taken with the camera c1 and the center of the color image in the horizontal direction, that is, a disparity. Further, f is a focal length of the camera c1, and the focal lengths of the camera c1 and of the camera c2 are the same in the expression (a).

As illustrated in the expression (a), the disparity d and the depth Z are uniquely convertable. Therefore, an image expressing the disparity d and an image expressing the depth Z of the color images from the two viewpoints taken by the camera c1 and by the camera c2 are collectively referred to as a depth image (disparity information image) in the present specification.

Note that the depth image (disparity information image) may just be an image that expresses the disparity d or the depth Z, and as the pixel value of the depth image (disparity information image), a normalized value of the disparity d, a normalized value of the reciprocal 1/Z of the depth Z, and the like can be employed instead of the disparity d or the depth Z itself.

A value I obtained by normalizing the disparity d in 8 bits (0 to 255) can be obtained by the following expression (b).

Note that the bit number of normalization of the disparity d is not limited to 8 bits, and other bit numbers such as 10 bits and 12 bits are applicable.

[Mathematical Formula 4]

$$I = \frac{255 \times (d - D_{min})}{D_{max} - D_{min}} \qquad (b)$$

Note that, in the expression (b), $D_{max}$ represents a maximum value of the disparity d and $D_{min}$ represents a minimum value of the disparity d. The maximum value $D_{max}$ and the minimum value $D_{min}$ may be set in a unit of one screen or may be set in a unit of a plurality of screens.

Further, a value y obtained by normalizing the reciprocal 1/Z of the depth Z in 8 bits (0 to 255) can be obtained by the following expression (c). Note that the bit number of normalization of the reciprocal 1/Z of the depth Z is not limited to 8 bits, and other bit numbers such as 10 bits and 12 bits are applicable.

[Mathematical Formula 5]

$$y = 255 \times \frac{\frac{1}{Z} - \frac{1}{Z_{far}}}{\frac{1}{Z_{near}} - \frac{1}{Z_{far}}} \qquad (c)$$

Note that, in the expression (c), $Z_{far}$ represents a maximum value of the depth Z and $Z_{near}$ represents a minimum value of the depth Z. The maximum value $Z_{far}$ and the minimum value $Z_{near}$ may be set in a unit of one screen or in a unit of a plurality of screens.

In this way, in the present specification, in consideration of the fact that the disparity d and the depth Z are uniquely convertable, an image having the value I that is obtained by normalizing the disparity d, as the pixel value, and an image having the value y that is obtained by normalizing the reciprocal 1/Z of the depth Z, as the pixel value, are collectively referred to as a depth image (disparity information image). Here, a color format of the depth image (disparity information image) is YUV420 or YUV400. However, other color formats are applicable.

Note that, when focusing on the value I or the value y itself rather than the pixel value of the depth image (disparity information image), the value I or the value y is recognized as the depth information (disparity information). Further, a mapped value I or value y is referred to as a depth map.

Hereinafter, one embodiment of the present technology will be described with reference to the drawings. Before that, as preparation prior to the description, regarding a method of coding viewpoint information image from multiple viewpoints, an example of a coding method that has already been proposed will be described.

[An Example of a Method of Coding Viewpoint Information Images from Multiple Viewpoints]

Figure 1:
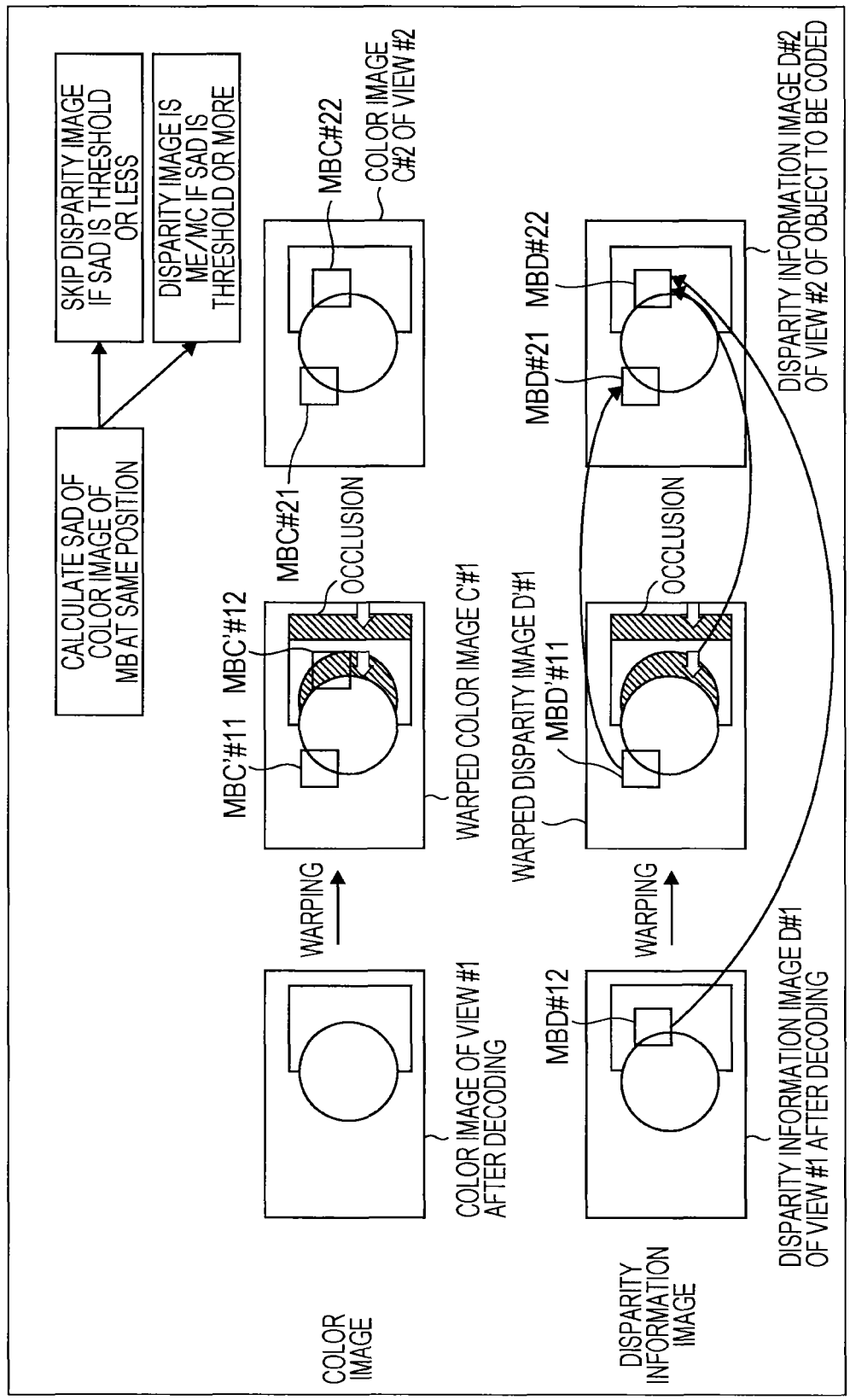
FIG. 1 is a diagram describing an example of a method of coding a viewpoint information image.

FIG. 1 is a diagram describing an example of a method of coding a viewpoint information image disclosed in Non-Patent Document 1.

Here, the coding method that has already been proposed is also referred to as already proposed method. The viewpoint is also referred to as a view.

Here, as the images from multiple viewpoints, there are a color image C#1 of a view #1 and a color image C#2 of view

2 that are color images from (different) two viewpoints (views), and a disparity information image D#1 of a view #1 and a disparity information image D#2 of a view #2 that are disparity information images from two viewpoints.

Note that a disparity information image D#i (here, i=1 or 2) is an image having disparity information related to a disparity of each pixel of a color image C#i as a pixel value.

In the already proposed method, the color images C#1 and C#2 are coded by the MVC scheme, for example. Therefore, pictures of the color images C#1 and C#2 are subjected to prediction coding with reference to other pictures, as necessary. Therefore, after the coding, the pictures are locally decoded in order to generate predicted images used for the prediction coding.

Assume that a block (macroblock) having a t-th picture having the disparity information image D#2 of the view #2 is an object block to be coded.

Here, a picture having an object block, that is, a picture to be coded is also referred to as an object picture.

When a block MBD#21, MBD#22, or the like is coded as the object block, which is a macroblock of the t-th picture (t-th picture from the top) of the disparity information image D#2 of the view #2, in the already proposed method, an already (coded and) locally decoded t-th picture of the color image C#1 of the view #1 that is different from the view #2 is warped to generate a picture of a warped color image C'#1 that is obtained by converting the t-th picture of the color image C#1 into an image obtainable in the view #2.

Similarly, as to the disparity information image D#1 of the view #1, an already locally decoded t-th picture is warped to generate a picture of a warped disparity information image (warped depth image) D'#1 obtained by converting the t-th picture of the disparity information image D#1 into an image obtainable in the viewpoint #2.

Here, in warping of the color image C#1 of the view #1, for example, the warped color image C'#1 is generated by each pixel (value) of the color image C#1 being moved by an amount corresponding to a disparity between the viewpoints #1 and #2 in each pixel, as indicated by the outline arrows on the shaded background in FIG. 1.

By the way, in the color image C#1 of the viewpoint #1 and the color image C#2 of the viewpoint #2, there is a portion that is seen on the color image #2 but is not seen on the color image #1 (or a portion that is seen on the color image #1 but is not seen on the color image #2).

Therefore, only moving each pixel of the color image C#1 by the amount corresponding to a disparity between the viewpoints #1 and #2 in each pixel causes occlusion.

That is, in the warped color image C'#1, a portion that is seen on the color image #2 but is not seen on the color image #1 is a sort of an occlusion portion with a hole and having no pixel value. In FIG. 1, the shaded portions indicate the occlusion portion.

For example, a portion that can be seen from the viewpoint #2 but is hidden by the foreground from the viewpoint #1 due to the disparity is the occlusion portion.

In the warped color image C'#1, pixels of the occlusion portion are interpolated by the pixel values of surrounding pixels, that is, for example, pixels closest to the occlusion portion in the opposite direction to the moving direction in warping.

The same applies to the warped disparity information image D'#1.

In the already proposed method, the block MBC#21 of the t-th picture of the color image C#2 of the view #2 at the same position (and having the same size) as the block MBD#21 and is the object block of the t-th picture of the disparity information image D#2 of the view #2 is detected.

Further, a block MBC'#11 of a picture (t-th picture) of the warped color image C'#1 at the same position as the block MBC#21 is detected, and a value corresponding to a residual of the block MBC#21 of the color image C#2 with respect to the block MBC'#11 of the warped color image C'#1, for example, a sum of absolute differences (SAD) is obtained.

Then, when the SAD between the block MBC#21 and the MBC' #11 is a predetermined threshold or less, the block MBD#21 that is the object block of the disparity information image D#2 is coded as a skip macroblock with respect to the warped disparity information image D'#1.

Therefore, in this case, in decoding the block MBD#21 of the disparity information image D#2, a block MBD'#11 (a copy thereof) of the warped disparity information image D'#1 at the same position as the block MBD#21 is a decode result of the block MBD#21.

Meanwhile, when the SAD between the block MBC#21 and the MBC'#11 is not a predetermined threshold or less, the block MBD#21 that is the object block of the disparity information image D#2 is subjected to prediction coding using the disparity information image D#1 (picture thereof) as the reference picture.

That is, in the already proposed method, a gap vector (disparity vector) is detected by, for example, motion estimation (ME) (motion detection), the gap vector indicating a gap between the position of the block MBD#21 as the object block and the position of a block (corresponding block) of (a picture of) the disparity information image D#1 as the reference picture, where the object block and the corresponding block minimize the SAD.

Further, in the already proposed method, a predicted image is generated by performing motion compensation (MC) based on the gap vector, that is, in the disparity information image D#1 as the reference picture, a block at a position shifted from the position of the block MBD#21 as the object block by the gap vector, that is, the corresponding block is acquired as the predicted image, and the block MBD#21 as the object block is coded using the predicted image.

That is, a residual of the block MBD#21 as the object block with respect to the predicted image is obtained, and the residual is coded along with the gap vector (vector detected by ME) of the block MBD#21 as the object block.

Here, generating a predicted image based on a gap vector (disparity vector and motion vector) is referred to as gap prediction (disparity prediction and motion prediction), or gap compensation (disparity compensation and motion compensation). Note that the gap prediction includes detection of a gap vector, as necessary.

In FIG. 1, as to the block MBD#21 of the disparity information image D#2 to be coded, the SAD between the block MBC#21 of the color image C#2 of the view #2 at the same position as the block MBD#21 and the block MBC'#11 of the warped color image C'#1 is a predetermined threshold or less. Therefore, the block MBD#21 is coded as a skip macroblock with respect to the block MBD'#11 of the warped disparity information image D'#1 at the same position as the block MBD#21, for example.

Also, as to the block MBD#22 of the disparity information image D#2 to be coded, the SAD between the block MBC #22 of the color image C#2 of the view #2 at the same position as the block MBC #22 and the block MBC'#12 of the warped color image C'#1 is not a predetermined threshold or less. Therefore, the block MBC #22 is subjected to prediction coding using the disparity information image D#1 as the reference picture, and the block MBD #12 of the disparity information image D#1 as the reference picture, which is the corresponding block corresponding to the block MBC #22, as the predicted image.

Figure 2:
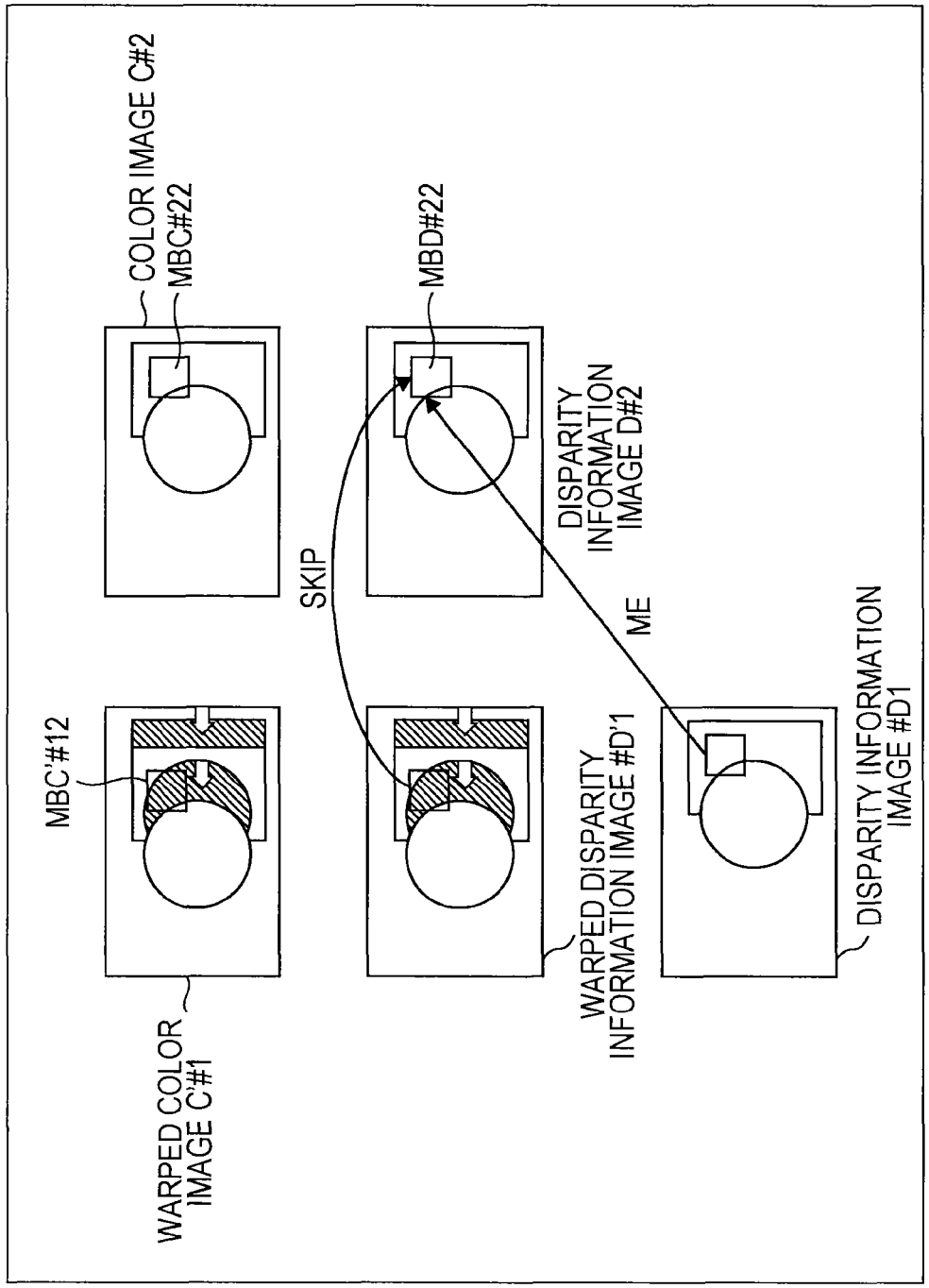
FIG. 2 is a diagram describing an example of a method of coding a viewpoint information image.

FIG. 2 is a diagram further describing the already proposed method.

In the already proposed method, as described in FIG. 1, in the coding of disparity information image D#2 of the view #2, the warped color image C'#1 is generated by warping the color image C#1 of the view #1, and the warped disparity information image D'#1 is generated by warping the disparity information image D#1 of the view #1.

Further, an occlusion may be caused in the warped color image C'#1 and in the warped disparity information image D'#1. The portion where the occlusion is caused is interpolated by, for example, pixel values of pixels existing closest to the occlusion portion in the opposite direction to the moving direction of the warping.

Here, in a case where the color images of the viewpoints #1 and #2 are images in which an object appears as the foreground on the background, a portion in the background in the color image of the viewpoint #2, which is hidden by the foreground and cannot be seen from the viewpoint #1 becomes an occlusion portion in the warped color image C'#1 obtained by warping the color image C#1 of the viewpoint #1.

The same applies to the warped disparity information image D'#1 obtained by warping the disparity information image D#1 of the viewpoint #1.

In the above-described case, the occlusion portion is the background, and pixels existing closest to the occlusion portion in the opposite direction to the moving direction in warping is also (pixels of) the background.

In the disparity information image, the disparity information as pixel values of two pixels at close positions, and in which the background appears, have (nearly) the same value unless the distance in the depth direction of the background steeply changes. Therefore, as to the warped disparity information image D'#1 obtained by warping the disparity information image D#1 of the viewpoint #1, when the occlusion portion is interpolated by the surrounding pixels of the occlusion portion, that is, for example, by the pixels existing closest to the occlusion portion in the opposite direction to the moving direction of warping, the correlation between the occlusion portion and a portion of the disparity information image D#2 at the same position as the occlusion portion is often high.

Meanwhile, the colors as the pixel values of the two pixels at close positions, and in which the background appears in the color image may largely vary depending on the texture of the background. Therefore, as to the warped color image C'#1 obtained by warping the color image C#1 of the viewpoint #1, when the occlusion portion is interpolated by the surrounding pixels, the correlation between the occlusion portion and the color image C#2 at the same position as the occlusion portion is usually not so high.

Therefore, as illustrated in FIG. 2, when the object block of the disparity information image D#2 is the block MBD#22 at the same position as the block MBC'#12 of the warped color image C'#1 including (a part of) the occlusion portion, the SAD between the block MBC #22 of the color image C#2 at the same position as the block MBD#22 and the block MBC'#12 of the warped color image C'#1 including the occlusion portion is not a predetermined threshold or less. As a result, the block MBD#22 as the object block is subjected to prediction coding using the disparity information image D#1 as the reference picture.

In the disparity information image D#2, a block of the warped color image C'#1 at a position including (a part of) the occlusion portion is, similarly to the block MBD#22, subjected to prediction coding using the disparity information image D#1 as the reference picture.

When the object block of the disparity information image D#2 is subjected to prediction coding, a gap vector (disparity vector detected by ME) (in many cases, not a 0 vector) occurs, which indicates a gap between the object block of the disparity information image D#2 and the corresponding block of the reference picture corresponding to the object block.

As described in FIG. 1, in the already proposed method, when the SAD between the block MBC #22 of the color image C#2 at the same position as the block MBC #22 as the object block of the disparity information image D#2 and the block MBC'#12 of the warped color image C'#1 is a predetermined threshold or less, the block MBC #22 as the object block is coded as a skip macroblock with respect to the warped disparity information image D'#1.

Since a residual of the skip macroblock is not coded, in the already proposed method in which the block MBD#22 as the object block always serves as the skip macroblock when the SAD between the block MBC #22 of the color image C#2 and the block MBC'#12 of the warped color image C'#1 is a predetermined threshold or less, the image quality of the decoded image of the object block MBD#22 as the skip macroblock cannot be improved more than certain image quality even if sufficient bit rates are secured for the coded data.

Further, in the already proposed method, to perform determination of whether either the disparity information image D#1 or the warped disparity information image D'#1 is used in coding the object block of the disparity information image D#2 in a macroblock layer, that is, to perform the determination using the SAD between a block (macroblock) of the warped color image C'#1 at the same position as the object block and a block (macroblock) of the color image C#2, it is necessary for the decoder side to change the macroblock layer in order to determine whether either the disparity information image D#1 or the warped disparity information image D'#1 is used for decoding of the object block when the color images C#1 and C#2 and the disparity information images D#1 and D#2 are coded using an existing coding scheme such as the MVC scheme. As a result, a substantial change of the existing coding scheme is required.

Further, in the already proposed method, since the determination of whether either the disparity information image D#1 or the warped disparity information image D'#1 is used for the coding of the object block of the disparity information image D#2 is performed using the warped color image C'#1 generated by warping the locally decoded color image C#1, it is necessary to store the (locally) decoded color image C#1 to be used to generate the warped color image C'#1 in a decode picture buffer (DPB), for the coding (decoding) of the disparity information image D#2.

As a result, a buffer having large storage capacity is required as the DPB.

Therefore, in the present technology, the object block of the disparity information image D#2 is subjected to prediction coding using at least (a picture of) warped disparity information image D'#1 generated by warping the (locally decoded) disparity information image D#1 as a candidate of the reference picture to which the reference index is allocated.

[An Outline of the Present Technology]

Figure 3:
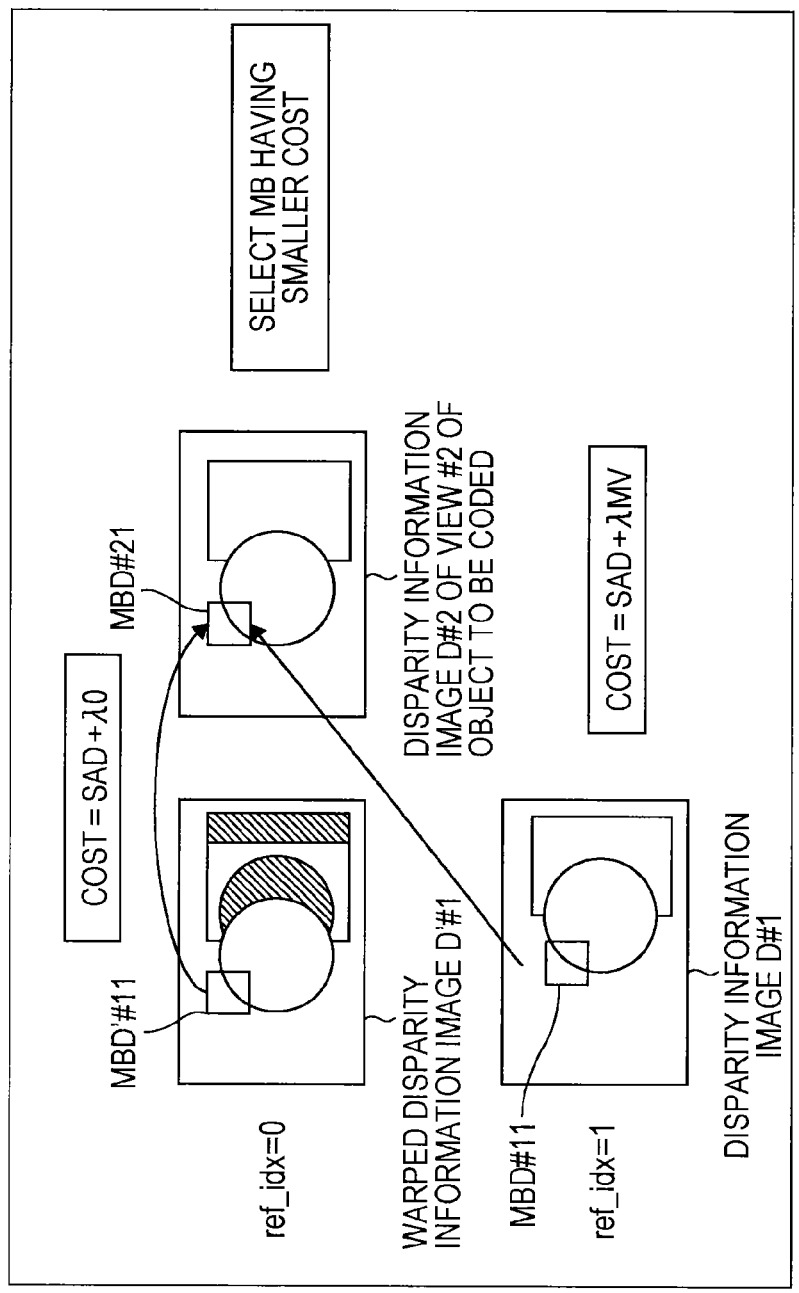
FIG. 3 is a diagram describing an outline of the present technology.

FIG. 3 is a diagram describing an outline of the present technology.

In FIG. 3, in coding of the object block of the disparity information image D#2, (a picture of) the warped disparity information image D'#1 generated by warping the (locally decoded) disparity information image D#1 and (a picture of) the disparity information image D#1 are recognized as the pictures that can serve as the reference pictures.

When the (picture of) the warped disparity information image D'#1 is the reference picture, a block at a position shifted from the block MBD#21 as the object block of the disparity information image D#2 by the gap vector, that is, the block MBD'#11 at the same position as the object block MBD#21 is acquired as the predicted image by MC on the assumption that the gap vector (disparity vector) is the 0 vector.

Then, for example, the coding cost COST=COST1' required for coding the object block MBD#21, of when the warped disparity information image D'#1 is used as the reference picture, is calculated according to the expression (1) using the SAD that is a value corresponding to the residual between the object block MBD#21 and the block MBD'#11 as the predicted image, and a value MV corresponding to a code amount of the gap vector.

$$COST=SAD+\lambda MV \quad (1)$$

Note that, in the expression (1), $\lambda$, represents the weight with respect to the value MV corresponding to the code amount of the gap vector, and is set according to a quantization step of the residual.

Here, the warped disparity information image D'#1 is an image obtained by converting the disparity information image D#1 of the viewpoint #1 into an image viewed from the viewpoint #2, and it can be presumed that there is no disparity between the warped disparity information image D'#1 and the disparity information image D#2 of the viewpoint #2 (disparity compensation is applied). Therefore, it is assumed that the gap vector is the 0 vector.

When assuming that the gap vector is the 0 vector regarding the warped disparity information image D'#1, as to the gap vector that is the 0 vector, the code amount of the gap vector can employ 0, and further, the value MV corresponding to the code amount can employ 0 (or a small value close to 0).

That is, assuming that the code amount of the gap vector is in proportion to the size of the friction vector (or a vector of a difference between the gap vector and the predicted vector described below), as to the gap vector that is the 0 vector, 0 (or a small value close to 0) can be employed as the value MV corresponding to the code amount of the gap vector.

In this case, a coding cost COST1' when the object block MBD#21 is coded using the warped disparity information image D'#1 as the reference picture is expressed in the expression COST1'=SAD+$\lambda$×0=SAD.

Note that, here, the 0 vector is employed as the gap vector for the warped disparity information image D'#1. However, the friction vector may be detected by performing ME between the warped disparity information image D'#1 and the object block MBD#21.

Meanwhile, when (the picture of) the disparity information image D#1 is used as the reference picture, the gap vector (disparity vector) is detected by performing ME between the object block MBD#21 and the disparity information image D#1.

Further, in the disparity information image D#1, a block (corresponding block) MBD #11 shifted from the position of the object block MBD#21 by the gap vector is acquired as the predicted image by MC.

Then, the coding cost COST=COST1 required for coding the object block MBD#21, of when the disparity information image D#1 is used as the reference picture, is calculated according to the expression (1) using the SAD that is a value corresponding to the residual between the object block MBD#21 and the block MBD #11 as the predicted image, and the value MV corresponding to the code amount of the gap vector.

As described above, the coding cost (the coding cost of the warped disparity information image D'#1) COST1' required for coding the object block MBD#21 using the warped disparity information image D'#1 as the reference picture, and the coding cost (the coding cost of the disparity information image D#1) COST1 required for coding the object block MBD#21 using the disparity information image D#1 as the reference picture are calculated, and the one having a smaller cost between the warped disparity information image D'#1 and the disparity information image D#1 is selected based on the coding costs COST1' and the COST1, as the reference picture used for coding the object block MBD#21.

Here, for example, in the MVC (AVC), a reference index ref_idx for distinguishing the pictures is allocated to more than one picture (a candidate of the reference picture) that can serve as the reference picture in coding of the object block.

When the images from multiple viewpoints is coded using the coding scheme in which the coding is performed by allocating the reference index to each of the reference picture candidates like the MVC, in FIG. 3, reference picture candidates (hereinafter, also referred to as candidate pictures) are (pictures of) the warped disparity information image D'#1 and the disparity information image D#1, and the reference index ref_idx is allocated to each of the warped disparity information image D'#1 and the disparity information image D#1.

In FIG. 3, the reference index ref_idx having the value of 0 (a first value) is allocated to the warped disparity information image D'#1, and the reference index ref_idx having the value of 1 (a second value) is allocated to the disparity information image D#1.

When one having the smaller cost between the warped disparity information image D'#1 and the disparity information image D#1 is selected as the reference picture to be used for coding the object block MBD#21, a residual (residual image) of the object block MBD#21 with respect to the predicted image generated using the reference picture is obtained, the gap vector information related to the gap vector (disparity vector) used to obtain the residual predicted image and the reference index ref_idx allocated to the reference picture used to obtain the predicted image are coded.

As described above, in FIG. 3, even if either the warped disparity information image D'#1 or the disparity information image D#1 is selected as the reference picture, the residual of the object block MBD#21 with respect to the predicted image generated using the reference picture is coded. Therefore, by adjusting the code amount allocated to the residual, the image quality of the decoded image of the disparity information image D#2 can be improved.

That is, in the already proposed method, as described in FIG. 1, when the warped disparity information image D'#1 is used for coding of the object block, the object block is always recognized as a skip macroblock. Therefore, the residual of the object block is not coded.

Meanwhile, in FIG. 3, when the warped disparity information image D'#1 is selected as the reference picture, the residual of the object block with respect to the predicted image generated using the reference picture is coded (may be coded). Therefore, when sufficient bit rates are secured for coded data, the image quality of the decoded image can be improved by allocating a large code amount to the residual.

Note that, in the MVC, when the object block is coded using the reference picture, to which the reference index having the value of 0 is allocated, the object block can be recognized as the skip macroblock.

Therefore, as illustrated in FIG. 3, by allocating the reference index ref_idx having the value of 0 to the warped disparity information image D'#1, the object block can be coded by being recognized as a skip macroblock when the warped disparity information image D'#1 is selected as the reference picture.

Further, in FIG. 3, the reference index ref_idx is coded. Therefore, the decoder side can determine, by the reference index ref_idx, whether either the warped disparity information image D'#1 or the disparity information image D#1 is used as the reference picture in decoding the object block. Therefore, unlike the already proposed method, it is not necessary to change the macroblock layer (below), and therefore, it is not necessary to largely change the existing coding scheme such as the MVC, and the existing coding scheme can be used.

Further, in FIG. 3, unlike the already proposed method, a color image is not used to select the reference picture referenced when the object block of the disparity information image D#2 is coded. Therefore, it is not necessary to store the locally decoded color image in the DPB for the coding of the object block of the disparity information image D#2, and a buffer having a smaller storage capacity can be employed as the DPB, compared with the case of the already proposed method.

In addition, in the case of FIG. 3, the candidate picture includes the warped disparity information image D'#1, and the reference index ref_idx having the value of 0 is allocated to the warped disparity information image D'#1. Therefore, the coding efficiency can be improved compared with the already proposed method.

Here, in the MVC (AVC), an integer in which 0 is the minimum value is used as the reference index ref_idx.

Further, in the MVC, the code amount of the reference index ref_idx having the value of 0 is smaller than that of reference indexes ref_idx having other values.

Therefore, when the images from multiple viewpoints are coded using the MVC, for example, by allocating the reference index ref_idx having the value of 0 to the candidate picture that is more likely to be selected as the reference picture among the candidate pictures, the code amount can be made small and the coding efficiency can be improved.

In FIG. 3, the candidate pictures are the warped disparity information image D'#1 and the disparity information image D#1, and the reference index ref_idx having the value of 0 is allocated to the warped disparity information image D'#1 and the reference index ref_idx having the value of 0 is allocated to the disparity information image D#1, respectively.

Then, the warped disparity information image D'#1 between the warped disparity information image D'#1 and the disparity information image D#1 that are the candidate pictures is more likely to be selected as the reference picture, and the reference index ref_idx having the value of 0 is allocated to such a warped disparity information image D'#1, and therefore, the coding efficiency can be improved.

Figure 4:
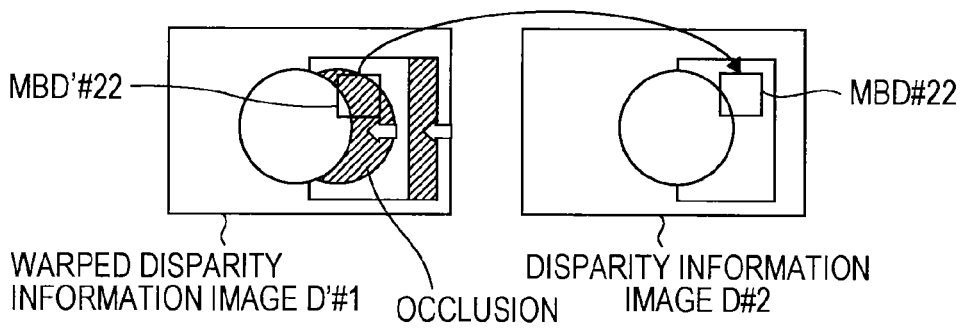
FIG. 4 is a diagram describing a warped disparity information image D'#1 is more likely to be selected as a reference picture between the warped disparity information image D'#1 and a disparity information image D#1.

FIG. 4 is a diagram describing the warped disparity information image D'#1 is more likely to be selected as the reference picture between the warped disparity information image D'#1 and the disparity information image D#1.

The warped disparity information image D'#1 is a disparity information image obtainable in the viewpoint #2 (might be obtained in the viewpoint #2), which is generated by warping the (locally decoded) disparity information image D#1 as described above.

Therefore, the SAD between the object block of the disparity information image D#2 of the viewpoint #2 and a block of the warped disparity information image D'#1 at the same position as the object block is, in many cases, a small value.

When the object block is coded using (a picture of) the warped disparity information image D'#1 as the reference picture, the block (corresponding block) at the position shifted from the position of the object block of the disparity information image D#2 by the gap vector, that is, the block at the same position as the object block is acquired as the predicted image by the MC on the assumption that the gap vector is the 0 vector.

Therefore, when the warped disparity information image D'#1 is used as the reference picture, the SAD between the object block and the predicted image is, in many cases, a small value.

Further, as to the warped disparity information image D'#1, the coding cost COST1'=SAD+λ×0=SAD is calculated by employing 0 as the value MV corresponding to the code amount of the gap vector, as described in FIG. 3, on the assumption that the gap vector is the 0 vector.

Therefore, the coding cost COST1' of the warped disparity information image D'#1 is more likely to be smaller than the coding cost COST1=SAD+λMV of the disparity information image D#1, in which the value MV corresponding to the code amount of the gap vector is not necessarily 0.

As a result, between the warped disparity information image D'#1 and the disparity information image D#1, the warped disparity information image D'#1 is more likely to be selected than the disparity information image D#1 as the reference picture.

As described above, by allocating the reference index ref_idx having the value of 0 to the warped disparity information image D'#1 that is more likely to be selected as the reference picture, the coding efficiency can be improved.

Further, the disparity information image D#1 is warped in generating the warped disparity information image D'#1, and an occlusion portion occurs by the warping.

In the warped disparity information image D'#1, the occlusion portion is interpolated by the surrounding pixels of the occlusion portion, as described in FIG. 2. The correlation between this occlusion portion and a portion of the disparity information image D#2 at the same position as the occlusion portion is often high.

Therefore, even in a case where the object block of the disparity information image D#2 is the block MBD#22 at the same position as the block MBD#22 including (a part of) the occlusion portion of the warped disparity information image D'#1, as illustrated in FIG. 4, the SAD between the object block MBD#22 and the predicted image of when the warped disparity information image D'#1 is used as the reference picture, that is, the SAD between the object block MBD#22 and the block MBD'#22 of the warped disparity information image D'#1 at the same position as the object block MBD#22 is more likely to be small.

Therefore, even in a case where the object block of the disparity information image D#2 is the block MBD#22 at the same position as the block MBD'#22 including the occlusion portion of the warped disparity information image D'#1, the coding cost of the warped disparity information image D'#1 is more likely to be small. Therefore, since the warped disparity information image D'#1 is more likely to be selected as the reference picture, by allocating the reference index having the value of 0 to such a warped disparity information image D'#1, the coding efficiency can be improved.

Further, when the warped disparity information image D'#1 is selected as the reference picture, the gap vector is assumed to be the 0 vector. Therefore, the gap vector (that is not the 0 vector) does not occur.

Note that, as to the color image, as described in FIG. 2, there are many cases in which a correlation between the occlusion portion of the warped color image and a portion of a color image of the warped color image before warping, which is at the same position as the occlusion portion, is not so high.

As a result, in the already proposed method in which the determination of whether either the disparity information image D#1 or the warped disparity information image D'#1 is used in coding the object block of the disparity information image D#2 is performed using the SAD between the block of the warped color image C'#1 and the block of the color image C#2, as described in FIG. 2, when the object block of the disparity information image D#2 is the block MBD#22 at the same position as the block MBC'#12 including (a part of) the occlusion portion of the warped color image C'#1, the SAD between the block MBC #22 of the color image C#2 at the same position as the object block MBD#22 and the block MBC'#12 of the warped color image C'#1 including the occlusion portion is not a predetermined threshold or less. As a result, the block MBD#22 as the object block is (more likely to be) subjected to prediction coding using the disparity information image D#1 as the reference picture.

That is, in the already proposed method, as to the object block MBD#22 of the disparity information image D#2 at the same position as the block MBD'#22 including the occlusion portion of the warped disparity information image D'#1, even if the SAD between the object block MBD#22 and the block MBD' #22 of the warped disparity information image D'#1 at the same position as the object block MBD#22 is small, the SAD obtained using the color image does not become small (does not become a predetermined threshold or less), and is more likely to be subjected to prediction coding using the disparity information image D#1 as the reference picture.

Therefore, in the already proposed method, the gap vector (in many cases, it is not the 0 vector) is generated by ME performed using the object block MBD#22 and the disparity information image D#1.

In contrast, in the present technology, as to the object block MBD#22 at the same position as the block MBD'#22 including the occlusion portion of the warped disparity information image D'#1, if the SAD between the object block MBD#22 and the block MBD'#22 of the warped disparity information image D'#1 at the same position as the object block MBD#22 is small, the gap vector that occurs by ME in the already proposed method does not occur.

Note that, although the applicability of the already proposed method to a color image is unclear, the coding method of the disparity information image described in FIG. 3 is applicable to a color image.

[One Embodiment of a Multi-View Image Encoder to which the Present Technology is Applied]

Figure 5:
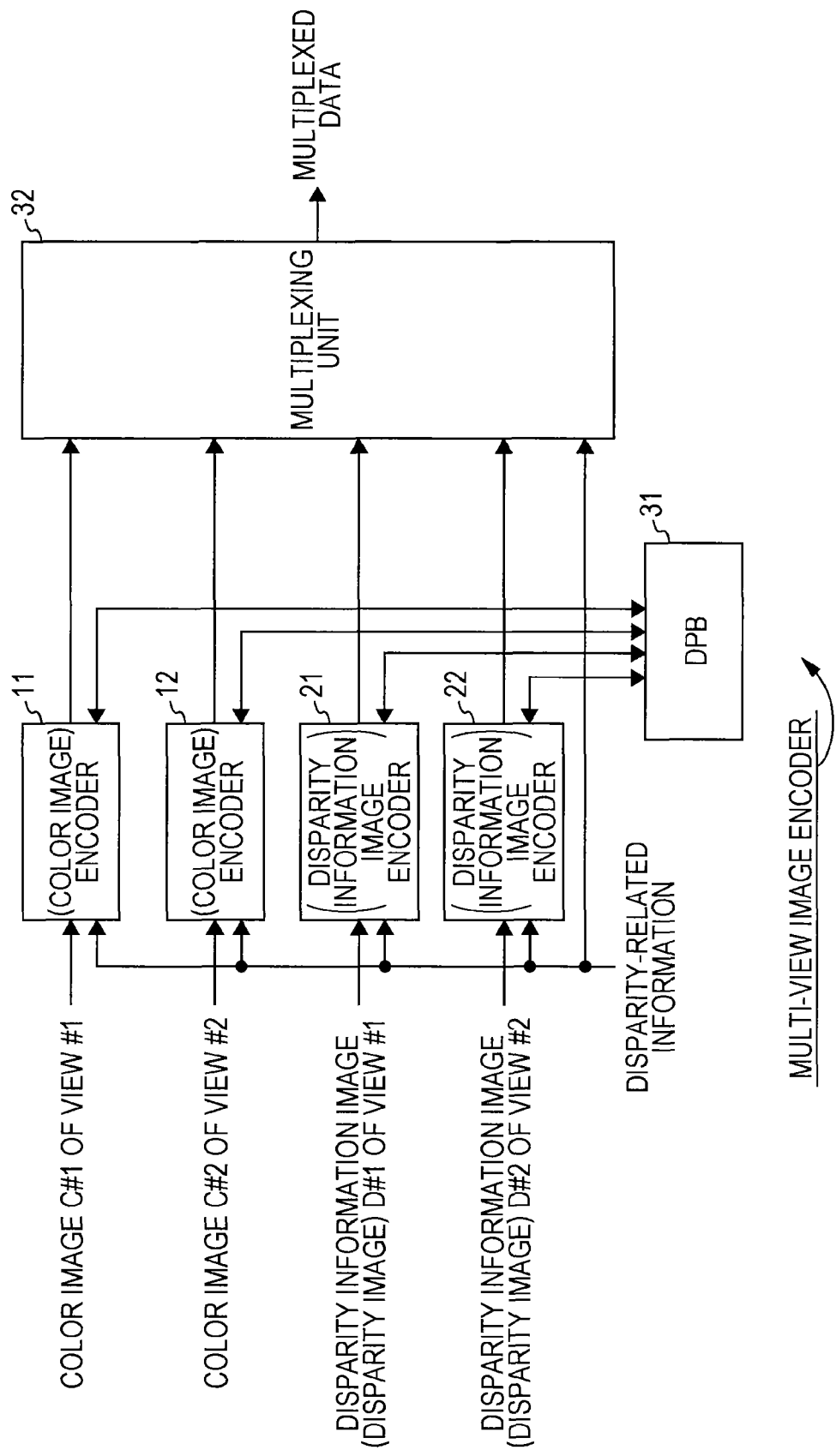
FIG. 5 is a block diagram illustrating a configuration example of one embodiment of a multi-view image encoder to which the present technology is applied.

FIG. 5 is a block diagram illustrating a configuration example of a multi-view image encoder to which the present technology is applied.

The multi-view image encoder of FIG. 5 is an encoder that codes images from multiple viewpoints using, for example, the MVC scheme, and hereinafter, description of processing similar to the MVC scheme is appropriately omitted.

Note that the multi-view image encoder is not limited to the encoder using the MVC scheme.

Further, hereinafter, as the images from multiple viewpoints, the color image C#1 of the view #1 and the color image C#2 of the view #2 that are color images of the two viewpoints #1 and #2, and the disparity information image D#1 of the view #1 and the disparity information image D#2 of the view #2 that are the disparity information images of the two viewpoints #1 and #2 are employed.

Further, for example, the color image C#1 and the disparity information image D#1 of the view #1 are recognized as the images of base views, and the color image C#2 and the disparity information image D#2 of the view #2 are recognized as the images of dependent views.

Note that, as the images from multiple viewpoints, color images and disparity information images of three or more viewpoints can be employed. The color image and the disparity information image of one of the three viewpoints can be recognized as images of base views, and the color images and the disparity information images of the rest viewpoints can be recognized as images of dependent views.

The multi-view image encoder in FIG. 5 includes encoders 11, 12, 21, and 22, the DPB 31, and a multiplexing unit 32.

The color image C#1 of the view #1 and disparity-related information (depth-related information) are supplied to the encoder 11.

Here, the disparity-related information (depth-related information) is metadata of the disparity information (depth information), and details thereof will be described below.

The encoder 11 codes the color image C#1 of the view #1 using the disparity-related information, as necessary, and supplies coded data of the color image C#1 of the view #1 obtained as a result of the coding to the multiplexing unit 32.

The color image C#2 of the view #2 and the disparity-related information are supplied to the encoder 12.

The encoder 12 codes the color image C#2 of the view #2 using the disparity-related information, as necessary, and supplies coded data of the color image C#2 of the view #2 obtained as a result of the coding to the multiplexing unit 32.

The color image D#1 of the view #1 and the disparity-related information are supplied to the encoder 21.

The encoder 21 codes the color image D#1 of the view #1 using the disparity-related information, as necessary, and supplies coded data of the color image D#1 of the view #1 obtained as a result of the coding to the multiplexing unit 32.

The color image D#2 of the view #2 and the disparity-related information are supplied to the encoder 22.

The encoder 22 codes the color image D#2 of the view #2 using the disparity-related information, as necessary, and supplies coded data of the color image D#2 of the view #2 obtained as a result of the coding to the multiplexing unit 32.

The DPB 31 temporarily stores locally decoded images (decoded images) obtained such that images to be coded are respectively coded and locally decoded by the encoders 11, 12, 21, and 22 as (candidates of) the reference pictures to be referred in generating predicted images.

That is, the encoders 11, 12, 21, and 22 perform prediction coding of the images to be coded. Therefore, the encoders 11, 12, 21, and 22 obtains decoded images by coding the images to be coded and locally decoding coded images in order to generate predicted images to be used in prediction coding.

The DPB 31 is a shared buffer that temporarily stores the decoded images obtained in respective encoders 11, 12, 21, and 22, and the encoders 11, 12, 21, and 22 respectively select, from among the decoded images stored in the DPB 31, the reference pictures that are referred in order to code the images to be coded. Then, the encoders 11, 12, 21, and 22 respectively generate the predicted images using the reference pictures, and perform coding (prediction coding) using the predicted images.

Since the DPB 31 is shared by the encoder 11, 12, 21, and 22, each of the encoders 11, 12, 21, and 22 can refer to the decode image obtained by itself as well as the decoded images obtained in other encoders.

The coded data and the disparity-related information are respectively supplied from the encoders 11, 12, 21, and 22 to the multiplexing unit 32.

The multiplexing unit 32 multiplexes the coded data from the respective encoders 11, 12, 21, and 22, and the disparity-related information supplied thereto, and outputs multiplexed data obtained as a result of the multiplexing.

The multiplexed data output by the multiplexing unit 32 are recorded on a recording medium (not illustrated), and are transmitted through a transmission medium (not illustrated).

[A Multi-View Image Generation Apparatus]

Figure 6:
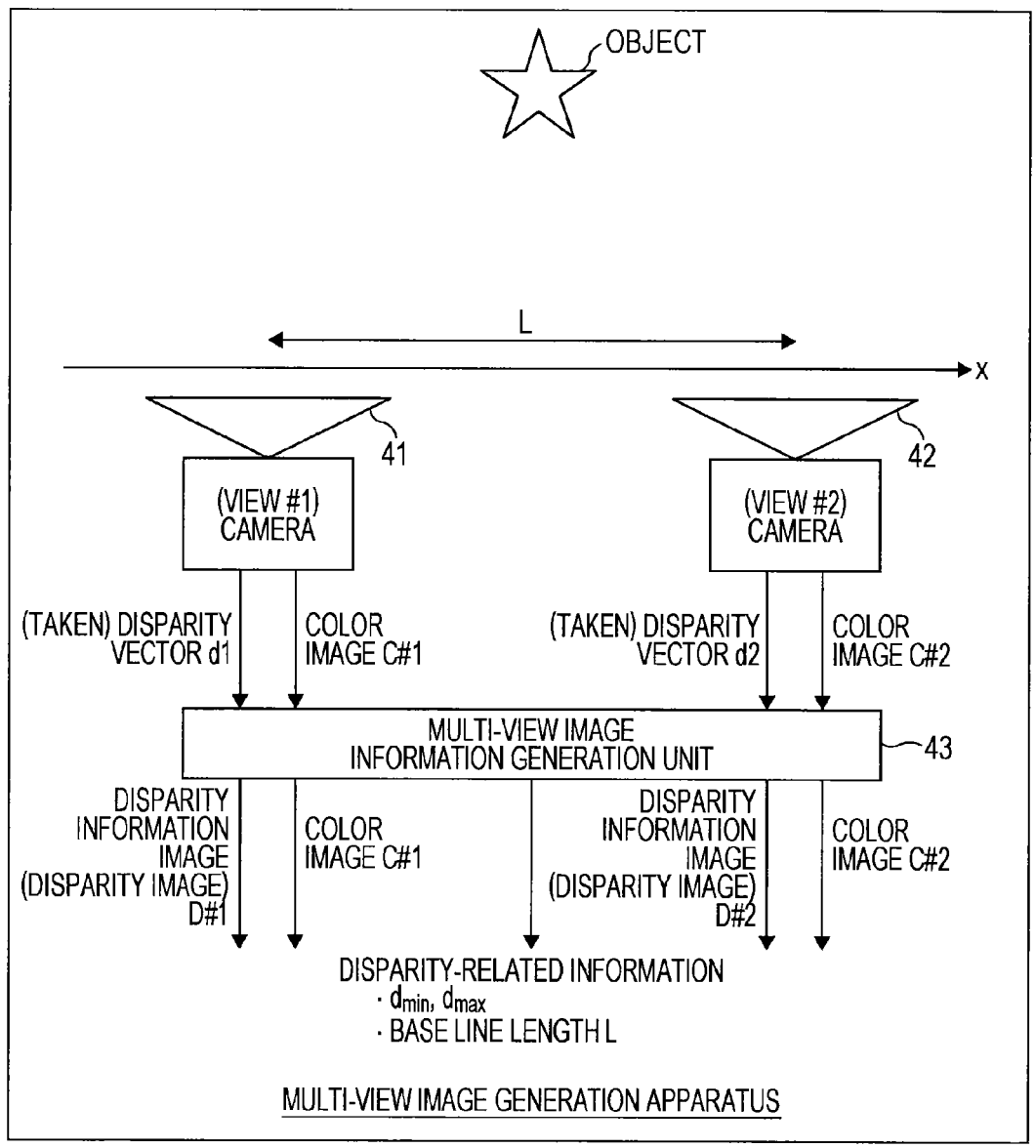
FIG. 6 is a block diagram illustrating a configuration example of a multi-view image generation apparatus that generates images from multiple viewpoints serving as objects to be coded in the multi-view image encoder.

FIG. 6 is a block diagram illustrating a configuration example of a multi-view image generation apparatus that generates images from multiple viewpoints that are objects to be coded in the multi-view image encoder of FIG. 5.

In the multi-view image generation apparatus, as the multiple viewpoints, for example, to take images of two viewpoints, two cameras 41 and 42 are setup at positions from where color images of different viewpoints can be taken.

Here, in the present embodiment, for ease of description, the cameras 41 and 42 are arranged on different positions on a straight line on a certain horizontal surface such that the optical axes face a direction perpendicular to the straight line.

The camera 41 takes an image of an object at the position where the camera 41 is arranged, and outputs the color image C#1 as a moving image.

Further, using the position of the camera 42, which is another arbitrary camera, as a reference position, the camera 41 outputs a disparity vector d1 that indicates a disparity of pixels of the color image C#1 with respect to the reference viewpoint.

The camera 42 takes an image of the object at the position where the camera 42 is arranged, and outputs the color image C#2 as a moving image.

Further, using the position of the camera 41, which is the other arbitrary camera, as a reference position, the camera 42 outputs a disparity vector d2 that indicates a disparity of pixels of the color image C#2 with respect to the reference viewpoint.

Here, assume that a two-dimensional plane in which the lateral (horizontal) direction of the color image is x axis and the longitudinal (vertical) direction is y axis is a color image plane, the cameras 41 and 42 are arranged on a straight line on a plane (horizontal plane) perpendicular to the color image plane. Therefore, the disparity vectors d1 and d2 have an y component of 0 and an x component of a value corresponding to the positional relationship between the cameras 41 and 42 in the horizontal direction, and the like.

Note that, to differentiate the disparity vectors (disparities) d1 and d2 output by the cameras 41 and 42 from disparity vectors that indicate disparities obtained by ME, the disparity vectors d1 and d2 are hereinafter also referred to as taken disparity vectors d1 and d2.

The color image C#1 and the taken disparity vector d1 output by the camera 41 and the color image C#2 and the taken disparity vector d2 output by the camera 42 are supplied to a multi-view image information generation unit 43.

The multi-view image information generation unit 43 outputs the color image C#1 from the cameras 41 and 42 as it is. Further, the multi-view image information generation unit 43 obtains disparity information related to a disparity for each pixel of the color image #1 from the taken disparity vector d1 from the camera 41, and generates and outputs the disparity information image D#1 having the disparity information as a pixel value.

Further, the multi-view image information generation unit 43 obtains disparity information related to a disparity for each pixel of the color image #2 from the taken disparity vector d2 from the camera 42, and generates and outputs the disparity information image D#2 having the disparity information as a pixel value.

As described above, examples of the disparity information (depth information) include a disparity value corresponding to the taken disparity vector (value I) and a value y that is a normalized depth Z that indicates a distance (depth) to the object.

Now, assume that the pixel value of the disparity information image is an integer value of 0 to 255 expressed in 8 bits, for example. Further, (the x component of) the taken disparity vector is expressed by d, and a maximum value and a minimum value of (the x component) of the taken disparity vector (for example, in a picture, a moving image as one content, or the like) are respectively expressed by dmax and dmin.

In this case, the disparity value v (value I) is obtained according to the expression (2) using, for example, (the x component) of the taken disparity vector d, and the maximum value dmax ($D_{max}$) and minimum value drain ($D_{min}$), as described above.

$$v=255\times(d-d\text{min})/(d\text{max}-d\text{min}) \quad (2)$$

Note that the disparity value v of the expression (2) can be converted into the (x component) d of the taken disparity vector according to the expression (3).

$$d=v\times(d\text{max}-d\text{min})/255+d\text{min} \quad (3)$$

Further, the depth Z indicates the distance from the straight line on which the cameras 41 and 42 are arranged to the object.

As for the camera 41 (the same applies to the camera 42), the depth Z can be obtained according to the expression (4) using (the x component of) the taken disparity vector d (d1) where a base line length that is the distance between the camera 41 and the camera 42 that is arranged on the straight line (the distance between the camera 41 and the reference viewpoint) is L, and a focal length of the camera 41 is f, respectively.

$$Z=(L/d)\times f \quad (4)$$

The disparity value v and the depth Z that are the disparity information can be reciprocally converted according to the expression (4), and are therefore equivalent information.

Hereinafter, the disparity information image (depth image) having the disparity value v as the pixel value is also referred to as a disparity image, and an image having the value y of the normalized depth Z as the pixel value is also referred to as a depth image.

Note that, hereinafter, as the disparity information image, the disparity image is, for example, used from the disparity image and the depth image. However, the depth image can be used as the disparity information image.

The multi-view image information generation unit 43 outputs the above color images #1 and #2 and the disparity images D#1 and #2 as well as the disparity-related information.

That is, the base line lengths L that are the distances between the cameras 41 and 42 (the distances from the respective cameras 41 and 42 and the reference viewpoints) and the focal lengths f are supplied to the multi-view image information generation unit 43 from an outside.

The multi-view image information generation unit 43 detects the maximum value dmax and the minimum value dmin of the (x component of) the taken disparity vector d of each of the taken disparity vector d1 from the camera 41 and the taken disparity vector d2 from the camera 41.

Then, the multi-view image information generation unit 43 outputs the maximum values dmax and the minimum values dmin of the taken disparity vectors d and the base line lengths L and the focal lengths f as the disparity-related information.

The color images C#1 and C#2, the disparity images D#1 and D#2, and the disparity-related information output by the multi-view image information generation unit 43 are supplied to the multi-view image encoder of FIG. 5.

Note that, here, for ease of description, the cameras 41 and 42 are arranged on one straight line on the same plane perpendicular to the color image plane, and the taken disparity vectors d (d1 and d2) are the vectors having the y components of 0. However, each of the cameras 41 and 42 can be arranged on different planes perpendicular to the color image plane. In this case, the taken disparity vector d becomes a vector in which both of the x component and the y component have values other than 0.

[An Outline of MVC Scheme]

Figure 7:
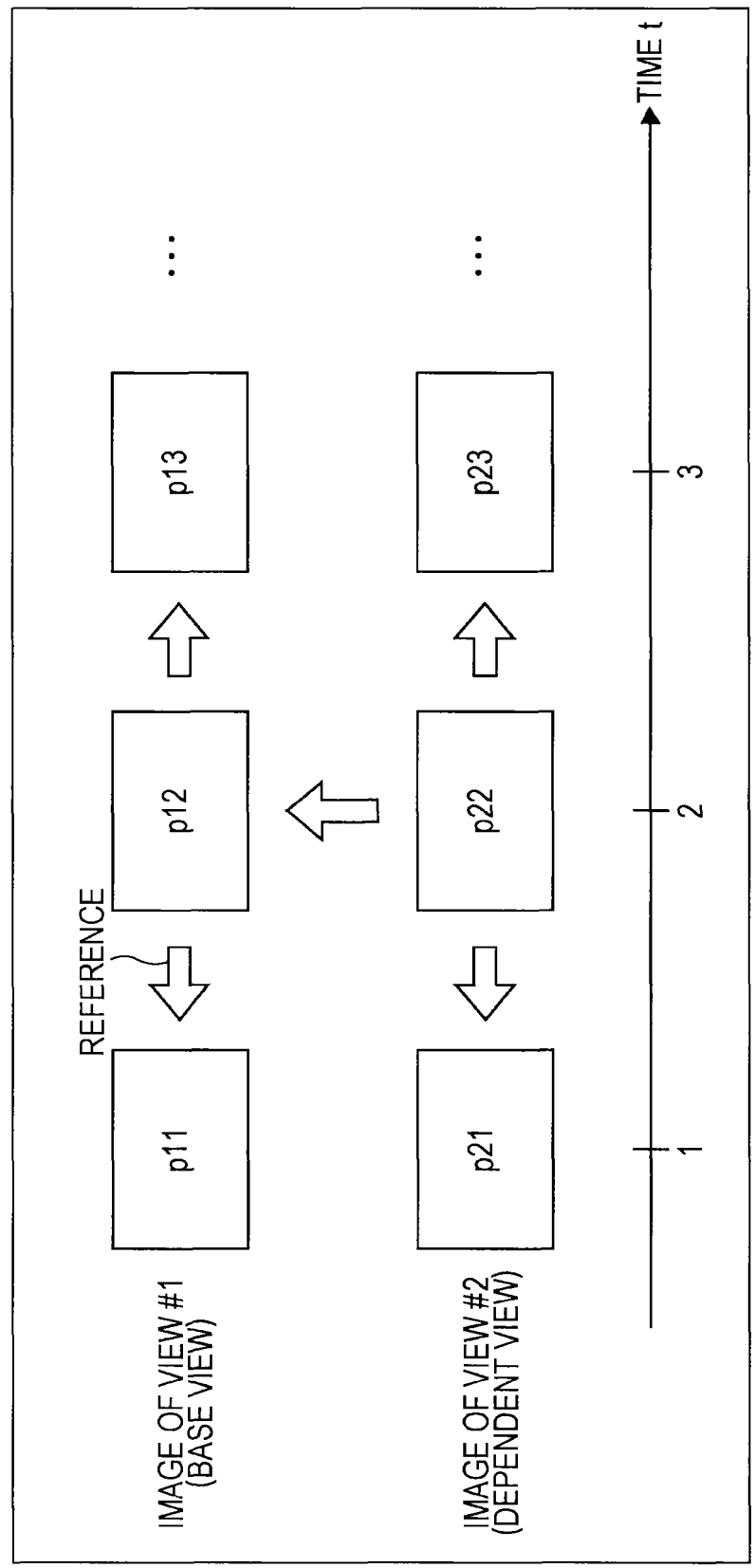
FIG. 7 is a diagram describing a picture referred when a predicted image is generated in prediction coding of the MVC scheme.

FIG. 7 is a diagram describing a picture referred when a predicted image is generated in prediction coding of the MVC scheme.

Pictures of an image of the view #1 that is an image of a base view are expressed by p11, p12, p13, . . . in order of display time, and pictures of an image of the view #2 that is an image of a dependent view are expressed by p21, p22, p23, . . . in order of time.

The picture p12 that is a picture of the base view is subjected to prediction coding by referring to, for example, the pictures p11 and p13 that are the pictures of the base view, as necessary.

That is, the picture p12 of the base view can be predicted (a predicted image can be generated) by referring only to the pictures p11 and p13 that are the pictures of the base view of different times.

The picture p22 that is a picture of the dependent view is, for example, subjected to the prediction coding by referring to the pictures p21 and p23 that are the pictures of the dependent view as well as the picture p12 of the base view that is another view, as necessary.

That is, the picture p22 of the dependent view can be predicted by referring to the pictures p21 and p23 of the dependent view of other times as well as the picture p12 of the base view of another view.

Here, the prediction performed by referring to a picture of the same view as a picture to be coded is also referred to as time prediction, and the prediction performed by referring to a picture of a different view from the picture to be coded is also referred to as disparity prediction.

As described above, in the MVC scheme, the picture of the base view can be subjected to the time prediction only, and the picture of the dependent view can be subjected to the time prediction and the disparity prediction.

Note that, in the MVC scheme, the picture of a different view from the picture to be coded that is referred in the disparity prediction should be a picture of the same time as the picture to be coded.

The encoders 11, 12, 21, and 22 that configure the multi-view image encoder of FIG. 5 perform, in principle, prediction (generation of a predicted image) according to the MVC scheme.

Figure 8:
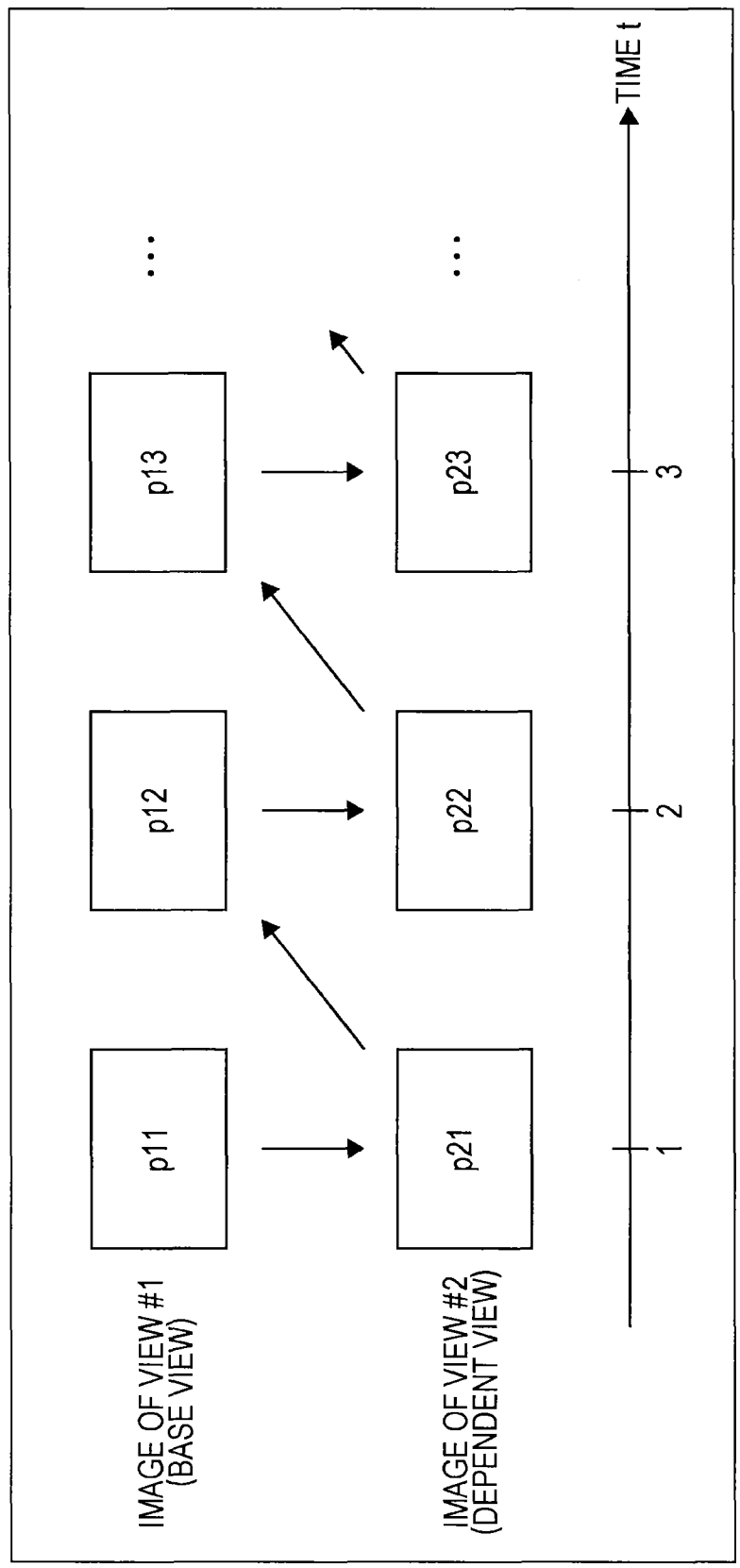
FIG. 8 is a diagram describing order of coding (and of decoding) of pictures in the MVC scheme.

FIG. 8 is a diagram describing the order of coding (or decoding) of a picture in the MVC scheme.

Similarly to FIG. 7, pictures of the view #1 that is an image of a base view are expressed by p11, p12, p13, in order of display time, and pictures of an image of the view #2 that is an image of a dependent view are expressed by p21, p22, p23, . . . in order of time.

Assuming that the pictures of each view are coded in order of time for ease of description, the picture p11 of a first time t=1 of the base view is coded, and the picture p21 of the same time t=1 of the dependent view is then coded.

When coding of the (all) pictures of the same time t=1 of the dependent view is completed, the picture p12 of the next time t=2 of the base view is coded, and the picture p22 of the same time t=2 of the dependent view is then coded.

Hereinafter, the pictures of the base view and the pictures of the dependent view are coded in similar order.

In the encoders 11, 12, 21, and 22 that configure the multi-view image encoder of FIG. 5, the pictures are coded in order according to the MVC scheme.

[A Configuration Example of the Encoder 11]

Figure 9:
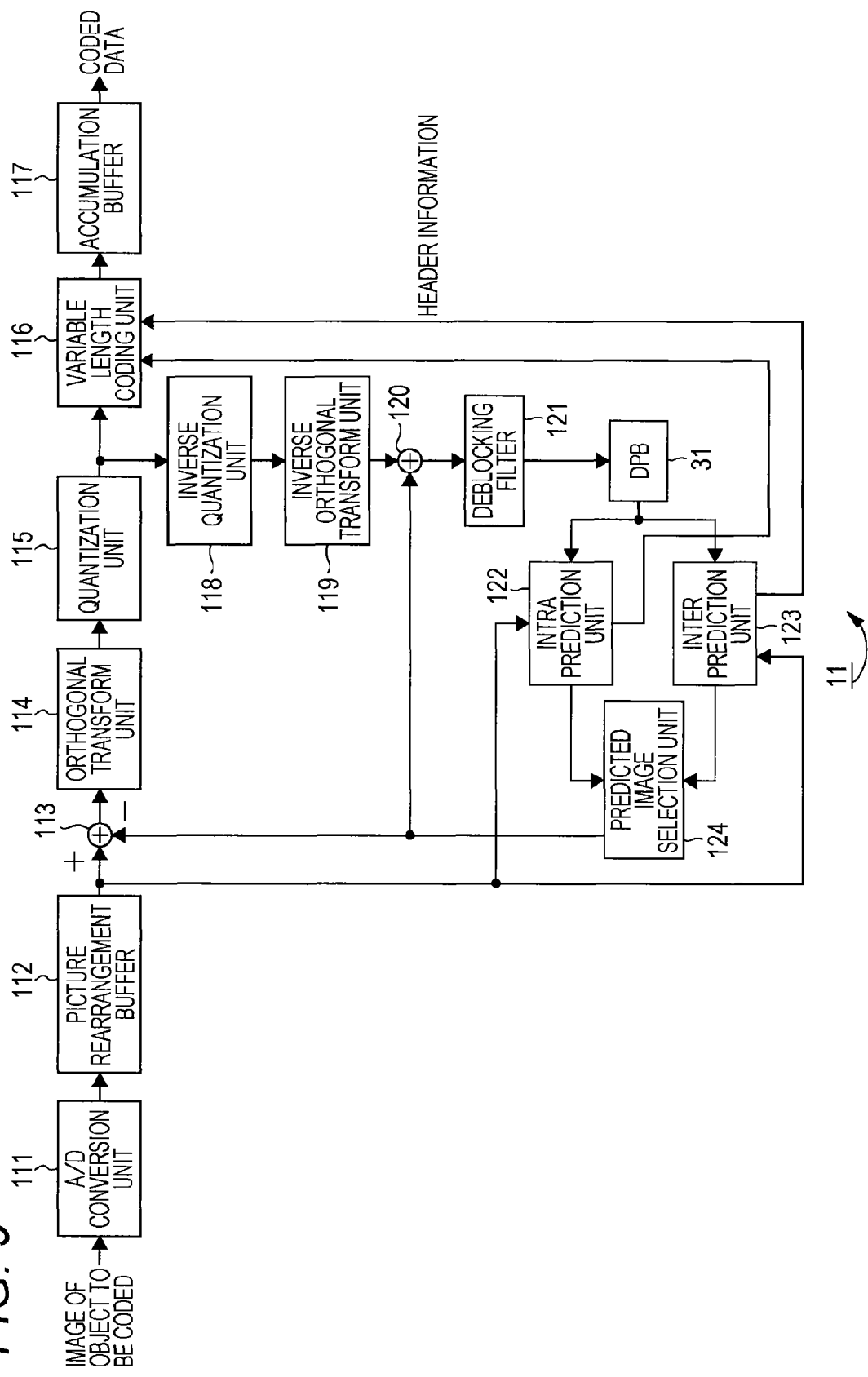
FIG. 9 is a block diagram illustrating a configuration example of an encoder 11.

FIG. 9 is a block diagram illustrating a configuration example of the encoder 11 of FIG. 5.

Note that the encoders 12 and 21 of FIG. 5 are configured in a similar manner to the encoder 11, and for example, perform coding of an image according to the MVC scheme.

In FIG. 9, the encoder 11 includes an analog/digital (A/D) conversion unit 111, a picture rearrangement buffer 112, a calculation unit 113, an orthogonal transform unit 114, a quantization unit 115, a variable length coding unit 116, an accumulation buffer 117, an inverse quantization unit 118, an inverse orthogonal transform unit 119, a calculation unit 120, a deblocking filter 121, an intra prediction unit 122, an inter prediction unit 123, and a predicted image selection unit 124.

Pictures of the color image C#1 of the view #1 that is an image to be coded (moving image) are sequentially supplied to the A/D conversion unit 111 in display order.

When the picture supplied thereto is an analog signal, the A/D conversion unit 111 applies A/D conversion to the analog signal, and supplies the converted signal to the picture rearrangement buffer 112.

The picture rearrangement buffer 112 temporarily stores the pictures from the A/D conversion unit 111, and reads out the pictures according to a predetermined structure of a group of pictures (GOP) to rearrange the arrangement of the pictures from the display order to coding order (decoding order).

The pictures read out from the picture rearrangement buffer 112 are supplied to the calculation unit 113, the intra prediction unit 122, and the inter prediction unit 123.

To the calculation unit 113, the pictures from the picture rearrangement buffer 112 as well as a predicted image generated in the intra prediction unit 122 or in the inter prediction unit 123 from the predicted image selection unit 124 are supplied.

The calculation unit 113 recognizes the pictures read out from the picture rearrangement buffer 112 as object pictures to be coded, and macroblocks that configure the object pictures as object blocks to be coded in sequence.

The calculation unit 113 then calculates a subtraction value obtained by subtracting a pixel value of the predicted image supplied from the predicted image selection unit 124 from a pixel value of the object block, as necessary, and supplies the subtraction value to the orthogonal transform unit 114.

The orthogonal transform unit 114 applies orthogonal transform such as discrete cosine transform or Karhunen-Loeve transform to (the pixel value of, or a residual obtained by subtracting the predicted image from) the object block from the calculation unit 113, and supplies a transform coefficient obtained as a result of the orthogonal transform to the quantization unit 115.

The quantization unit 115 quantizes the transform coefficient supplied from the orthogonal transform unit 114, and supplies a quantized value obtained as a result of the quantization to the variable length coding unit 116.

The variable length coding unit 116 applies lossless coding such as variable length coding (for example, context-adaptive variable length coding (CAVLC) and the like) or arithmetic coding (for example, context-adaptive binary arithmetic coding (CABAC) and the like) to the quantized value from the quantization unit 115, and coded data obtained as a result of the coding to the accumulation buffer 117.

Note that the quantized value from the quantization unit 115 as well as header information to be included to a header of the coded data from the intra prediction unit 122 and the inter prediction unit 123 are supplied to the variable length coding unit 116.

The variable length coding unit 116 codes the header information from the intra prediction unit 122 and the inter prediction unit 123, and includes the header information to the header of the coded data.

The accumulation buffer 117 temporarily stores the coded data from the variable length coding unit 116, and outputs the coded data at a predetermined data rate.

The coded data output from the accumulation buffer 117 is supplied to the multiplexing unit 32 (FIG. 5).

The quantized value obtained in the quantization unit 115 is supplied to the variable length coding unit 116 as well as to the inverse quantization unit 118, and is locally decoded in the inverse quantization unit 118, the inverse orthogonal transform unit 119, and the calculation unit 120.

That is, the inverse quantization unit 118 inversely quantizes the quantized value from the quantization unit 115 to the transform coefficient, and supplies the transform coefficient to the inverse orthogonal transform unit 119.

The inverse orthogonal transform unit 119 inversely orthogonally transforms the transform coefficient from the inverse quantization unit 118, and supplies the inversely orthogonally transformed coefficient to the calculation unit 120.

The calculation unit 120 obtains a decoded image that is a locally decoded object block by adding the pixel value of the predicted image supplied from the predicted image selection unit 124 to the data supplied from the inverse orthogonal transform unit 119, as necessary, and supplies the decoded image to the deblocking filter 121.

The deblocking filter 121 removes (reduces) a block distortion caused in the decoded image by filtering the decoded image from the calculation unit 120, and supplies the decoded image to the DPB 31 (FIG. 5).

Here, the DPB 31 stores the decoded image from the deblocking filter 121, that is, the picture of the color image C#1 coded and locally decoded in the encoder 11 as (a candidate of) the reference picture to be referred when a predicted image is generated, the predicted image being to be used in prediction coding (coding in which subtraction of a predicted image is performed in the calculation unit 113) performed temporally later.

As described in FIG. 5, since the DPB 31 is shared by the encoders 11, 12, 21, and 22, the DPB 31 stores the picture of the color image C#1 coded and locally decoded in the encoder 11 as well as the picture of the color image C#2 coded and locally decided in the encoder 12, the picture of the disparity image D#1 coded and locally decoded in the encoder 21, and the picture of the disparity image D#2 coded and locally decoded in the encoder 22.

Note that the local decoding by the inverse quantization unit 118, the inverse orthogonal transform unit 119, and the calculation unit 120 is performed for an I picture, a P picture, and a Bs picture that are referable pictures capable of serving as a reference picture, and the DPB 31 stores decoded images of the I picture, P picture, and Bs picture.

When the object picture is the I picture, P picture, or B picture (including the Bs picture) that can be subjected to intra prediction, the intra prediction unit 122 reads out an already locally decoded portion (decoded image) from among the object pictures from the DPB 31. Then, the intra prediction unit 122 recognizes the part of the decoded image read out from the DPB 31 from among the object pictures as the predicted image of the object block of the object picture supplied from the picture rearrangement buffer 112.

Further, the intra prediction unit 122 obtains a coding cost required for coding the object block using the predicted image, that is, a coding cost required for coding a residual and the like of the object block with respect to the predicted image, and supplies the coding cost along with the predicted image to the predicted image selection unit 124.

When the object picture is the P picture or B picture (including the Bs picture) that can be subjected to inter prediction, the inter prediction unit 123 reads out one or more pictures coded and locally decoded before the object picture from the DPB 31 as a candidate picture (a candidate of the reference picture).

Further, the inter prediction unit 123 detects a gap vector that indicates a gap (a disparity or a motion) between the object block and a corresponding block of the candidate picture, which corresponds to the object block (a block that minimizes the SAD between the object block and the corresponding block) by ME using the object block of the object picture from the picture rearrangement buffer 112 and the candidate picture.

Here, when the candidate picture is a picture of the same view as the object picture, the gap vector detected by ME using the object block and the candidate picture is a motion vector that indicates a motion (temporal shift) between the object block and the candidate picture.

When the candidate picture is a picture of a different view from the object picture, the gap vector detected by ME using the object block and the candidate picture is a disparity vector that indicates a disparity (spatial gap) between the object block and the candidate picture.

To differentiate the disparity vector obtained by ME as described above from the taken disparity vector described in FIG. 6, the disparity vector is also referred to as a calculated disparity vector.

In the present embodiment, for ease of description, the taken disparity vector is a vector having the y component of 0. However, since the calculated disparity vector detected by ME indicates a gap (positional relationship) between the object block and the block (corresponding block) of the candidate picture that minimize the SAD, the y component is not necessarily 0.

The inter prediction unit 123 performs gap compensation (motion compensation that compensates the gap of the motion, or disparity compensation that compensates the gap of the disparity) of the candidate picture from the DPB 31 according to the gap vector of the object block to generate a predicted image.

That is, the inter prediction unit 123 acquires, as the predicted image, the corresponding block of the candidate picture, which is a block (region) at a position moved (shifted) from the position of the object block according to the gap vector of the object block.

Further, the inter prediction unit 123 obtains a coding cost required for coding the object block using the predicted image for each candidate picture to be used for the generation of the predicted image, or for each inter prediction mode, in which a macroblock type and the like are different, described below.

The inter prediction unit 123 then recognizes an inter prediction mode having the minimum coding cost as an optimum inter prediction mode, and supplies the predicted image and the coding code obtained in the optimum inter prediction mode to the predicted image selection unit 124.

The predicted image selection unit 124 selects a predicted image having a smaller cost from the predicted images from the intra prediction unit 122 and the inter prediction unit 123, and supplies the predicted image to the calculation units 113 and 120.

Here, the intra prediction unit 122 supplies information related to intra prediction to the variable length coding unit 116 as header information, and the inter prediction unit 123 supplies information related to inter prediction (information of the gap vector, the reference index, and the like) to the variable length coding unit 116 as header information.

The variable length coding unit 116 selects the header information in which the predicted image having a smaller coding cost is generated between the header information supplied from the intra prediction unit 122 and the inter prediction unit 123, and includes the header information in a header of coded data.

[Macroblock Type]

Figure 10:
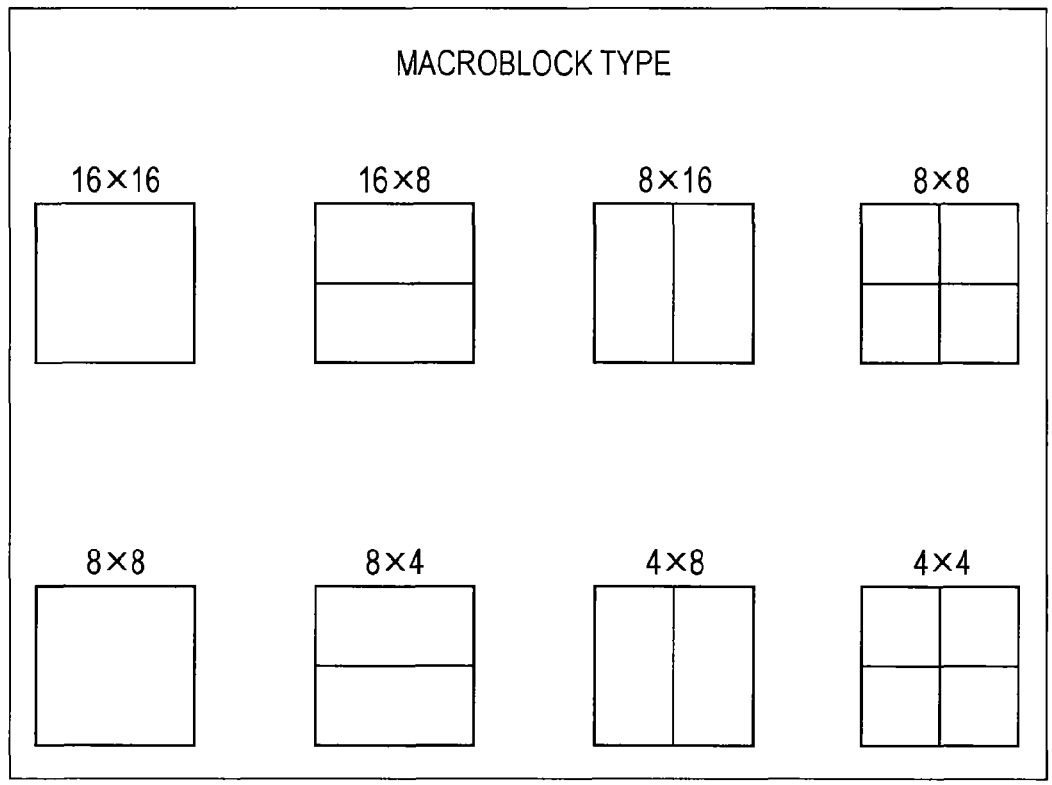
FIG. 10 is a diagram describing a macroblock type in the MVC (AVC) scheme.

FIG. 10 is a diagram describing a macroblock type of the MVC (AVC) scheme.

In the MVC scheme, a macroblock that serves as an object block is a block having the length and breadth of 16×16 pixels, ME (and generation of a predicted image) is performed by dividing the macroblock into partitions, and can be performed for each partition.

That is, in the MVC scheme, the macroblock is divided into any of partitions including 16×16 pixels, 16×8 pixels, 8×16 pixels, and 8×8 pixels, and ME is performed for each partition, and a friction vector (a motion vector or a calculated disparity vector) can be detected.

Further, in the MVC scheme, the 8×8 pixel partitions can be further divided into any of sub partitions including 8×8 pixels, 8×4 pixels, 4×8 pixels, and 4×4 pixels, and ME is performed for each sub partition, and a friction vector (a motion vector or a calculated disparity vector) can be detected.

The macroblock type indicates what kind of partitions (further, sub partitions) the macroblock is divided into.

In the inter prediction of the inter prediction unit 123 (FIG. 9), the coding cost of each macroblock type is calculated as a coding cost of each inter prediction mode, and an inter prediction mode (macroblock type) having the minimum coding cost is selected as the optimum inter prediction mode.

[Predicted Vector (Predicted Motion Vector (PMV))]

Figure 11:
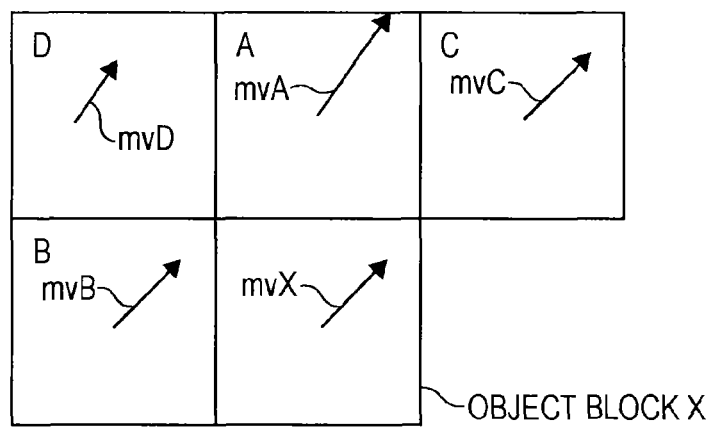
FIG. 11 is a diagram describing a predicted vector (PMV) in the MVC (AVC) scheme.

FIG. 11 is a diagram describing a prediction vector (PMV) of the MVC (AVC) scheme.

In the inter prediction of the inter prediction unit 123 (FIG. 9), a gap vector (a motion vector or a calculated disparity vector) of the object block is detected by ME, and a predicted image is generated using the gap vector.

Since the gap vector is necessary for decoding an image at the decoding side, it is necessary to code information of the gap vector and to include the information in coded data.

However, if the gap vector is coded as it is, the code amount of the gap vector is large, and the coding efficiency may be deteriorated.

That is, in the MVC scheme, as illustrated in FIG. 9, the macroblock is divided into the 8×8 pixel partitions, and each of the 8×8 pixel partitions may be divided into 4×4 pixel sub partitions. In this case, since one macroblock is finally divided into the 4×4 sub partitions, 16 (=4×4) gap vectors may be caused for one macroblock, and if the gap vector is coded as it is, the code amount of the gap vector becomes large, and the coding efficiency is deteriorated.

Therefore, in the MVC (AVC) scheme, vector prediction is performed in which a gap vector is predicted, and a residual of the gap vector with respect to the predicted vector obtained by the vector prediction is coded as information of the gap vector (gap vector information (disparity vector information and motion vector information)).

That is, assuming that a macroblock X is an object block to be coded. Also, for ease of description, the object block X is divided into the 16×16 pixel partitions (the object block X as is recognized as the partitions).

The predicted vector PMVX of the gap vector mvX of the object block X is, as illustrated in FIG. 11, calculated according to the expression (5) using a gap vector mvA of a macroblock A adjacent above the object block X, a gap vector mvB of a macroblock B adjacent to the left of the object block X, and a gap vector mvC of a macroblock C adjacent diagonally right above the object block X from among already coded macroblocks (in the order of raster scan) when the object block X is coded.

$$PMVX = \text{med}(mvA, mvB, mvC) \qquad (5)$$

Here, in the expression (5), med( ) represents a median of the value in the bracket.

Note that, when the gap vector mvC of the macroblock C is unavailable because the object block X is the macroblock at the right edge of the picture, the predicted vector PMVX is calculated using a gap vector mvD of a macroblock D adjacent diagonally left above the object block X in place of the gap vector mvC.

The calculation of the x component and y component of the predicted vector PMVX according to the expression (5) are independently performed.

In the inter prediction unit 123 (FIG. 9), a difference mvX−PMV between the gap vector mvX of the object block X and the predicted vector PMVX is included in the header information as the gap vector information of the object block X.

Figure 12:
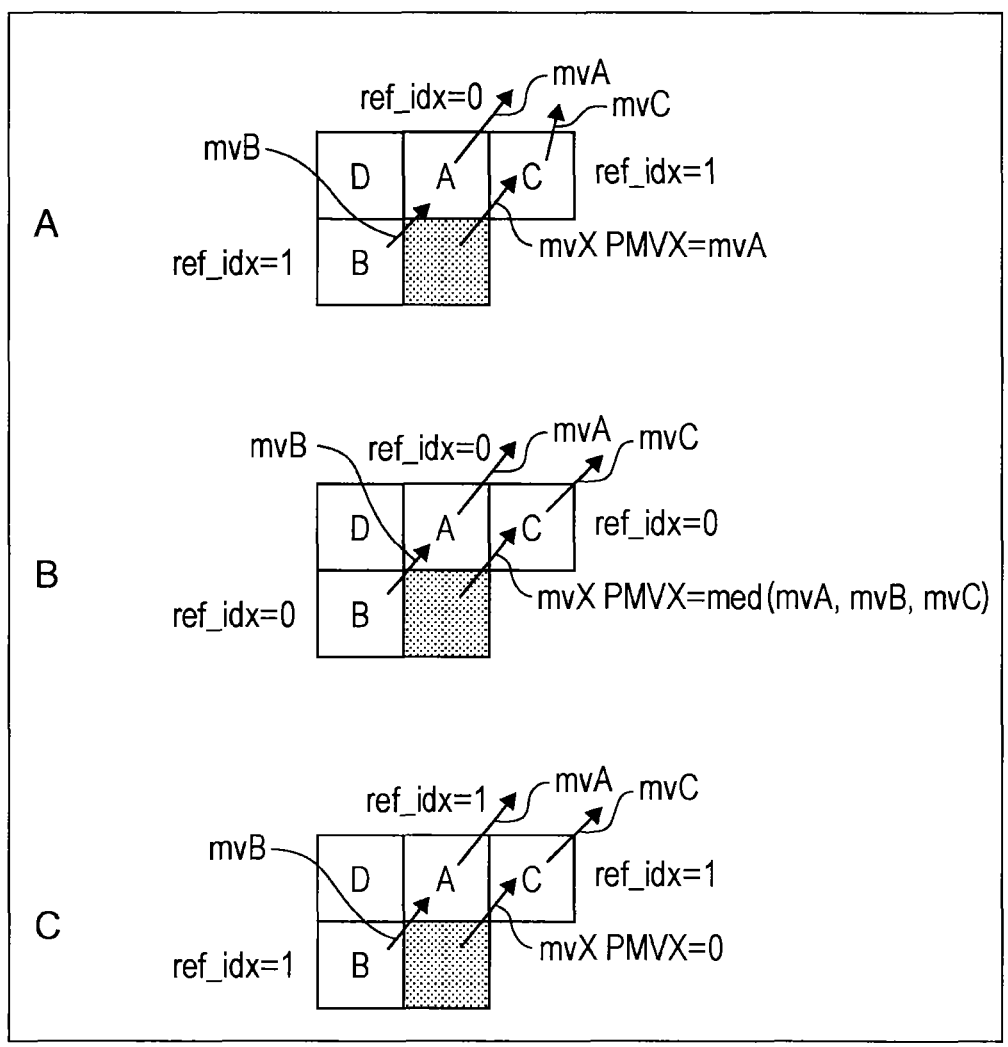
FIG. 12 is a diagram describing a predicted vector of a skip macroblock in the MVC (AVC) scheme.

FIG. 12 is a diagram describing a predicted vector of a skip macroblock of the MVC (AVC) scheme.

As described in FIG. 3, in the MVC scheme, when the object block is coded using the reference picture to which the reference index rev_idx having the value of 0 is allocated, the object block can be recognized as the skip macroblock.

When the object block is recognized as a skip macroblock, the method of generating the predicted vector of the gap vector of the object block differs depending on the reference index (hereinafter, the reference index for prediction) allocated to the reference picture used for the generation of the predicted image of the macroblock around the object block.

Here, the reference picture (the candidate picture that can serves as the reference picture) and the reference index in the MVC (AVC) scheme will be described.

In the AVC scheme, a plurality of pictures can be used as the candidate pictures when a predicted image is generated.

In a codec of the AVC scheme, the candidate pictures are stored in a buffer called DPB after being decoded (locally decoded).

In the DPB, a picture referred in a short period is marked as a short-term reference picture (used for short-term reference), a picture referred in a long period is marked as a long-term reference picture (used for long-term reference), and a picture not referred is marled as a non reference picture (unused for reference), respectively.

There are two types of a control scheme of controlling the DPB: a sliding window process and an adaptive memory control process.

In the sliding window process, the DPB is controlled by a first in first out (FIFO) scheme, and the picture stored in the DPB is released in order from a picture having a smaller frame_num (becomes a non reference picture).

That is, in the sliding window process, an intra (I) picture, a predictive (P) picture, and a Bs picture as a bi-directional predictive) B picture are stored in the DPB as the short-term reference picture.

When as many reference pictures (candidate pictures that can serve as the reference pictures) as the DPB can store are stored in the DPB, an earliest (oldest) short-term reference picture from among the short-term reference pictures stored in the DPB is released.

Note that, when the long-term reference picture is stored in the DPB, the sliding window process does not affect the long-term reference picture stored in the DPB. That is, in the sliding window process, only the short-term reference picture among the reference pictures is controlled by the FIFO scheme.

In the adaptive memory control process, the pictures stored in the DPB are controlled using a command named memory management control operation (MMCO).

According to the MMCO command, for the reference pictures stored in the DPB, setting a short-term reference picture to a non reference picture, setting a short-term reference picture to a long-term reference picture by allocating, to the short-term reference picture, a long-term frame index that is a reference index for controlling the long-term reference picture, setting a maximum value of the long-term frame index, setting all reference pictures to non reference pictures, and the like can be performed.

In the AVC scheme, by performing motion compensation of the reference picture stored in the DPB, inter prediction of generating a predicted image is performed, and the inter prediction of the B picture (including the Bs picture) can use up to two reference pictures. The inter prediction using the two reference pictures are respectively called L0 (List 0) prediction and L1 (List 1) prediction.

As to the B picture (including the Bs picture), as the inter prediction, the L0 prediction or the L1 prediction, or both of the L0 prediction and the L1 prediction are used. As to the P picture, as the inter prediction, only the L0 prediction is used.

In the inter prediction, the reference picture referred in the generation of a predicted image is controlled with a reference picture list.

In the reference picture list, a reference index that is an index for specifying the reference picture (the candidate picture that can serve as the reference picture) referred in the generation of a predicted image is allocated to the reference picture (the candidate picture that can serve as the reference picture) stored in the DPB.

When the object picture is the P picture, as described above, only the L0 prediction is used as the inter prediction of the P picture, and therefore, allocation of the reference index is performed for the L0 prediction.

When the object picture is the B picture (including the Bs picture), as the inter prediction of the B picture, both of the L0 prediction and the L1 prediction may be used, as described above. Therefore, allocation of the reference index is performed for both of the both of the L0 prediction and the L1 prediction.

Here, the reference index for the L0 prediction is also referred to as L0 index, and the reference index for the L1 prediction is also referred to as L1 index.

When the object picture is the P picture, in the default of the AVC scheme (specified value), with respect to the reference pictures stored in the DPB, a reference index (L0 index) having a smaller value is allocated to a reference picture later in the coding order.

The reference index is an integer value of 0 or more, and a minimum value thereof is 0. Therefore, when the object picture is the P picture, 0 as the L0 index is allocated to the reference picture decoded immediately before the object picture.

When the object picture is the B picture (including the Bs picture), in the default of the AVC, with respect to the reference pictures stored in the DPB, the reference index (the L0 index and the L1 index) is allocated in the order of picture order count (POC), that is, in the order of display.

That is, as to the L0 prediction, with respect to the reference pictures temporally before the object picture in the order of display, the L0 index having a smaller value is allocated to a reference number closer to the object picture, and then, with respect to the reference pictures temporally after the object picture in the order of display, the L0 index having a smaller value is allocated to the reference picture closer to the object picture.

Further, as to the L1 prediction, with respect to the reference pictures temporally later than the object picture in the order of display, the L1 index having a smaller value is allocated to the reference picture closer to the object picture, and then, with respect to the reference pictures temporally before the object picture in the order of display, the L1 index having a smaller value is allocated to the reference picture closer to the object picture.

Note that the allocation of the reference indexes (the L0 index and the L1 index) in the default of the AVC scheme is performed for the short-term reference picture.

Allocation of the reference index to the long-term reference picture is performed after the reference index is allocated to the short-term reference picture.

Therefore, in the default of the AVC, the reference index having a larger value is allocated to the long-term reference picture than the short-term reference picture.

In the AVC scheme, the allocation of the reference index can be performed by the default scheme as described above as well as any allocation can be performed using a command called reference picture list reordering (hereinafter, referred to as a RPLR command).

Note that, if there is a reference picture to which the reference index is not allocated after the allocation of the reference index is performed using the RPLR command, the reference index is allocated to the reference picture by the default scheme.

As illustrated in FIG. 12, when the macroblock X is the object block and the object block X is the skip macroblock, the predicted vector PMVX of the gap vector mvX of the object block X is obtained by different methods using the respective reference indexes for prediction of the macroblock A adjacent above the object block X, the macroblock B adjacent to the left of the object block X, and the macroblock C adjacent diagonally right above the object block X (the reference indexes allocated to the reference pictures used for the generation of the predicted images of the respective macroblocks A, B, and C).

That is, as illustrated in FIG. 12A, when only one macroblock for prediction having the reference index ref_idx of 0 exists among the three macroblocks A to C adjacent to the object block X, the gap vector of the one macroblock (the macroblock having the reference index ref_idx for prediction of 0) is recognized as the predicted vector PMVX of the gap vector mvX of the object block X.

Here, in FIG. 12A, only the macroblock A from among the three macroblocks A to C adjacent to the object block X is a macroblock in which a reference index for prediction ref_idx is 0. Therefore, the gap vector mvA of the macroblock A serves as a predicted vector PMVX of (a gap vector mvX of) the object block X.

Further, as illustrated in FIG. 12B, when two or more macroblocks exist in which the reference index for prediction ref_idx is 0 in the three macroblocks A to C adjacent to the object block X, a median of the gap vectors of the two or more macroblocks in which the reference index for prediction ref_idx is 0 serves as the predicted vector PMVX of the object block X.

Here, in FIG. 12B, all of the three macroblocks A to C adjacent to the object block X are the macroblocks in which the reference index for prediction ref_idx is 0. Therefore, the median med (mvA, mvB, and mvC) of the gap vector mvA of the macroblock A, the gap vector mvB of the macroblock B, and the gap vector mvC of the macroblock C serves as the predicted vector PMVX of the object block X.

Further, as illustrated in FIG. 12C, when no macroblock in which the reference index for prediction ref_idx is 0 exists in the three macroblocks A to C adjacent to the object block X, the 0 vector serves as the predicted vector PMVX of the object block X.

Here, in FIG. 12C, since no macroblock in which the reference index for prediction ref_idx is 0 exists in the three macroblocks A to C adjacent to the object block X, the 0 vector serves as the predicted vector PMVX of the object block X.

Note that the residual and the information of the gap vector of the skip macroblock are not coded. Then, in decoding, the predicted vector as it is employed as the gap vector of the skip macroblock, as it is, and a copy of a block (corresponding block) of the reference picture at a position shifted from the skip macroblock by the gap vector becomes a decoding result of the skip macroblock.

Whether the object block is caused to server as the skip macroblock is depending on the specification of the encoder, and is, for example, decided (determined) based on the code amount of the coded data, the code amount of the object block, and the like.

[A Configuration Example of the Encoder 22]

Figure 13:
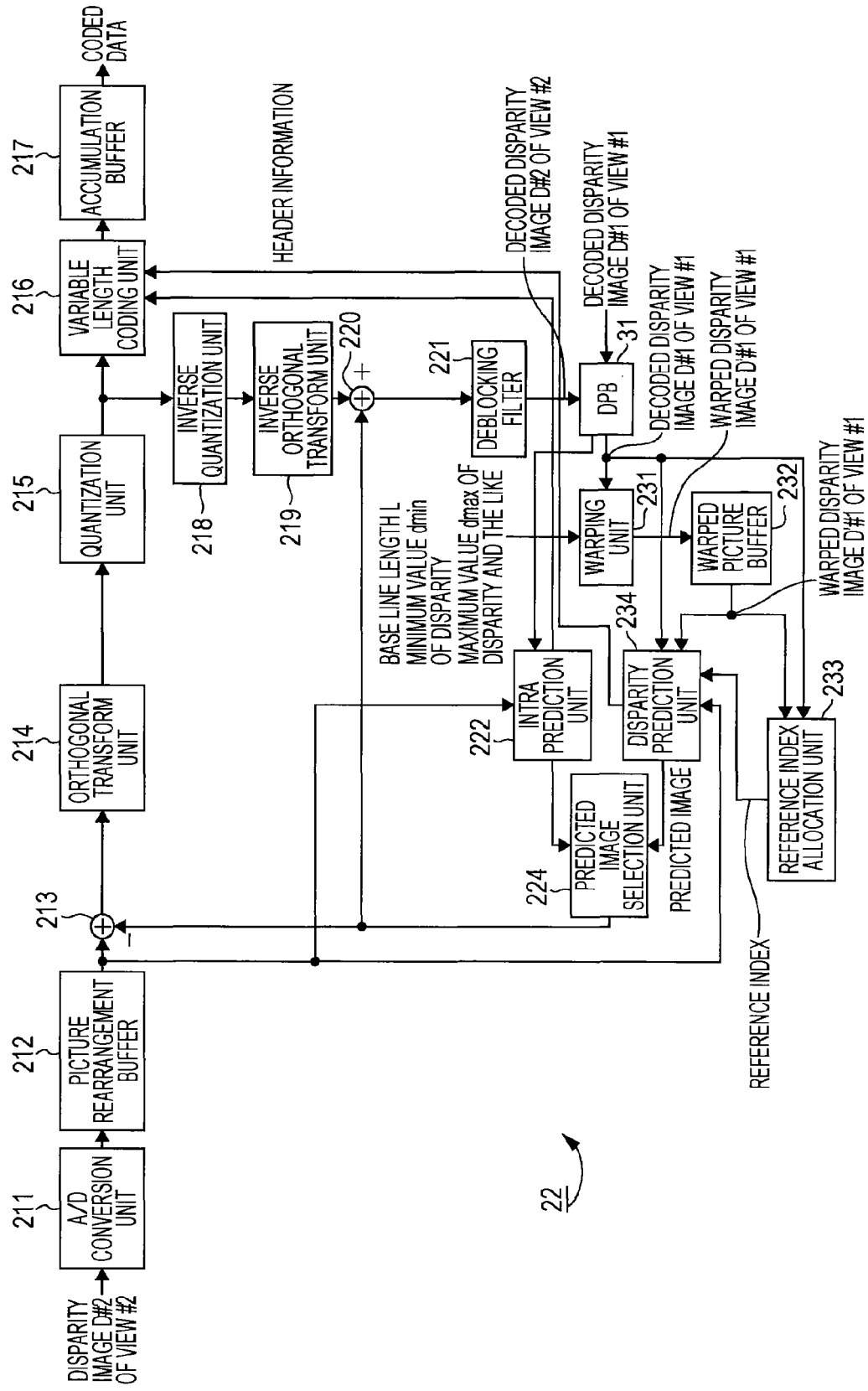
FIG. 13 is a block diagram illustrating a configuration example of an encoder 22.

FIG. 13 is a block diagram illustrating a configuration example of the encoder 22 of FIG. 5.

The encoder 22 codes the disparity image D#2 of the view #2 that is an image to be coded using the MVC scheme, that is, in a manner described in FIG. 3.

In FIG. 13, the encoder 22 includes an A/D conversion unit 211, a picture rearrangement buffer 212, a calculation unit 213, an orthogonal transform unit 214, a quantization unit 215, a variable length coding unit 216, an accumulation buffer 217, an inverse quantization unit 218, an inverse orthogonal transform unit 219, a calculation unit 220, a deblocking filter 221, an intra prediction unit 222, a predicted image selection unit 224, a warping unit 231, a warped picture buffer 232, a reference index allocation unit 233, and a disparity prediction unit 234.

The A/D conversion unit 211, the intra prediction unit 222, and a predicted image selection unit 224 are respectively configured similarly to the A/D conversion unit 111, the intra prediction unit 122, and the predicted image selection unit 124 of the encoder 11 of FIG. 9, and therefore, description thereof is appropriately omitted.

In FIG. 13, a picture of a decoded image, that is, a picture of a disparity image (hereinafter, also referred to as a decoded disparity image) D#2 coded and locally decoded in the encoder 22 is supplied from the deblocking filter 221 to the DPB 31, and is stored in the DPB 31 as a candidate picture that can serve as the reference picture.

Further, as illustrated in FIGS. 5 and 9, the picture of the color image C#1 coded and locally decoded in the encoder 11, the picture of the color image C#2 coded and locally decoded in the encoder 12, and the picture of the disparity image (decoded disparity image) D#1 coded and locally decoded in the encoder 21 are also supplied to and stored in the DPB 31.

In the encoder 22, the picture of the decoded disparity image D#2 from the deblocking filter 221 as well as the decoded disparity image D#1 obtained in the encoder 21 are used for coding the disparity image D#2 that is an object to be coded. Therefore, an arrow indicating that the decoded disparity image D#1 obtained in the encoder 21 is supplied to the DPB 31 is drawn in FIG. 13.

A maximum value dmax, a minimum value dmin, abase line length L, and a focal length f of the taken disparity vector d (the taken disparity vector d1 of the viewpoint #1) are supplied to the warping unit 231 as the disparity-related information (FIG. 5).

The warping unit 231 acquires (reads out) the picture of the decoded disparity image D#1 (the picture of the same time as the object picture) from the pictures of the decoded disparity images D#1 and D#2 stored in the DPB 31.

Then, the warping unit 231 generates a picture of the warped disparity image D'#1 that is a warped image obtained by converting the picture of the decoded disparity image D#1 into an image obtainable in the viewpoint #2 (disparity image) by warping the picture of the decoded disparity image D#1 acquired from the DPB 31 using the disparity-related information, as necessary.

That is, the warping unit 231 converts a disparity value v that is a pixel value of each pixel of the picture of the decoded disparity image D#1 into a taken disparity vector d for each pixel according to the expression (3) using the maximum value dmax and the minimum value dmin of the taken disparity vector d.

Here, in a case where a depth image is used as the disparity information image instead of a disparity image, the depth Z that is a value of the value y before normalization, which is a pixel value of the depth image, is converted into the taken disparity vector d according to the expression (4) using the base line length L and the focal length f.

The warping unit 231 generates a picture of the warped disparity image D'#1 by warping each pixel of the picture of the decoded disparity image D#1 in which the pixel is moved according to the taken disparity vector d of the pixel.

Note that, as described above, an occlusion portion with a hole and having no pixel value nay be caused in the picture of the warped disparity image D'#1 by the warping. However, pixels of the occlusion portion are interpolated by pixel values (disparity values) of surrounding pixels, that is, for example, by a pixel value of a pixel closest to the occlusion portion in the opposite direction to the moving direction in warping.

Here, the pixel closest to the occlusion portion in the opposite direction to the moving direction in warping is a pixel having a disparity value (disparity value of background) that indicates a disparity of the background in the depth side as the pixel value. Therefore, (the pixels of) the occlusion portion is interpolated by the disparity value of the background.

When having generated the picture of the warped disparity image D'#1 by warping the picture of the decoded disparity image D#1, the warping unit 231 supplies the picture of the warped disparity image D'#1 to the warped picture buffer 232.

The warped picture buffer 232 temporarily stores the picture of the warped disparity image D'#1 from the warping unit 231.

Note that, in the present embodiment, the warped picture buffer 232 that stores the picture of the warped disparity image D'#1 is provided separately from the DPB 31. However, the DPB 31 and the warped picture buffer 232 can share one buffer.

The reference index allocation unit 233 recognizes the picture of the decoded disparity image D#1 stored in the DPB 31 and the picture of the warped disparity image D'#1 stored in the warped picture buffer 232 as the candidate pictures that are the candidates for the reference picture, and allocates a reference index to each candidate picture.

The reference index allocation unit 233 then supplies the reference index allocated to the candidate pictures to the disparity prediction unit 234.

Note that the reference index allocation unit 233 allocates the reference index having the value of 1 to the picture of the decoded disparity image D#1 in the picture of the decoded disparity image D#1 and the picture of the warped disparity image D'#1 that are the candidate picture, and allocates the reference index having the value of 0 to the warped disparity image D'#1.

Here, in the MVC (AVC), the code amount of the reference index having the value of 0 is smaller than the code amount of the reference index having the value of 1.

Further, as described in FIG. 4, as to the pictures of the warped disparity image D'#1 and the disparity image D#1, the coding cost of the object block of the picture of the warped disparity image D'#1 is more likely to be smaller than that of the picture of the disparity image D#1, and the warped disparity image D'#1 is more likely to be selected as the reference picture.

Therefore, by allocating the reference index having the value of 0 and having the smaller code amount to the picture of the warped disparity image D'#1 that is more likely to be selected as the reference picture, the coding efficiency can be improved.

The encoder 22 performs processing according to the MVC (AVC) scheme, similarly to the encoder 11 (and the decoders 12 and 21), except that the encoder 22 includes, to the candidate pictures, the warped disparity image D'#1 generated by warping disparity image (decoded disparity image) D#1 of the viewpoint #1 that is different of the viewpoint #2 of the disparity image D#2 as an object to be coded, and allocates the reference index to the warped disparity image D'#1 that is the candidate picture, as described above.

Therefore, when the reference index having the value of 0 allocated to the warped disparity image D'#1 is selected as the reference index for prediction of the object block, that is, when the warped disparity image D'#1 that is the candidate picture to which the reference index having the value of 0 is allocated is selected as the reference picture, the object block can be recognized as the skip macroblock.

Therefore, by allocating the reference index having the value of 0 to the picture of the warped disparity image D'#1 that is more likely to be selected as the reference picture, the possibility of occurrence of the skip macroblock in which information of a residual and a gap vector is not coded becomes high, and therefore, the coding efficiency can be improved.

The disparity prediction unit 234 uses each of the candidate picture to which the reference index is allocated in the reference index allocation unit 233, that is, the picture of the decoded disparity image D#1 stored in the DPB 31, and the picture of the warped disparity image D'#1 stored in the warped picture buffer 232 as the reference picture to perform disparity prediction (generation of a predicted image) of the object block.

Further, the disparity prediction unit 234 calculates, for each of the picture of the decoded disparity image D#1 and the picture of the warped disparity image D'#1 that are the candidate pictures, the coding costs required for coding (prediction coding) of the object block using the predicted images obtained from the candidate pictures by the disparity prediction.

The disparity prediction unit 234 then selects, as a reference index for prediction of the object block, the reference index allocated to the candidate picture to be used for coding of the object block from among the reference indexes allocated to the picture of the decoded disparity image D#1 and the picture of the warped disparity image D'#1 that are the candidate pictures, based on the coding costs, and outputs the reference index to the variable length coding unit 216 as one of the header information.

In addition, the disparity prediction unit 234 supplies, to the predicted image selection unit 224, a predicted image generated by disparity prediction using the candidate picture to which the reference index for prediction of the object block is allocated (the picture of the decoded disparity image D#1 or the picture of the warped disparity image D'#1) as the reference picture.

Note that, in FIG. 13, for ease of description, the disparity prediction unit 234 that performs the disparity prediction in the inter prediction is provided in the encoder 22. However, the encoder 22 can perform the time prediction other than the disparity prediction, similarly to the inter prediction unit 123 of the encoder 11 of FIG. 9.

In the encoder 22, when both of the disparity prediction and the time prediction are performed, the reference index allocation unit 233 allocates the reference index to the pictures of the warped disparity image D'#1 and the decoded disparity image D#1 that are the candidate pictures that can be referred in the disparity prediction as well as to the picture of the decoded disparity image D#2 that is the candidate picture that can be referred in the time prediction (a picture of a different time from the object picture).

Allocation of the reference index in a case where the picture of the warped disparity image D'#1 used for disparity prediction and the picture of the decoded disparity image D#2 used for time prediction are included in the candidate pictures, as described above, will be described below.

Figure 14:
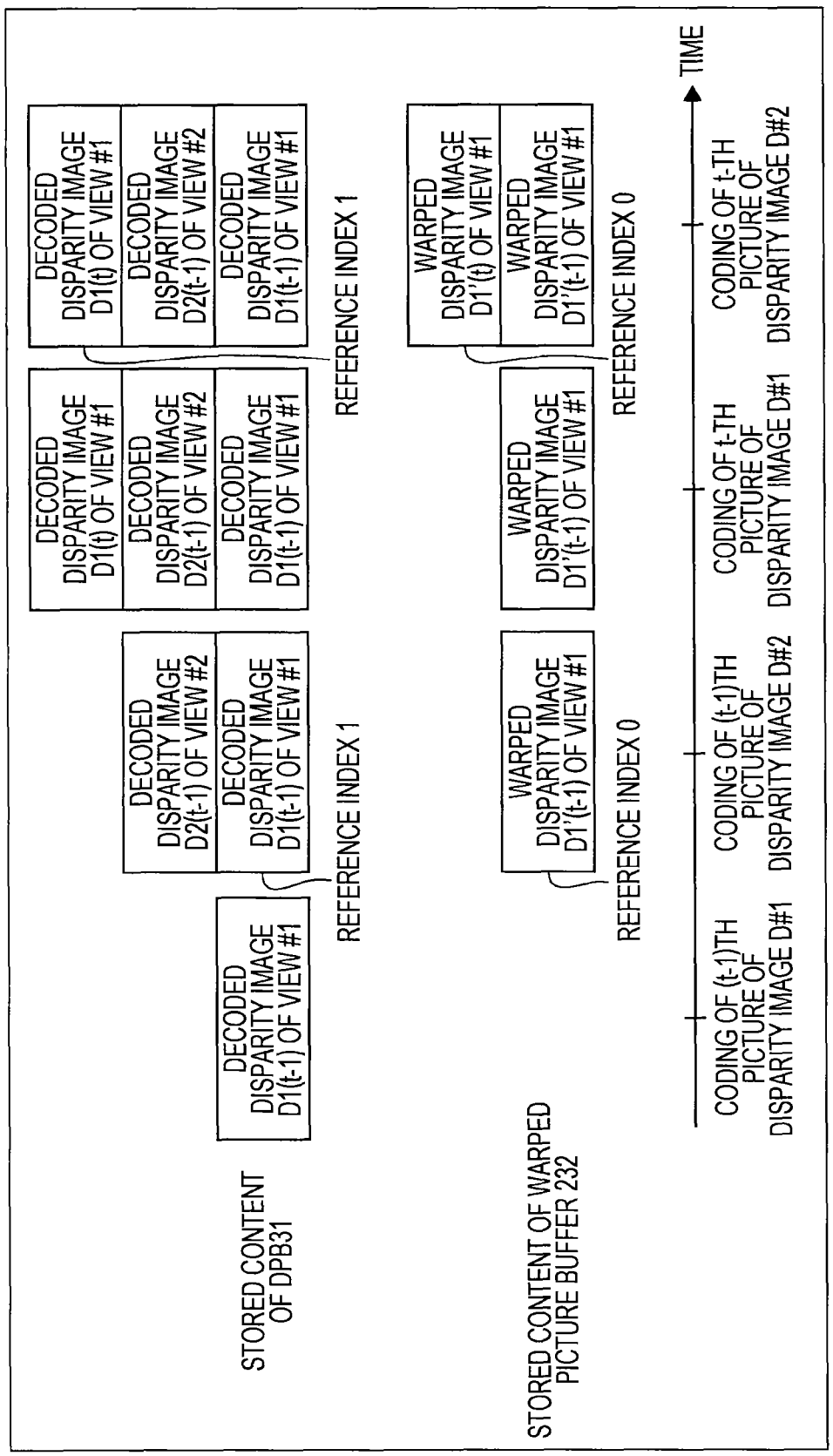
FIG. 14 is a diagram describing a decoded disparity image stored in a DPB 31 and a warped disparity image stored in a warped picture buffer 232.

FIG. 14 is a diagram describing the decoded disparity image stored in the DPB 31 and the warped disparity image stored in the warped picture buffer 232 of FIG. 13.

Focusing on the disparity images D#1 and D#2, the encoders 21 and 22 of the multi-view image encoder of FIG. 5 perform coding in order of a first picture of the disparity image D#1 of the view #1, a first picture of the disparity image D#2 of the view #2, a second picture of the disparity image D#1 of the view #1, a second picture of the disparity image D#2 of the view #2, . . . , as described in FIG. 8.

When a (t−1)th picture D1(t−1) of the disparity image D#1 of the view #1 is coded and locally decoded in the encoder 21, the picture D1(t−1) of the decoded disparity image D#1 obtained by the local decoding is supplied to and stored in the DPB 31.

Following that, in the encoder 22 (FIG. 13), the warping unit 231 warps the picture D1(t−1) of the decoded disparity image D#1 stored in the DPB 31, so that a of the warped disparity image D'#1 is generated, and the picture D1'(t−1) is supplied to and stored in the warped picture buffer 232.

Then, in the encoder 22, the reference index allocation unit 233 allocates the reference index having the value of 0 to the picture D1'(t−1) of the warped disparity image D'#1 stored in the warped picture buffer 232, and allocates the reference index having the value of 1 to the picture D1(t−1) of the decoded disparity image D#1 stored in the DPB 31.

Further, in the encoder 22, a (t−1)th picture D2(t−1) of the disparity image D#2 of the view #2 is coded using the picture D1'(t−1) of the warped disparity image D'#1 or the picture D1(t−1) of the decoded disparity image D#1 to which the reference index is allocated as the reference picture, as necessary, and is locally decoded. The picture D2(*t*−1) of the decoded disparity image D#2 obtained by the local decoding is supplied to and stored in the DPB 31.

As a result, the picture D2(t−1) of the decoded disparity image D#2 and the picture D1(t−1) of the decoded disparity image D#1 are stored in the DPB 31, as illustrated in FIG. 14.

Following that, in the encoder 21, a t-th picture D1(t) of the disparity image D#1 of the view #1 is coded and locally decoded. The picture D1(t) of the decoded disparity image D#1 obtained by the local decoding is supplied to and stored in the DPB 31.

As a result, the picture D1(t) of the decoded disparity image D#1, the picture D2(t−1) of the decoded disparity image D#2, and the picture D1(t−1) of the decoded disparity image D#1 are stored in the DPB 31, as illustrated in FIG. 14.

As described above, when the picture D1(t) of the decoded disparity image D#1 is stored in the DPB 31, the warping unit 231 of the encoder 22 generates the picture D1'(t) of the warped disparity image D'#1 by warping the picture D1(t) of the decoded disparity image D#1 stored in the DPB 31, and supplies the picture D1'(t) to the warped picture buffer 232 and causes the warped picture buffer 232 to store the picture D1'(t).

As a result, the pictures D1'(t) and D1'(t−1) of the warped disparity image D'#1 are stored in the warped picture buffer 232, as illustrated in FIG. 14.

Following that, in the encoder 22, the reference index allocation unit 233 allocates the reference index having the value of 0 to the picture D1'(t) of the warped disparity image D'#1 stored in the warped picture buffer 232, and allocates the reference value having the value of 1 to the picture D1(t) of the decoded disparity image D#1 stored in the DPB 31.

In addition, in the encoder 22, a t-th picture D2(t) of the disparity image D#2 of the view #2 is coded using the picture D1'(t) of the warped disparity image D'#1 or the picture D1(t) of the decoded disparity image D#1 to which the reference index is allocated as the reference picture, as necessary, and is locally decoded.

In the encoders 21 and 22, similar processing is hereinafter performed.

Figure 15:
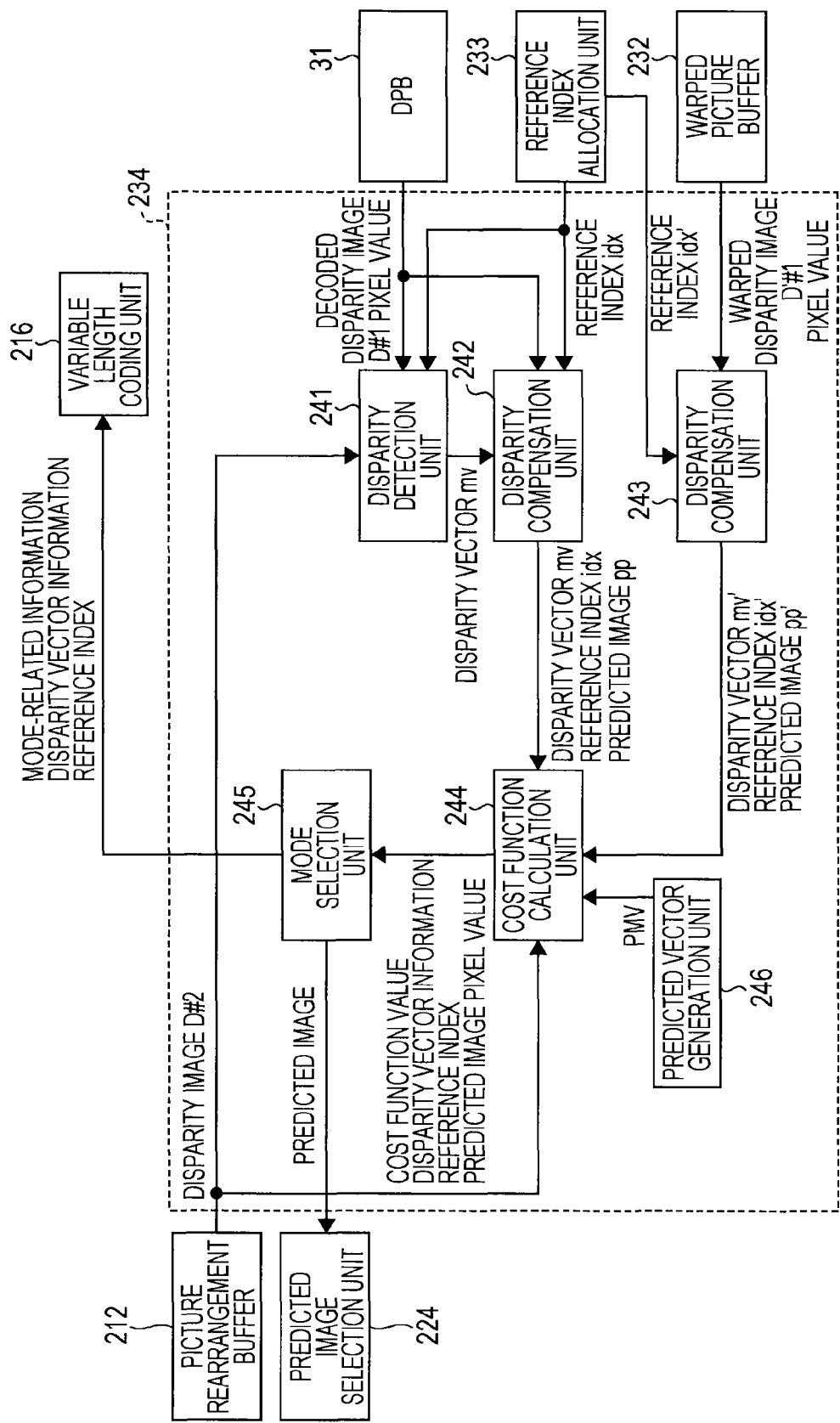
FIG. 15 is a block diagram illustrating a configuration example of a disparity prediction unit 234.

FIG. 15 is a block diagram describing a configuration example of the disparity prediction unit 234 of FIG. 13.

The disparity prediction unit 234 in FIG. 15 includes a disparity detection unit 241, disparity compensation units 242 and 243, a cost function calculation unit 244, a mode selection unit 245, and a predicted vector generation unit 246.

The picture of the decoded disparity image D#1 that is the candidate picture stored in the DPB 31 is supplied to the disparity detection unit 241. Further, to the disparity detection unit 241, the reference index idx (here, 1) allocated to the picture of the decoded disparity image D#1 that is the candidate picture is supplied from the reference index allocation unit 233 and the object block of the picture of the disparity image D#2 to be coded is supplied from the picture rearrangement buffer 212.

The disparity detection unit 241 obtains a gap vector that indicates a gap between the object block and a block (corresponding block) of the picture of the decoded disparity image D#1, which minimizes the SAD between the block and the object block, that is, a calculated disparity vector my that indicates the disparity of the object block with respect to the viewpoint #1, by performing ME using the object block and the picture of the decoded disparity image D#1 that is the candidate picture, similarly to the MVC scheme, and supplies the calculated disparity vector my to the disparity compensation unit 242.

To the disparity compensation unit 242, the gap vector that is the calculated disparity vector my from the disparity detection unit 241 as well as the picture of the decoded disparity image D#1 that is the candidate picture stored in the DPB 31 is supplied. Further, to the disparity compensation unit 242, the reference index idx allocated to the picture of the decoded disparity image D#1 that is the candidate picture is supplied from the reference index allocation unit 233.

The disparity compensation unit 242 generates a predicted image pp of the object block by using the picture of the decoded disparity image D#1 that is the candidate picture as the reference picture, and performing gap compensation (disparity compensation) of the reference picture using the calculated disparity vector my from the disparity detection unit 241, similarly to the MVC scheme.

That is, the disparity compensation unit 242 acquires the corresponding block of the picture of the decoded disparity image D#1, which is a block shifted from the position of the object block by calculated disparity vector mv, as the predicted image pp.

The disparity compensation unit 242 then supplies the predicted image pp to the cost function calculation unit 244 along with the calculated disparity vector my from the disparity detection unit 241 and the reference index idx allocated to the picture of the decoded disparity image D#1 from the reference index allocation unit 233.

The picture of the warped disparity image D'#1 that is the candidate picture stored in the warped picture buffer 232 is supplied to the disparity compensation unit 243. Further, a reference index idx' (here, 0) allocated to the picture of the warped disparity image D'#1 that is the candidate picture is supplied from the reference index allocation unit 233 to the disparity compensation unit 243.

The disparity compensation unit 243 generates the predicted image pp' of the object block by using the picture of the warped disparity image D'#1 that is the candidate picture as the reference picture, and performing, similarly to the MVC scheme, gap compensation (disparity compensation) of the reference picture on the assumption that the calculated disparity vector mv' as the gap vector is the 0 vector.

That is, since the warped disparity image D'#1 is an image obtained by converting the disparity image D#1 into the disparity image obtainable in the viewpoint #2 by warping the disparity image D#1, it is considered that the warped disparity image D'#1 has no disparity with the object block of the disparity image D#2 of the viewpoint #2, and the 0 vector is employed as the calculated disparity vector mv'.

The disparity compensation unit 243 then acquires the corresponding block that is a block at a position shifted from the position of the object block of the picture of the warped disparity image D'#1 by the calculated disparity vector mv'=0, that is, a block at the same position as the object block of the picture of the warped disparity image D'#1 as the predicted image pp.

The disparity compensation unit 243 then supplies the predicted image pp' to the cost function calculation unit 244 along with the calculated disparity vector mv' and the reference index idx' allocated to the picture of the warped disparity image D'#1 from the reference index allocation unit 233.

Note that, here, it is assumed that the calculated disparity vector mv' of the object block with respect to the picture of the warped disparity image D'#1 is the 0 vector. However, as the calculated disparity vector mv' of the object block with respect to the picture of the warped disparity image D'#1, the gap vector obtained by ME using the picture of the warped disparity image D'#1 and the object block can be employed.

To the cost function calculation unit 244, the predicted image pp, the calculated disparity vector mv, and the reference index idx are supplied from the disparity compensation unit 242, the predicted image pp', the calculated disparity vector mv', and the reference index idx' are supplied from the disparity compensation unit 243, the predicted vector is supplied from the predicted vector generation unit 246, and the object block is supplied from the picture rearrangement unit buffer 212.

The cost function calculation unit 244 obtains, regarding the reference index idx (the picture of the decoded disparity image D#1 to which the reference index idx is allocated), the coding cost required for coding the object block for each macroblock type (FIG. 10) according to, for example, the expression (1) as a cost function that calculates the coding cost.

That is, the cost function calculation unit 244 obtains, regarding the reference index idx, a residual vector of the calculated disparity vector my with respect to the predicted vector, and obtains the value MV corresponding to the code amount of the residual vector.

Further, the cost function calculation unit 244 obtains, regarding the reference index idx, the SAD that is a value corresponding to the residual of the object block with respect to the predicted image pp generated from the decoded disparity image D#1 to which the reference index idx is allocated.

The cost function calculation unit 244 then obtains the coding cost of each macroblock type regarding the reference index idx according to the expression (1).

Similarly, the cost function calculation unit 244 obtains, regarding the reference index idx' (the picture of the warped disparity image D'#1 to which the reference index idx' is allocated), the coding cost required for coding the object block for each macroblock.

Note that the cost function for obtaining a coding cost is not limited to the expression (1). That is, other than the above, the coding cost can be obtained, for example, by adding the SAD, a value obtained by multiplying a value corresponding to the code amount of the residual vector by the weight $\lambda 1$, and a value obtained by multiplying a value corresponding to the code amount of the reference index by the weight $\lambda 2$, where $\lambda 1$ and $\lambda 2$ are the weight, and the like.

When having obtained the coding costs (cost function values) of the macroblock types of the respective reference indexes idx and idx', the cost function calculation unit 244 supplies the coding costs to the mode selection unit 245 along with the reference index, the predicted image, and the residual vector (disparity vector information).

The mode selection unit 245 detects a minimum cost that is a minimum value from among the coding costs of the macroblock types of the respective reference indexes idx and idx' supplied from the cost function calculation unit 244.

Further, the mode selection unit 245 selects the reference index and the macroblock type, with which the minimum cost is obtained, as an optimum inter prediction mode.

Note that, in selecting the optimum inter prediction mode, for example, first, a reference index having a smaller coding cost is selected between the reference indexes idx and idx' for each macroblock, and then, a macroblock type having the minimum coding cost is selected only from the reference indexes selected from each macroblock type, so that the reference index and the macroblock type having the minimum cost can be selected as the optimum inter prediction mode.

The mode selection unit 245 then supplies mode-related information that indicates the optimum inter prediction mode, the reference index (reference index for prediction) of the optimum inter prediction mode, the disparity vector information of the optimum inter prediction mode, and the like to the variable length coding unit 216 as the header information.

Further, the mode selection unit 245 supplies the predicted image of the optimum inter prediction mode and the coding cost (minimum cost) to the predicted image selection unit 224.

Note that the mode selection unit 245 determines whether the object block is coded as the skip macroblock based on the minimum cost and the like, when the reference index with which the minimum cost is obtained is the reference index having the value of 0.

When it is determined, in the mode selection unit 245, that the object block is coded as the skip macroblock, the optimum inter prediction mode is recognized as a skip mode in which the object block is coded as the skip macroblock.

The predicted vector generation unit 246 generates the predicted vector by the MVC (AVC) scheme, as described in FIG. 11 and the like, for example, and supplies the predicted vector to the cost function calculation unit 244.

Figure 16:
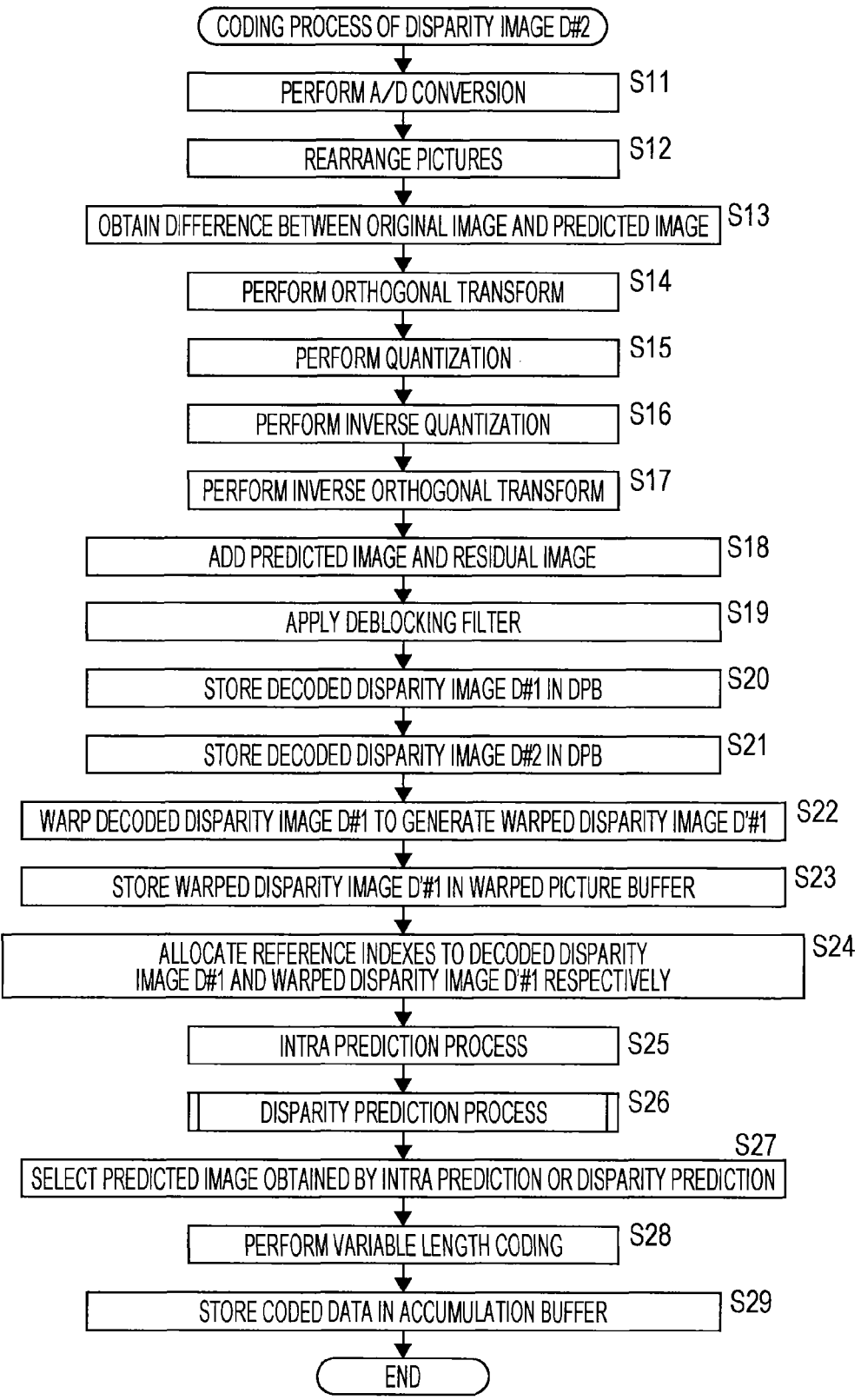
FIG. 16 is a flowchart describing a process of coding a disparity image D#2 of a view #2.

FIG. 16 is a flowchart describing a coding process performed by the encoder 22 of FIG. 13, in which the disparity image D#2 of the view #2 is coded.

In step S11, the A/D conversion unit 211 applies the A/D conversion to the analog signals of the pictures of the disparity image D#2 of the view #2 supplied thereto, and supplies the converted signals of the pictures to the picture rearrangement buffer 212. The process proceeds in step S12.

In step S12, the picture rearrangement buffer 212 temporarily stores the pictures of the disparity image D#2 from the A/D conversion unit 211, and reads out the pictures according to the predetermined structure of the GOP to rearrange the arrangement of the pictures from the display order to the coding order (decoding order).

The pictures read out from the picture rearrangement buffer 212 are supplied to the calculation unit 213, the intra prediction unit 222, and the disparity prediction unit 234, and the process proceeds from step S12 to step S13.

In step S13, the calculation unit 213 recognizes the pictures of the disparity image D#2 from the picture rearrangement buffer 212 as the object pictures to be coded, and recognizes the macroblocks that configure the object pictures as the object blocks to be coded in sequence.

Then, the calculation unit 213 calculates the difference (residual) between the pixel value of the object block and the pixel valve of the predicted image supplied from the predicted image selection unit 224, as necessary, and supplies the residual to the orthogonal transform unit 214. The process proceeds from step S13 to step S14.

In step S14, the orthogonal transform unit 214 applies the orthogonal transform to the object block from the calculation unit 213, and supplies the transform coefficient obtained as a result of the orthogonal transform to the quantization unit 215, and the process proceeds to step S15.

The quantization unit 215 quantizes the transform coefficient supplied from the orthogonal transform unit 214, and supplies the quantized value obtained as a result of the quantization to the inverse quantization unit 218 and the variable length coding unit 216, and the process proceeds to step S16.

In step S16, the inverse quantization unit 218 inversely quantizes the quantized value from the quantization unit 215 into the transform coefficient, and supplies the transform coefficient to the inverse orthogonal transform unit 219, and the process proceeds to step S17.

In step S17, the inverse orthogonal transform unit 219 inversely orthogonally transforms the transform coefficient from the inverse quantization unit 218, and supplies the inversely orthogonally transformed coefficient to the calculation unit 220, and the process proceeds to step S18.

In step S18, the calculation unit 220 obtains the decoded disparity image D#2 that is the decoded (locally decoded) object block by adding the pixel value of the predicted image supplied from the predicted image selection unit 224 to the data supplied from the inverse orthogonal transform unit 219, as necessary. Then, the calculation unit 220 supplies the decoded disparity image D#2 that is the locally decoded object block to the deblocking filter 221, and the process proceeds from step S18 to step S19.

In step S19, the deblocking filter 221 filters the decoded disparity image D#2 from the calculation unit 220, and supplies the filtered data to the DPB 31 (FIG. 5), and the process proceeds to step S20.

In step S20, the DPB 31 waits for the decoded disparity image D#1 to be supplied from the encoder 21 that codes the disparity image D#1, the decoded disparity image D#1 being obtained by coding and locally decoding the disparity image D#1 by the encoder 21, and stores the decoded disparity image D#1, and the process proceeds to step S21.

In step S21, the DPB 31 stores the decoded disparity image D#2 from the deblocking filter 221, and the process proceeds to step S22.

In step S22, the warping unit 231 warps the picture of the decoded disparity image D#1 stored in the DPB 31 to generate the picture of the warped disparity image D'#1, and supplies the picture to the warped picture buffer 232, and the process proceeds to step S23.

In step S23, the warped picture buffer 232 stores the picture of the warped disparity image D'#1 from the warping unit 231, and the process proceeds to step S24.

In step S24, the reference index allocation unit 233 allocates the reference indexes to the picture of the decoded disparity image D#1 stored in the DPB 31 and the picture of the warped disparity image D'#1 stored in the warped picture buffer 232, respectively.

Further, the reference index allocation unit 233 supplies the reference indexes respectively allocated to the picture of the decoded disparity image D#1 and the picture of the warped disparity image D'#1 to the disparity prediction unit 234, and the process proceeds from step S24 to step S25.

In step S25, the intra prediction unit 222 performs intra prediction process of the next object block that is the macroblock next to be coded.

That is, the intra prediction unit 222 performs, regarding the next object block, intra prediction in which the predicted image (predicted image of the intra prediction) is generated from the picture of the decoded disparity image D#2 stored in the DPB 31.

Then, the intra prediction unit 222 obtains the coding cost required for coding the object block using the predicted image of the intra prediction, and supplies the coding cost to the predicted image selection unit 224 along with the predicted image of the intra prediction, and the process proceeds from step S25 to step S26.

In step S26, the disparity prediction unit 234 performs, regarding the next object block, the disparity prediction process treating the picture of the decoded disparity image D#1 and the picture of the warped disparity image D'#1 as the candidate pictures.

That is, the disparity prediction unit 234 obtains, regarding the next object block, the predicted images, the coding costs, and the like for each of the inter prediction modes having different macroblock types and the like by performing the disparity prediction using each of the picture of the decoded disparity image D#1 stored in the DPB 31 and to which the reference index is allocated by the reference index allocation unit 233, and the picture of the warped disparity image D'#1 stored in the warped picture buffer 232 and to which the reference index is allocated by the reference index allocation unit 233.

Further, the disparity prediction unit 234 recognizes the inter prediction mode having the minimum coding cost as the optimum inter prediction mode, and supplies the predicted image of the optimum inter prediction mode to the predicted image selection unit 224 along with the coding cost, and the process proceeds from step S26 to step S27.

In step S27, the predicted image selection unit 224 selects, for example, the predicted image having a smaller coding cost between the predicted image (predicted image of the intra prediction) from the intra prediction unit 222 and the predicted image (predicted image of the inter prediction) from the disparity prediction unit 234, and supplies the coding code to the calculation units 213 and 220. The process proceeds to step S28.

Here, the predicted image selected by the predicted image selection unit 224 in step S27 is to be used in the processes of steps S13 and S18 performed in the coding of the next object block.

Further, the intra prediction unit 222 supplies the information related to the intra prediction obtained in the intra prediction process in step S25 to the variable length coding unit 216 as the header information, and the disparity prediction unit 234 supplies the information related to the disparity prediction (inter prediction) obtained in the disparity prediction process in step S26 (the mode-related information that indicates the optimum inter prediction mode, and the like) to the variable length coding unit 216 as the header information.

In step S28, the variable length coding unit 216 applies the variable length coding to the quantized value from the quantization unit 215, and obtains coded data.

Further, the variable length coding unit 216 selects the header information in which the predicted image having the smaller coding cost is generated between the header information from the intra prediction unit 222 and the disparity prediction unit 234, and includes the selected header information to the header of the coded data.

The variable length coding unit 216 then supplies the coded data to the accumulation buffer 217, and the process proceeds from step S28 to step S29.

In step S29, the accumulation buffer 217 temporarily stores the coded data from the variable length coding unit 216, and outputs the data at a predetermined data rate.

The coded data output from the accumulation buffer 217 is supplied to the multiplexing unit 32 (FIG. 5).

In the encoder 22, the processes of the above-described steps S11 to S29 are repeatedly performed.

Figure 17:
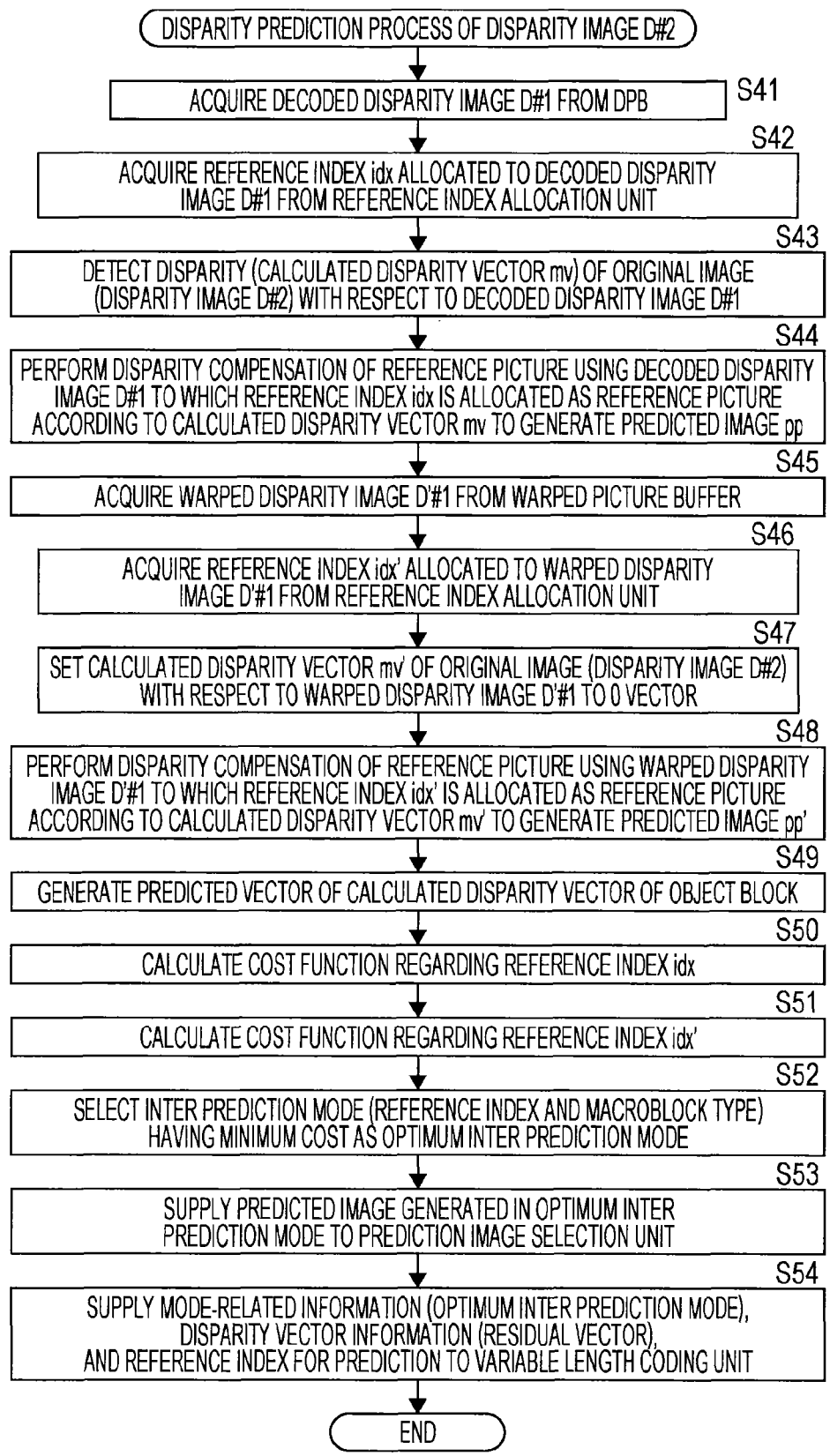
FIG. 17 is a flowchart describing a disparity prediction process.

FIG. 17 is a flowchart describing the disparity prediction process performed by the disparity prediction unit 234 of FIG. 15 in step S26 of FIG. 16.

In step S41, the disparity prediction unit 234 acquires the picture of the decoded disparity image D#1 that is the candidate picture from the DPB 31, and supplies the picture to the disparity detection unit 241 and the disparity compensation unit 242, and the process proceeds to step S42.

In step S42, the disparity prediction unit 234 acquires the reference index idx allocated to the picture of the decoded disparity image D#1 from the reference index allocation unit 233, and supplies the reference index idx to the disparity detection unit 241 and the disparity compensation unit 242, and the process proceeds to step S43.

In step S43, the disparity detection unit 241 detects, by ME, the calculated disparity vector my that indicates the disparity of the (next) object block of the disparity image D#2 that is the original image supplied from the picture rearrangement buffer 212, with respect to the picture of the decoded disparity image D#1 to which the reference index idx from the reference index allocation unit 233 is allocated.

Then, the disparity detection unit 241 supplies the calculated disparity vector my to the disparity compensation unit 242, and the process proceeds from step S43 to step S44.

In step S44, the disparity compensation unit 242 generates the predicted image pp of the object block by treating the picture of the decoded disparity image D#1 as the reference picture and performing the gap compensation (disparity compensation) of the reference picture using the calculated disparity vector my from the disparity detection unit 241.

Then, the disparity compensation unit 242 supplies the predicted image pp to the cost function calculation unit 244 along with the calculated disparity vector my and the reference index idx, and the process proceeds from step S44 to step S45.

In step S45, the disparity prediction unit 234 acquires the picture of the warped disparity image D'#1 that is the candidate picture from the warped picture buffer 232, and supplies the picture to the disparity compensation unit 243, and the process proceeds to step S46.

In step S46, the disparity prediction unit 234 acquires the reference index idx' allocated to the picture of the warped disparity image D'#1 from the reference index allocation unit 233, and supplies the reference index idx' to the disparity compensation unit 243, and the process proceeds to step S47.

In step S47, the disparity compensation unit 243 sets the calculated disparity vector mv' of the picture of the warped disparity image D'#1 of the (next) object block to be the 0 vector, and the process proceeds to step S48.

In step S48, the disparity compensation unit 243 generates the predicted image pp' of the object block by treating the picture of the warped disparity image D'#1 as the reference picture, and performing the gap compensation (disparity compensation) of the reference picture using the calculated disparity vector mv' set to be the 0 vector.

Then, disparity compensation unit 242 supplies the predicted image pp' to the cost function calculation unit 244 along with the calculated disparity vector mv' and the reference index idx', and the process proceeds from step S48 to step S49.

In step S49, the predicted vector generation unit 246 generates the predicted vectors of the calculated disparity vectors my and mv', respectively, and supplies the predicted vectors to the cost function calculation unit 244, and the process proceeds to step S50.

In step S50, the cost function calculation unit 244 obtains the parameters necessary for the calculation by the cost function such as the residual vector between the calculated disparity vector my and the predicted vector, the SAD between the object block and the predicted image pp, and the like based on the (next) object block supplied from the picture rearrangement buffer 212, the predicted image pp supplied from the disparity compensation unit 242, the calculated disparity vector my, the reference index idx, and the predicted vector supplied from the predicted vector generation unit 246.

Further, the cost function calculation unit 244 calculates the coding cost of each macroblock type by calculating the cost function using the parameters regarding the reference index idx (the picture of the decoded disparity image D#1 to which the reference index idx is allocated), and the process proceeds to step S51.

In step S51, the cost function calculation unit 244 obtains the parameters necessary for the calculation by the cost function such as the residual vector between the calculated disparity vector mv' and the predicted vector, the SAD between the object block and the predicted image pp', and the like based on the (next) object block supplied from the picture rearrangement buffer 212, the predicted image pp' supplied from the disparity compensation unit 243, the calculated disparity vector mv', the reference index idx', and the predicted vector supplied from the predicted vector generation unit 246.

Further, the cost function calculation unit 244 calculates the coding cost of each macroblock type by calculating the cost function using the parameters regarding the reference index idx' (the picture of the warped disparity image D'#1 to which the reference index idx' is allocated).

Then, the cost function calculation unit 244 supplies the coding costs (cost function values) of the macroblock types of the respective reference indexes idx and idx' to the mode selection unit 245 along with the reference index, the predicted image, and the residual vector (disparity vector information), and the process proceeds from step S51 to step S52.

In step S52, the mode selection unit 245 detects the minimum cost that is the minimum value from among the coding costs of the macroblock types of the respective reference indexes idx and idx' from the cost function calculation unit 244.

Further, the mode selection unit 245 selects the reference index and the macroblock type with which the minimum cost is obtained as the optimum inter prediction mode, and the process proceeds from step S52 to step S53.

In step S53, the mode selection unit 245 supplies the predicted image of the optimum inter prediction mode and the coding cost (minimum cost) to the predicted image selection unit 224, and the process proceeds to step S54.

In step S54, the mode selection unit 245 supplies the mode-related information that indicates the optimum inter prediction mode, the reference index (reference index for prediction) of the optimum inter prediction mode, the disparity vector information of the optimum inter prediction mode, and the like to the variable length coding unit 216 as the header information, and the process is returned.

[One Embodiment of a Multi-View Image Decoder to which the Present Technology is Applied]

Figure 18:
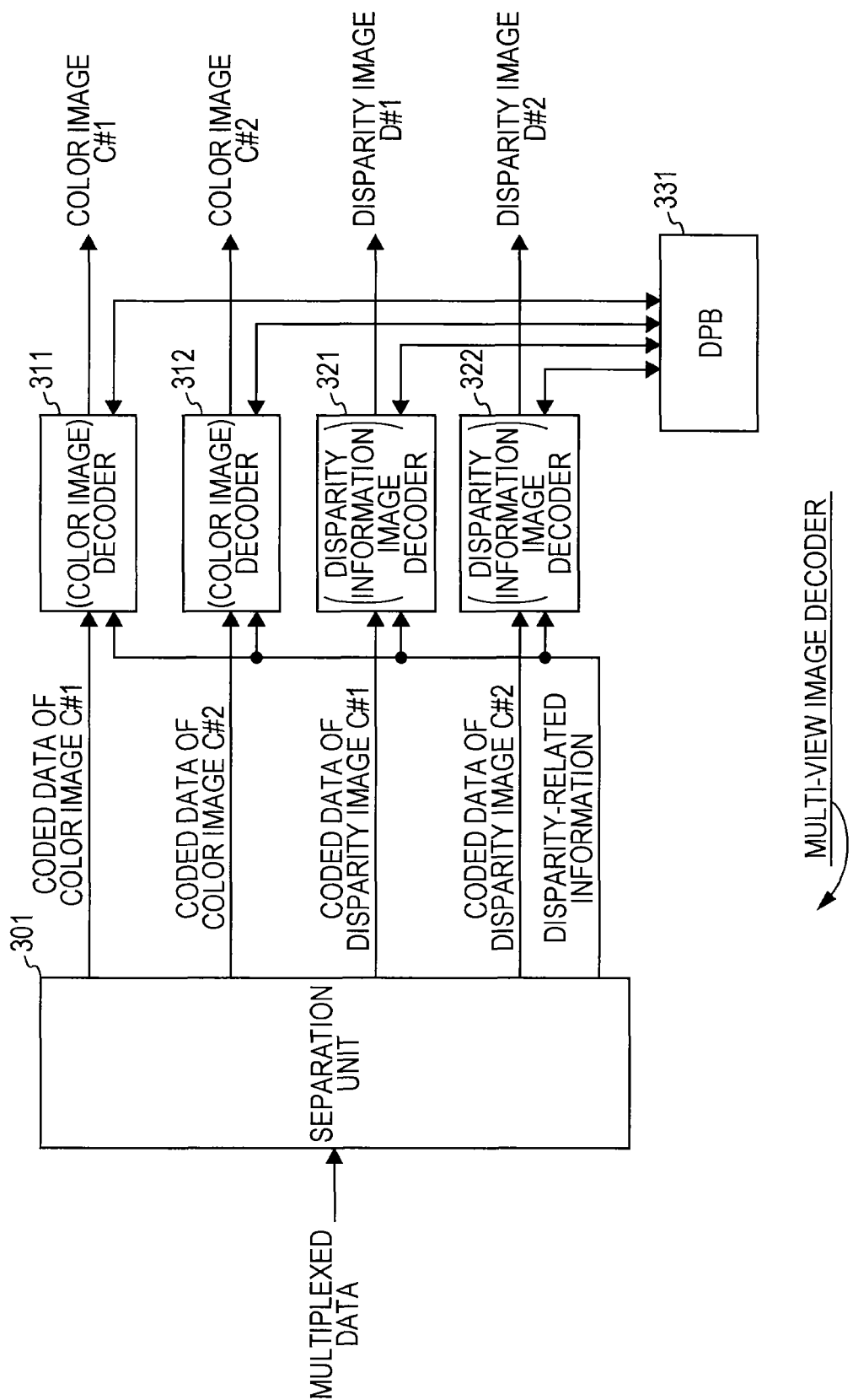
FIG. 18 is a block diagram illustrating a configuration example of one embodiment of a multi-view image decoder to which the present technology is applied.

FIG. 18 is a block diagram illustrating a configuration example of one embodiment of a multi-view image decoder to which the present technology is applied.

The multi-view image decoder of FIG. 18 is, for example, a decoder that decodes coded data of the images from multiple viewpoints using the MVC scheme. Hereinafter, description of processes similar to those of the MVC scheme is appropriately omitted.

Note that the multi-view image decoder is not limited to the decoder using the MVC scheme.

In the multi-view image decoder of FIG. 18, the multiplexed data output by the multi-view image encoder of FIG. 5 is decoded to the color image C#1 of the view #1 and the color image C#2 of the view #2, which are the color images of the two viewpoints #1 and #2, and the disparity image D#1 of the view #1 and the disparity image D#2 of the view #2, which are the disparity information images of the two viewpoints #1 and #2.

In FIG. 18, the multi-view image decoder includes a separation unit 301, decoders 311, 312, 321, and 322, and a DPB 331.

The multiplexed data output by the multi-view image encoder of FIG. 5 is supplied to the separation unit 301 through a recording medium or a transmission medium (not illustrated).

The separation unit 301 separates the coded data of the color image C#1, the coded data of the color image C#2, the coded data of the disparity image D#1, the coded data of the disparity image D#2, and the disparity-related information from the multiplexed data supplied thereto.

Then, the separation unit 301 supplies the coded data of the color image C#1 to the decoder 311, the coded data of the color image C#2 to the decoder 312, the coded data of the disparity image D#1 to the decoder 321, and the coded data of the disparity image D#2 to the decoder 322, respectively, and supplies the disparity-related information to the decoders 311, 312, 321, and 322.

The decoder 311 decodes the coded data of the color image C#1 from the separation unit 301 using the disparity-related information from the separation unit 301, as necessary, and outputs the color image C#1 as a result of the decoding.

The decoder 312 decodes the coded data of the color image C#2 from the separation unit 301 using the disparity-related information from the separation unit 301, as necessary, and outputs the color image C#2 as a result of the decoding.

The decoder 321 decodes the coded data of the color image D#1 from the separation unit 301 using the disparity-related information from the separation unit 301, as necessary, and outputs the color image D#1 as a result of the decoding.

The decoder 322 decodes the coded data of the color image D#2 from the separation unit 301 using the disparity-related information from the separation unit 301, as necessary, and outputs the color image D#2 as a result of the decoding.

The DPB 331 temporarily stores the images after decoding (decoded images) obtained by decoding the images to be decoded in the decoders 311, 312, 321, and 322, respectively, as the candidates of the reference pictures to be referred in generating the predicted images.

That is, the decoders 311, 312, 321, and 322 respectively decode the images subjected to the prediction coding in the encoders 11, 12, 21, and 22 of FIG. 5.

To decode the images subjected to the prediction coding, the predicted images used in the prediction coding are necessary. Therefore, to generate the predicted images used in the prediction coding, the decoders 311, 312, 321, and 322 temporarily store, in the DPB 331, the decoded images to be used for generating the predicted images after decoding the images to be decoded.

The DPB 331 is a shared buffer that temporarily stores the decoded images obtained in the respective decoders 311, 312, 321, and 322, and the decoders 311, 312, 321, and 322 respectively select the reference pictures to be referred to decode the images to be decoded from among the decoded images stored in the DPB 331, and generate the predicted images using the reference pictures.

Since the DPB 331 is shared by the decoders 311, 312, 321, and 322, each of the decoders 311, 312, 321, and 322 can refer to the decoded image obtained by itself as well as the decoded images obtained by other decoders.

[A Configuration Example of the Decoder 311]

Figure 19:
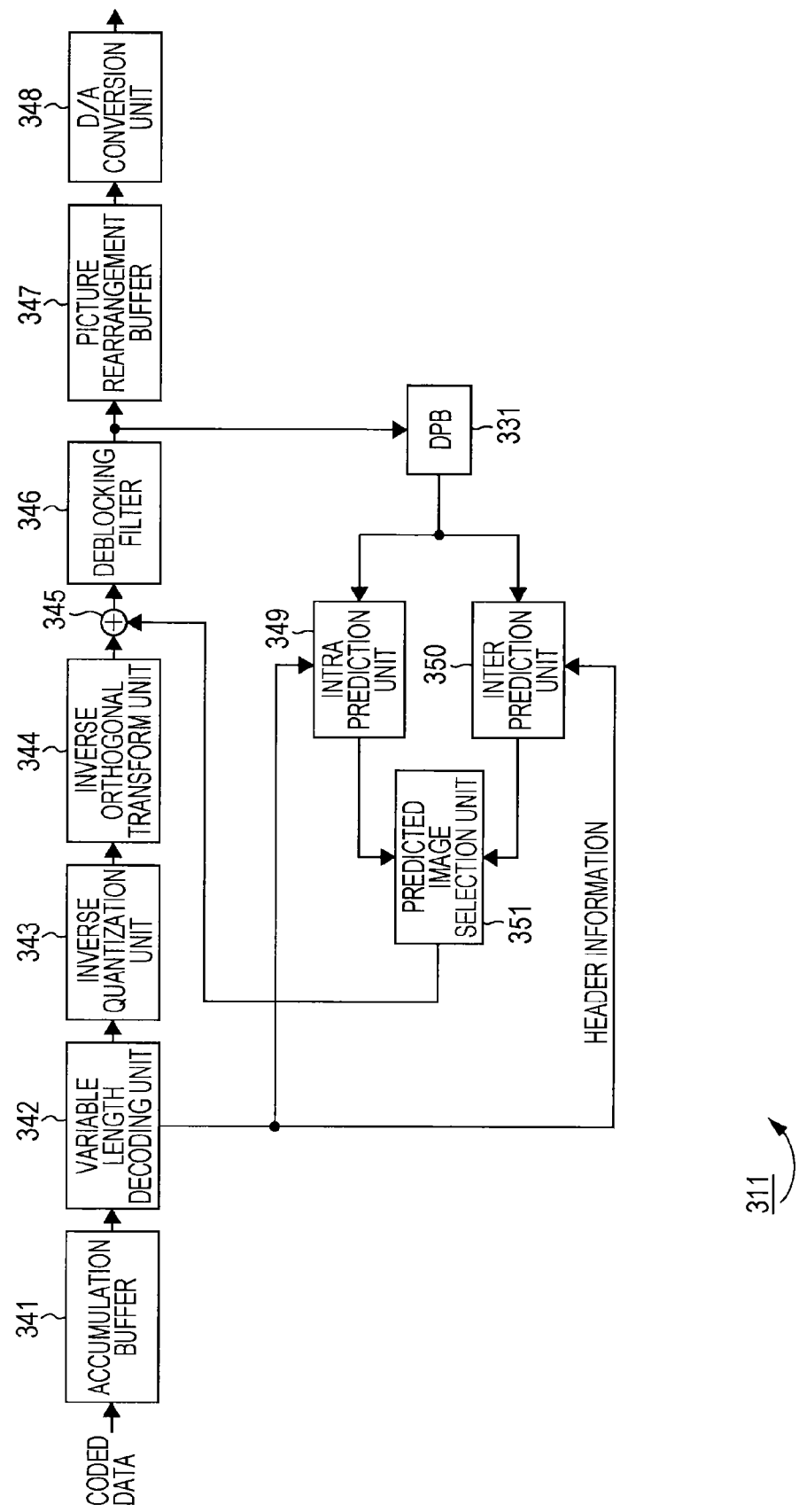
FIG. 19 is a block diagram illustrating a configuration example of a decoder 311.

FIG. 19 is a block diagram illustrating a configuration example of the decoder 311 of FIG. 18.

Note that the decoders 312 and 321 of FIG. 18 are configured similarly to the decoder 311, and for example, perform coding of the images according to the MVC scheme.

In FIG. 19, the decoder 311 includes an accumulation buffer 341, a variable length decoding unit 342, an inverse quantization unit 343, an inverse orthogonal transform unit 344, a calculation unit 345, a deblocking filter 346, a picture rearrangement buffer 347, a D/A conversion unit 348, an intra prediction unit 349, an inter prediction unit 350, and a predicted image selection unit 351.

The coded data of the color image C#1 is supplied from the separation unit 301 (FIG. 18) to the accumulation buffer 341.

The accumulation buffer 341 temporarily stores the coded data supplied thereto, and supplies the coded data to the variable length decoding unit 342.

The variable length decoding unit 342 decodes the quantized value and the header information by applying variable length decoding to the coded data from the accumulation buffer 341. The variable length decoding unit 342 then supplies the quantized valve to the inverse quantization unit 343, and supplies the header information to the intra prediction unit 349 and the inter prediction unit 350.

The inverse quantization unit 343 inversely quantizes the quantized value from the variable length decoding unit 342 into the transform coefficient, and supplies the transform coefficient to the inverse orthogonal transform unit 344.

The inverse orthogonal transform unit 344 inversely orthogonally transforms the transform coefficient from the inverse quantization unit 343, and supplies the inversely orthogonally transformed coefficient to the calculation unit 345 in a unit of macroblock.

The calculation unit 345 obtains the decoded image by using the macroblock supplied from the inverse orthogonal transform unit 344 as the object block to be decoded, and adding the predicted image supplied from the predicted image selection unit 351 to the object block, as necessary, and supplies the decoded image to the deblocking filter 346.

The deblocking filter 346 filters the decoded image from the calculation unit 345 in similar manner to the deblocking filter 121 of FIG. 9, and supplies the filtered decoded image to the picture rearrangement buffer 347.

The picture rearrangement buffer 347 temporarily stores and reads out the pictures of the deeded image from the deblocking filter 346 to rearrange the arrangement of the pictures into the original arrangement (in the display order), and supplies the pictures to the D/A (digital/analog) conversion unit 348.

The D/A conversion unit 348 applies the D/A conversion to the pictures from the picture rearrangement buffer 347 when the pictures need to be output as analog signals, and outputs the analog signals.

Further, the deblocking filter 346 supplies, to the DPB 331, the decoded images of the I picture, P picture, and Bs picture that are referable pictures among the filtered decoded images.

Here, the DPB 331 stores the pictures of the decoded images from the deblocking filter 346, that is, the pictures of the color image C#1 as the candidates of the reference pictures (candidate pictures) referred when the predicted images to be used in decoding performed temporally later are generated.

As described in FIG. 18, since the DPB 331 is shared by the decoders 311, 312, 321, and 322, the DPB 331 stores the picture of the color image C#1 decoded in the decoder 311 as well as the picture of the color image C#2 decoded in the decoder 312, the picture of the disparity image D#1 decoded in the decoder 321, and the picture of the disparity image D#2 decoded in the decoder 322.

The intra prediction unit 349 recognizes whether the object block has been coded using the predicted image generated in the intra prediction based on the header information from the variable length decoding unit 342.

When the object block has been coded using the predicted image generated in the intra prediction, the intra prediction unit 349 reads out, from the DPB 331, the already decoded portion (decoded image) from the picture (object picture) including the object block, similarly to the intra prediction unit 122 of FIG. 9. The intra prediction unit 349 then supplies apart of the decoded image of the object block read out from the DPB 331 to the predicted image selection unit 351 as the predicted image of the object block.

The inter prediction unit 350 recognizes whether the object block has been coded using the predicted image generated in the inter prediction based on the header information from the variable length decoding unit 342.

When the object block has been coded using the predicted image generated in the inter prediction, the inter prediction unit 350 recognizes the reference index for prediction, that is, the reference index allocated to the reference picture used for the generation of the predicted image of the object block based on the header information from the variable length decoding unit 342.

Then, the inter prediction unit 350 reads out the candidate picture allocated to the reference index for prediction from the candidate pictures stored in the DPB 331 as the reference picture.

Further, the inter prediction unit 350 recognizes the gap vector (the disparity vector and the motion vector) used for the generation of the predicted image of the object block based on the header information from the variable length decoding unit 342, and generates the predicted image by performing gap compensation (the motion compensation that compensates the gap of motion, or the disparity compensation that compensates the gap of a disparity) of the reference picture according to the gap vector, similarly to the inter prediction unit 123 of FIG. 9.

That is, the inter prediction unit 350 acquires the block (corresponding block) of the candidate picture at the position moved (shifted) according to the gap vector of the object block from the position of the object block as the predicted image.

The inter prediction unit 350 then supplies the predicted image to the predicted image selection unit 351.

The predicted image selection unit 351 selects the predicted image when the predicted image is supplied from the intra prediction unit 349, and selects the predicted image when the predicted image is supplied from the inter prediction unit 350, and supplies the predicted images to the calculation unit 345.

[A Configuration Example of the Decoder 322]

Figure 20:
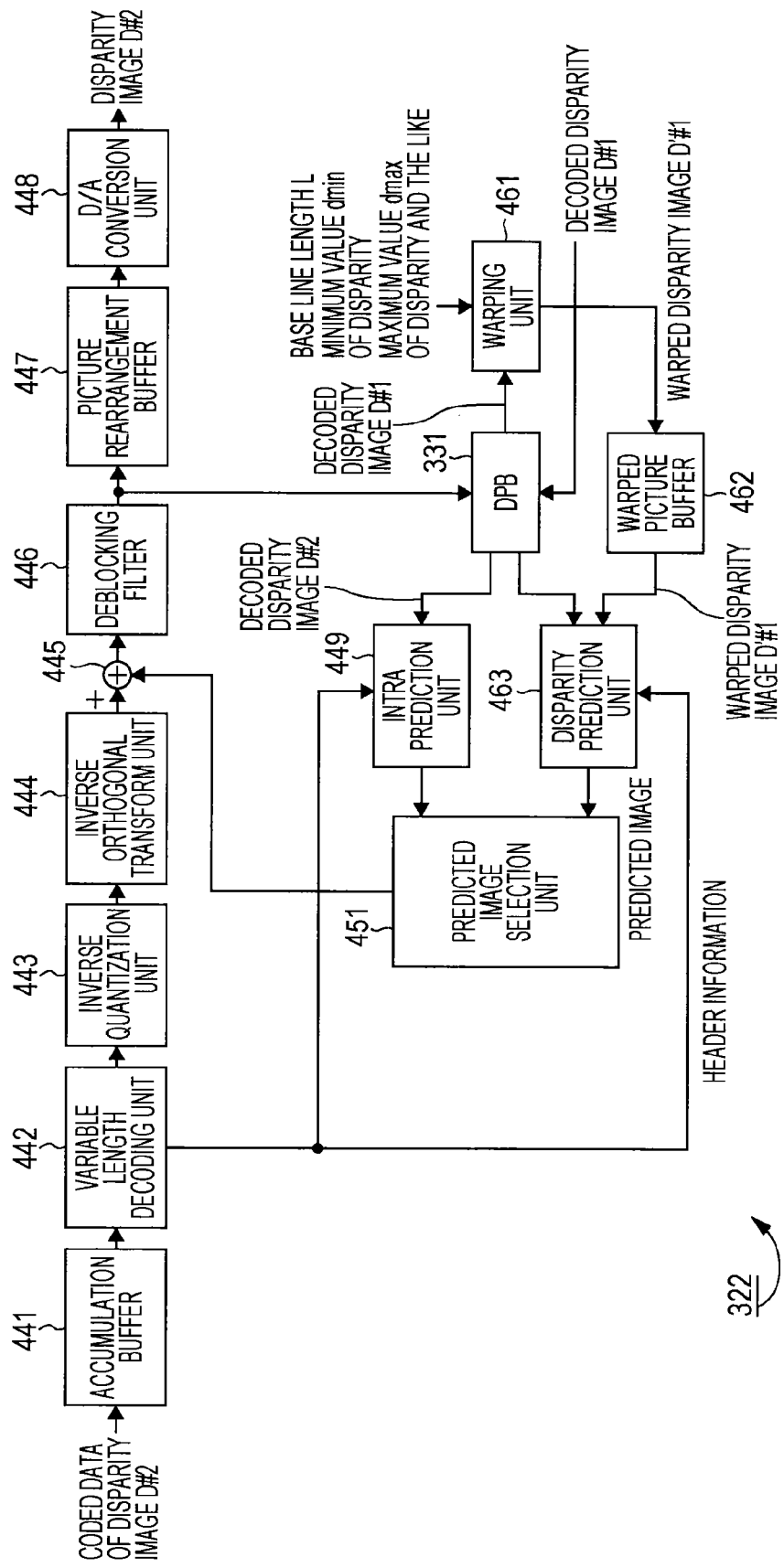
FIG. 20 is a block diagram illustrating a configuration example of a decoder 322.

FIG. 20 is a block diagram illustrating a configuration example of the decoder 322 of FIG. 18.

The decoder 322 locally decodes the coded data of the disparity image D#2 of the view #2 that is the object to be decoded using the MVC scheme, that is, in a similar manner to the local decoding performed in the encoder 22 of FIG. 13.

In FIG. 20, the decoder 322 includes an accumulation buffer 441, a variable length decoding unit 442, an inverse quantization unit 443, an inverse orthogonal transform unit 444, a calculation unit 445, a deblocking filter 446, a picture rearrangement buffer 447, a D/A conversion unit 448, an intra prediction unit 449, a predicted image selection unit 451, a warping unit 461, a warped picture buffer 462, and a disparity prediction unit 463.

The accumulation buffer 441, the intra prediction unit 449, and the predicted image selection unit 451 are respectively configured similarly to the accumulation buffer 341, the intra prediction unit 349, and the predicted image selection unit 351 of FIG. 19, and therefore, description thereof is appropriately omitted.

In FIG. 20, the decoded image, that is, the picture of the decoded disparity image D#2 that is the disparity image decoded in the decoder 322 is supplied from the deblocking filter 446 to the DPB 331, and is stored as the candidate picture that can serve as the reference picture.

Further, as described in FIGS. 18 and 19, the picture of the color image C#1 decoded in the decoder 311, the picture of the color image C#2 decoded in the decoder 312, and the picture of the disparity image (decoded disparity image) D#1 decoded in the decoder 321 are supplied to and stored in the DPB 331.

Note that, in the decoder 322, the picture of the decoded disparity image D#2 from the deblocking filter 446 as well as the decoded disparity image D#1 obtained in the decoder 321 are used for decoding of the disparity image D#2 that is the object to be decoded. Therefore, in FIG. 20, the arrow that indicates the decoded disparity image D#1 obtained in the decoder 321 is supplied to the DPB 331 is drawn.

The maximum value dmax and the minimum value dmin of the taken disparity vector d (the taken disparity vector d1 of the viewpoint #1), the base line length L, and the focal length f as the disparity-related information (FIG. 18) are supplied to the warping unit 461.

The warping unit 461 acquires (reads out) the picture of the decoded disparity image D#1 from the pictures of the decoded disparity images D#1 and D#2 stored in the DPB 331.

The warping unit 461 then warps the picture of the decoded disparity image D#1 obtained from the DPB 331 using the disparity-related information, as necessary, similarly to the warping unit 231 of FIG. 13, to generate the picture of the warped disparity image D'#1 that is the warped image obtained by converting the picture of the decoded disparity image D#1 into an image (disparity image) obtainable in the viewpoint #2.

When having generates the picture of the warped disparity image D'#1 by the warping of the picture of the decoded disparity image D#1, the warping unit 461 supplies the picture of the warped disparity image D'#1 to the warped picture buffer 462.

The warped picture buffer 462 temporarily stores the picture of the warped disparity image D'#1 from the warping unit 461.

Note that, in the present embodiment, the warped picture buffer 462 that stores the picture of the warped disparity image D'#1 is provided, separately from the DPB 331. However the DPB 331 and the warped picture buffer 462 can share one buffer.

The disparity prediction unit 463 recognizes whether the object block has been coded using the predicted image generated in the disparity prediction (inter prediction) based on the header information from the variable length decoding unit 342.

When the object block has been coded using the predicted image generated in the disparity prediction, the disparity prediction unit 463 recognizes (acquires) the reference index for prediction, that is, the reference index allocated to the reference picture used for the generation of the predicted image of the object block based on the header information from the variable length decoding unit 342.

Then, the disparity prediction unit 463 selects the candidate picture to which the reference index for prediction is allocated as the reference picture from the picture of decoded disparity image D#1 as the candidate picture stored in the DPB 331 and the picture of the warped disparity image D'#1 as the candidate picture stored in the warped picture buffer 462.

Further, the disparity prediction unit 463 recognizes the calculated disparity vector as the gap vector used for the generation of the predicted image of the candidate block based on the header information from the variable length decoding unit 342, and generates the predicted image by performing the disparity prediction according to the calculated disparity vector, similarly to the disparity prediction unit 234 of FIG. 13.

That is, the disparity prediction unit 463 acquires the block (corresponding block) of the candidate picture at the position moved (shifted) from the position of the object block according to the calculated disparity vector of the object block.

The disparity prediction unit 463 then supplies the predicted image to the predicted image selection unit 451.

Note that, in FIG. 20, for ease of description, similarly to the encoder 22 of FIG. 13, the disparity prediction unit 463 that performs the disparity prediction from the inter prediction is provided in the decoder 322. However, when the encoder 22 of FIG. 13 performs the disparity prediction as well as the time prediction, the decoder 322 performs the disparity prediction and (generation of the predicted image according to) the time prediction, similarly to the encoder 22.

Figure 21:
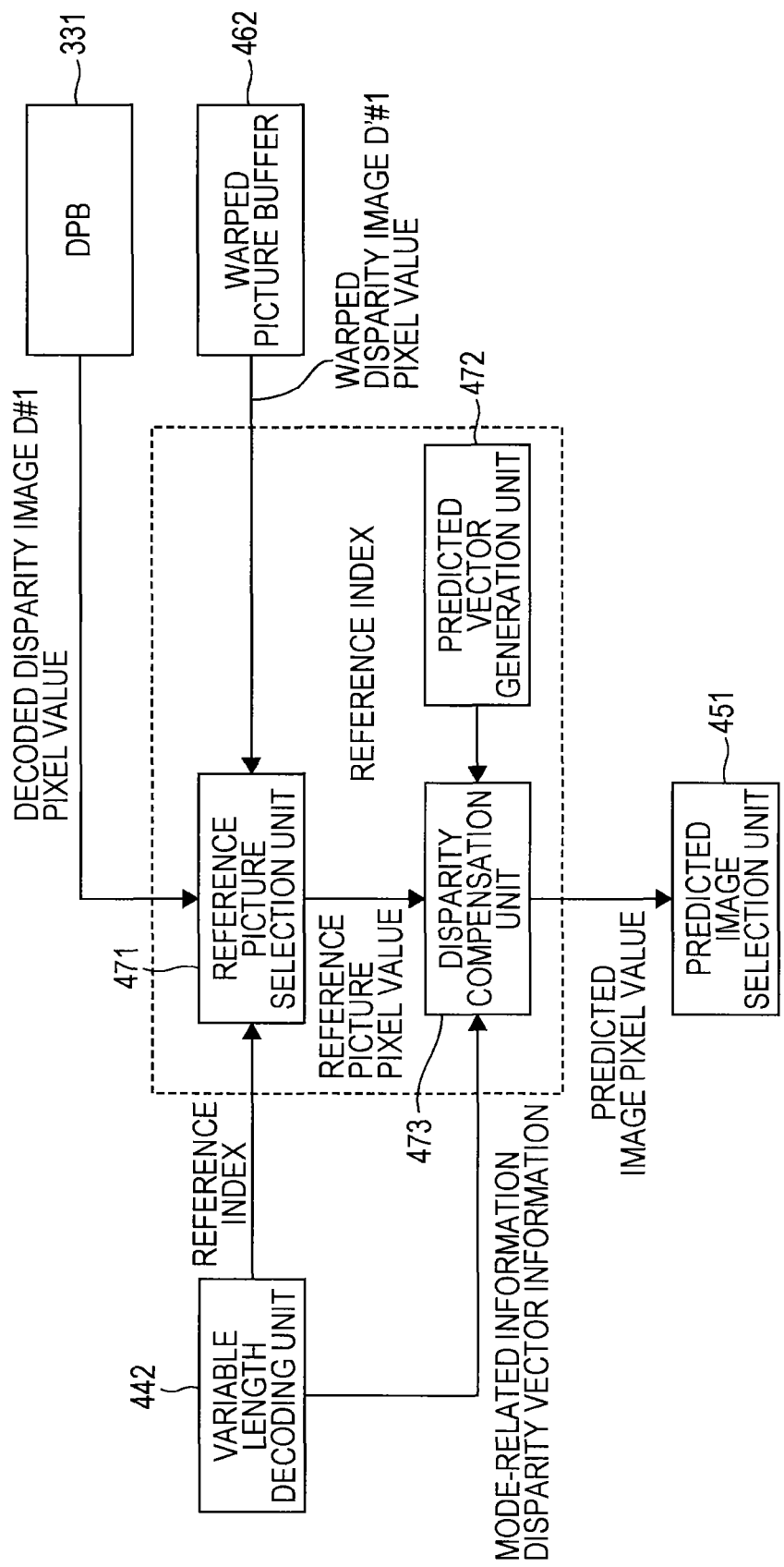
FIG. 21 is a block diagram illustrating a configuration example of a disparity prediction unit 463.

FIG. 21 is a block diagram illustrating a configuration example of the disparity prediction unit 463 of FIG. 20.

In FIG. 21, the disparity prediction unit 463 includes a reference picture selection unit 471, a predicted vector generation unit 472, and a disparity compensation unit 473.

The picture of the decoded disparity image D#1 stored in the DPB 331 and the picture of the warped disparity image D'#1 stored in the warped picture buffer 462 are supplied to the reference picture selection unit 471.

Further, the reference index for prediction of the object block included in the header information is supplied from the variable length decoding unit 442 to the reference picture selection unit 471.

The reference picture selection unit 471 recognizes the picture of the decoded disparity image D#1 stored in the DPB 331 and the picture of the warped disparity image D'#1 stored in the warped picture buffer 462 as the candidates of the reference pictures (candidate pictures), selects the picture to which the reference index for prediction from the variable length decoding unit 442 is allocated between the picture of the decoded disparity image D#1 and the picture of the warped disparity image D'#1 as the reference pictures, and supplies the selected reference picture to the disparity compensation unit 773 along with the reference index for prediction from the variable length decoding unit 442.

The predicted vector generation unit 472 generates the predicted vector similarly to the predicted vector generation unit 246 of FIG. 15, and supplies the predicted vector to the disparity compensation unit 473.

To the disparity compensation unit 473, the reference picture to which the reference index for prediction is allocated is supplied from the reference picture selection unit 471, the predicted vector is supplied from the predicted vector generation unit 473, and the mode-related information included in the header information and the disparity vector information are supplied from the variable length decoding unit 472.

The disparity compensation unit 473 decodes the gap vector as the calculated disparity vector of the object block by adding the residual vector that is the disparity vector information from the variable length decoding unit 472 and the predicted vector from the predicted vector generation unit 472.

Further, the disparity compensation unit 473 generates the predicted image of the object block by performing, similarly to the MVC scheme, gap compensation (disparity compensation) of the reference picture from the reference picture selection unit 471 using the calculated disparity vector of the object block according to the mode-related information (optimum inter prediction mode).

That is, the disparity compensation unit 473 acquires, for example, the corresponding block of the reference picture, which is a block at the position shifted from the position of the object block by the calculated disparity vector, as the predicted image.

The disparity compensation unit 473 then supplies the predicted image to the predicted image selection unit 451.

Figure 22:
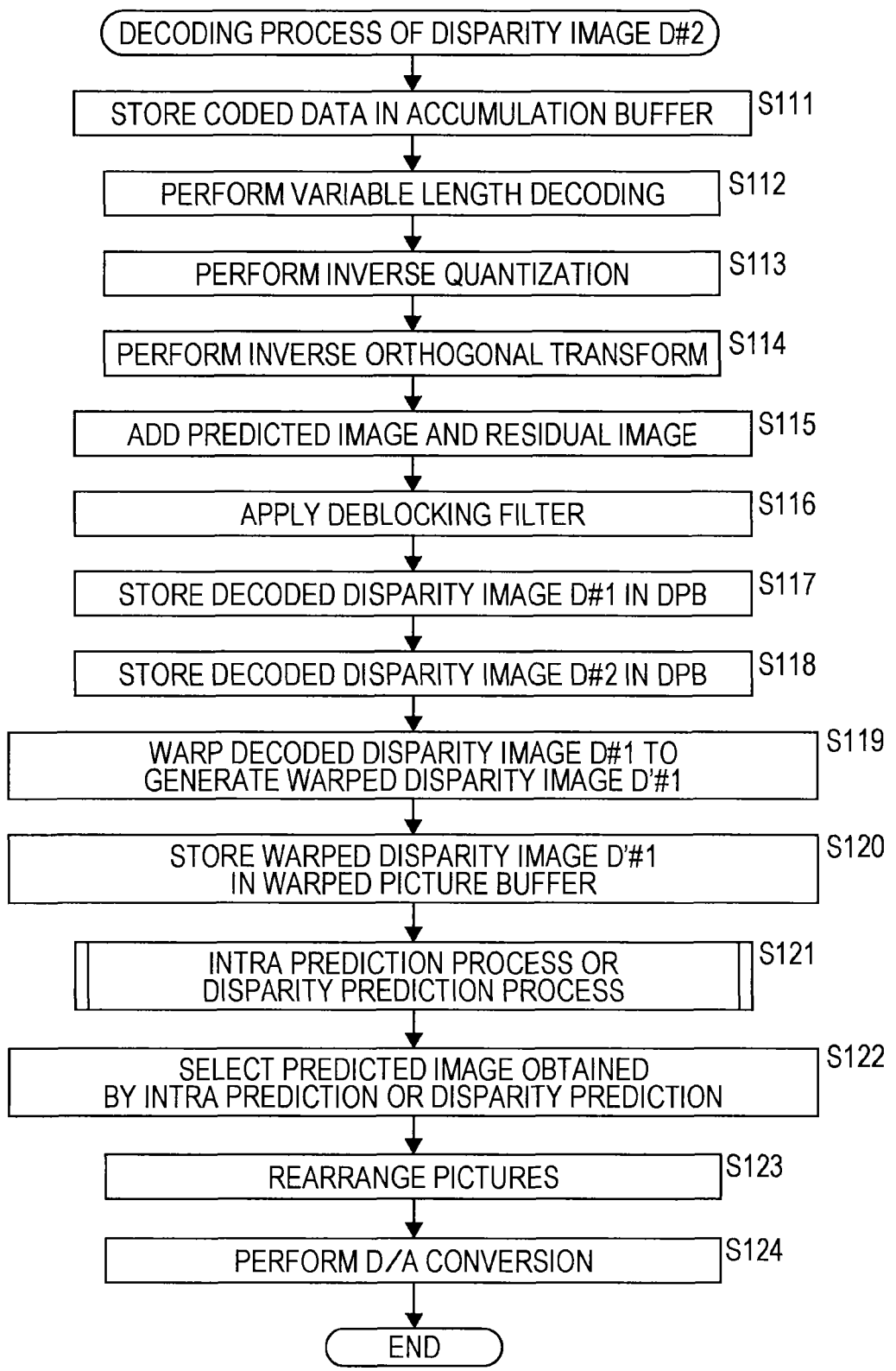
FIG. 22 is a flowchart describing a process of decoding coded data of the disparity image D#2 of the view #2.

FIG. 22 is a flowchart describing a coding process performed by the decoder 322 of FIG. 20, in which the coded data of the disparity image D#2 of the view #2 is decoded.

In step S111, the accumulation buffer 441 stores the coded data of the disparity image D#2 of the view #2 supplied thereto, and the process proceeds to step S112.

In step S112, the variable length decoding unit 442 reads out the coded data and applies the variable length decoding to the coded data stored in the accumulation buffer 441 to decode the quantized value and the header information. The variable length decoding unit 442 then supplies the quantized valve to the inverse quantization unit 443, and supplies the header information to the intra prediction unit 449 and the disparity prediction unit 450, and the process proceeds to step S113.

In step S113, the inverse quantization unit 443 inversely quantizes the quantized value from the variable length decoding unit 442 into the transform coefficient, and supplies the transform coefficient to the inverse orthogonal transform unit 444, and the process proceeds to step S114.

In step S114, the inverse orthogonal transform unit 444 inversely orthogonally transforms the transform coefficient from the inverse quantization unit 443, and supplies the inversely orthogonally transformed coefficient to the calculation unit 445 in a unit of macroblock, and the process proceeds to step S115.

In step S115, the calculation unit 445 obtains the decoded image by using the macroblock from the inverse orthogonal transform unit 444 as the object block to be decoded (residual image) and by adding the predicted image supplied from the predicted image selection unit 451 to the object block, as necessary. The calculation unit 445 then supplies the decoded image to the deblocking filter 446, and the process proceeds from S115 to S116.

In step S116, the deblocking filter 446 filters the decoded image from the calculation unit 445, and supplies the filtered decoded image (decoded disparity image D#2) to the DPB 331 and the picture rearrangement buffer 447, and the process proceeds to step S117.

In step S117, the DPB 331 waits for the decoded disparity image D#1 to be supplied from the decoder 321 that decodes the disparity image D#1, and stores the decoded disparity image D#1, and the process proceeds to step S118.

In step S118, the DPB 331 stores the decoded disparity image D#2 from the deblocking filter 446, and the process proceeds to step S119.

In step S119, the warping unit 461 warps the picture of the decoded disparity image D#1 stored in the DPB 331 to generate the picture of the warped disparity image D'#1, and supplies the warped picture to the warped picture buffer 462, and the process proceeds to step S120.

In step S120, the warped picture buffer 462 stores the picture of the warped disparity image D'#1 from the warping unit 461, and the process proceeds to step S121.

In step S121, the intra prediction unit 449 and the disparity prediction unit 463 recognizes the next object block (the macroblock to be decoded next) has been coded using the predicted image generated by which prediction scheme: the intra prediction or the disparity prediction (inter prediction), based on the header information supplied from the variable length decoding unit 442.

When the next object block is coded using the predicted image generated by the intra prediction, the intra prediction unit 449 performs the intra prediction process.

That is, the intra prediction unit 449 performs the intra prediction for the next object block to generate the predicted image (the predicted image of the intra prediction) from the picture of the decoded disparity image D#2 stored in the DPB 331, and supplies the predicted image to the predicted image selection unit 451. The process proceeds from step S121 to step S122.

When the next object block is coded using the predicted image generated by the disparity prediction (inter prediction), the disparity prediction unit 463 performs the disparity prediction process (inter prediction process).

That is, the disparity prediction unit 463 selects, for the next object block, the picture to which the reference index for prediction of the next object block, which is included in the header information from the variable length decoding unit 442, is allocated, as the reference picture, between the picture of the decoded disparity image D#1 stored in the DPB 331 and the picture of the warped disparity image D'#1 stored in the warped picture buffer 462.

Further, the disparity prediction unit 463 performs the disparity prediction (disparity compensation) using the mode-related information included in the header information from the variable length decoding unit 442 and the disparity vector information to generate the predicted image, and supplies the predicted image to the predicted image selection unit 451, and the process proceeds from step S121 to step S122.

In step S122, the predicted image selection unit 451 selects the predicted image from one to which the predicted image is supplied between the intra prediction unit 449 and the disparity prediction unit 463, and supplies the predicted image to the calculation unit 445, and the process proceeds to step S123.

Here, the predicted image selected by the predicted image selection unit 451 in step S122 is to be used in the process of step S115 performed in the coding of the next block.

In step S123, the picture rearrangement buffer 447 temporarily stores and reads out the pictures of the decoded disparity image D#2 from the deblocking filter 446 to rearrange the arrangement of the pictures into the original arrangement, and supplies the pictures to the D/A conversion unit 448. The process proceeds to step S124.

In step S124, the D/A conversion unit 348 applies the D/A conversion to the pictures and outputs the analog signals when the pictures from the picture rearrangement buffer 447 need to be output as analog signals.

In the decoder 322, the above-described processes of steps S111 to S124 are appropriately repeatedly performed.

Figure 23:
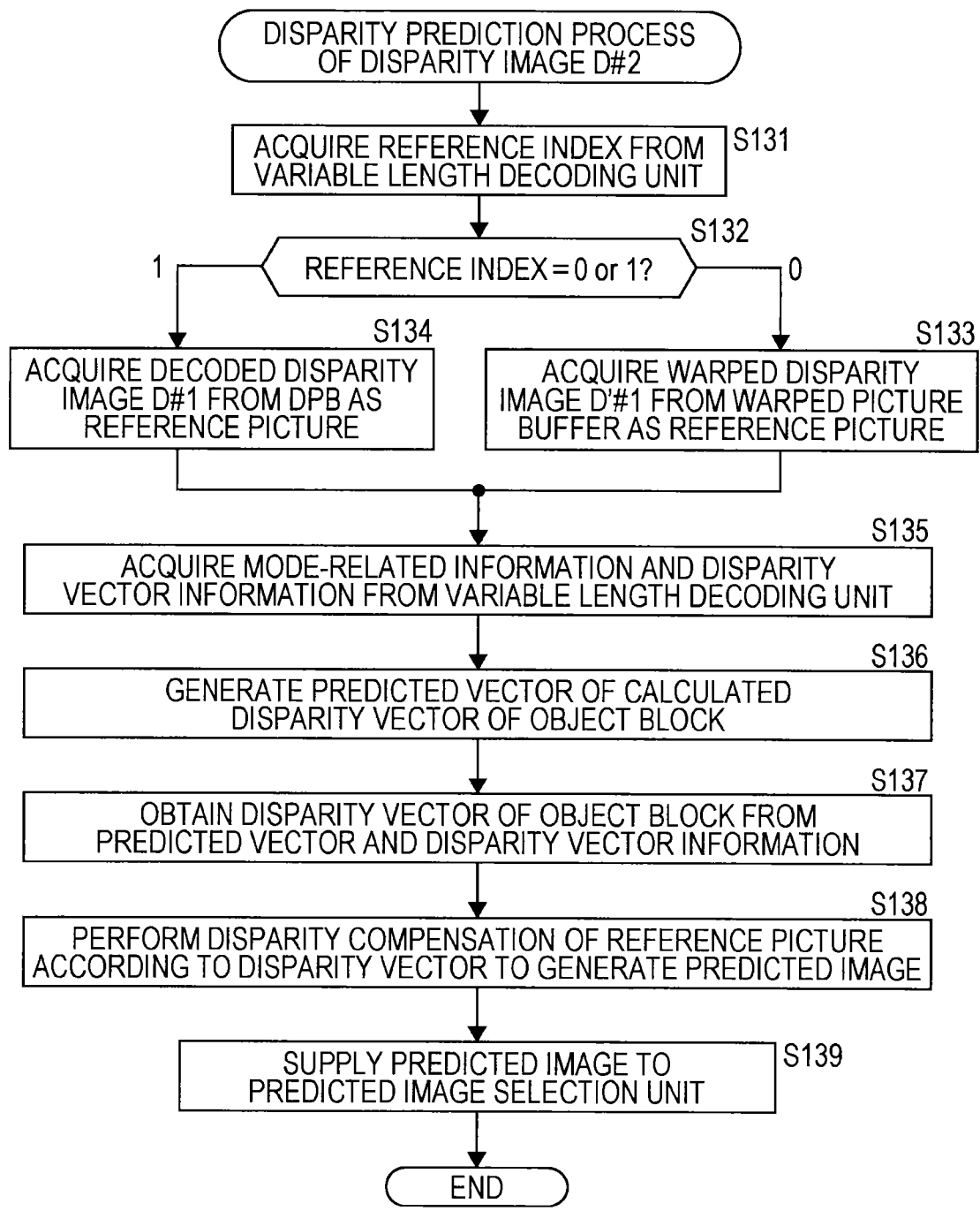
FIG. 23 is a flowchart describing a disparity prediction process.

FIG. 23 is a flowchart describing the disparity prediction process performed by the disparity prediction unit 463 of FIG. 21 in step S121 of FIG. 22.

In step S131, the reference picture selection unit 471 of the disparity prediction unit 463 acquires the reference index for prediction of the (next) object block included in the header information from the variable length decoding unit 442, and the process proceeds to step S132.

In step S132, the reference picture selection unit 471 determines the value of the reference index for prediction.

In step S132, when it is determined that the reference index is 0, the process proceeds to step S133, and the reference picture selection unit 471 acquires, from the warped picture buffer 462, the picture of the warped disparity image D'#1 to which the reference index having the value of 0 is allocated from the picture of the decoded disparity image D#1 and the picture of the warped disparity image D'#1 that are the candidate pictures.

The reference picture selection unit 471 then supplies the picture of the warped disparity image D'#1 to the disparity compensation unit 473 as the reference picture, and the process proceeds from step S133 to step S135.

Further, in step S132, when it is determined that the reference index for prediction is 1, the process proceeds to step S134, and the reference picture selection unit 471 acquires, from the DPB 331, the picture of the decoded disparity image D#1 to which the reference index having the value of 1 is allocated from the picture of the decoded disparity image D#1 and the picture of the warped disparity image D'#1 that are the candidate pictures.

The reference picture selection unit 471 then supplies the picture of the decoded disparity image D#1 to the disparity compensation unit 473 as the reference picture, and the process proceeds from step S134 to step S135.

In step S135, the disparity compensation unit 473 acquires the mode-related information included in the header information from the variable length decoding unit 442 and the disparity vector information (residual vector), the process proceeds to step S136.

In step S136, the predicted vector generation unit 472 generates the predicted vector, and supplies the predicted image to the disparity compensation unit 473, and the process proceeds to step S137.

In step S137, the disparity compensation unit 473 decodes the gap vector as the calculated disparity vector of the object block by adding the residual vector as the disparity vector information from the variable length decoding unit 472 and the predicted vector from the predicted vector generation unit 472, and the process proceeds from step S137 to step S138.

In step S138, the disparity compensation unit 473 generates the predicted image of the object block by performing the gap compensation (disparity compensation) of the reference picture from the reference picture selection unit 471 using the calculated disparity vector of the object block according to the mode-related information. The process proceeds to step S139.

In step S139, the disparity compensation unit 473 supplies the predicted image to the predicted image selection unit 451, and the process is returned.

Here, as described above, coding/decoding in which a reference index is allocated to candidate pictures that include at least a picture of a warped image generated by warping an image of a viewpoint different from an image to be coded/decoded is referred to a warped reference allocation scheme.

The warped reference allocation scheme can be applied to the coding and decoding of a disparity image as well as coding and decoding of a color image.

[Application of a Warped Reference Allocation Scheme to a Color Image]

Figure 24:
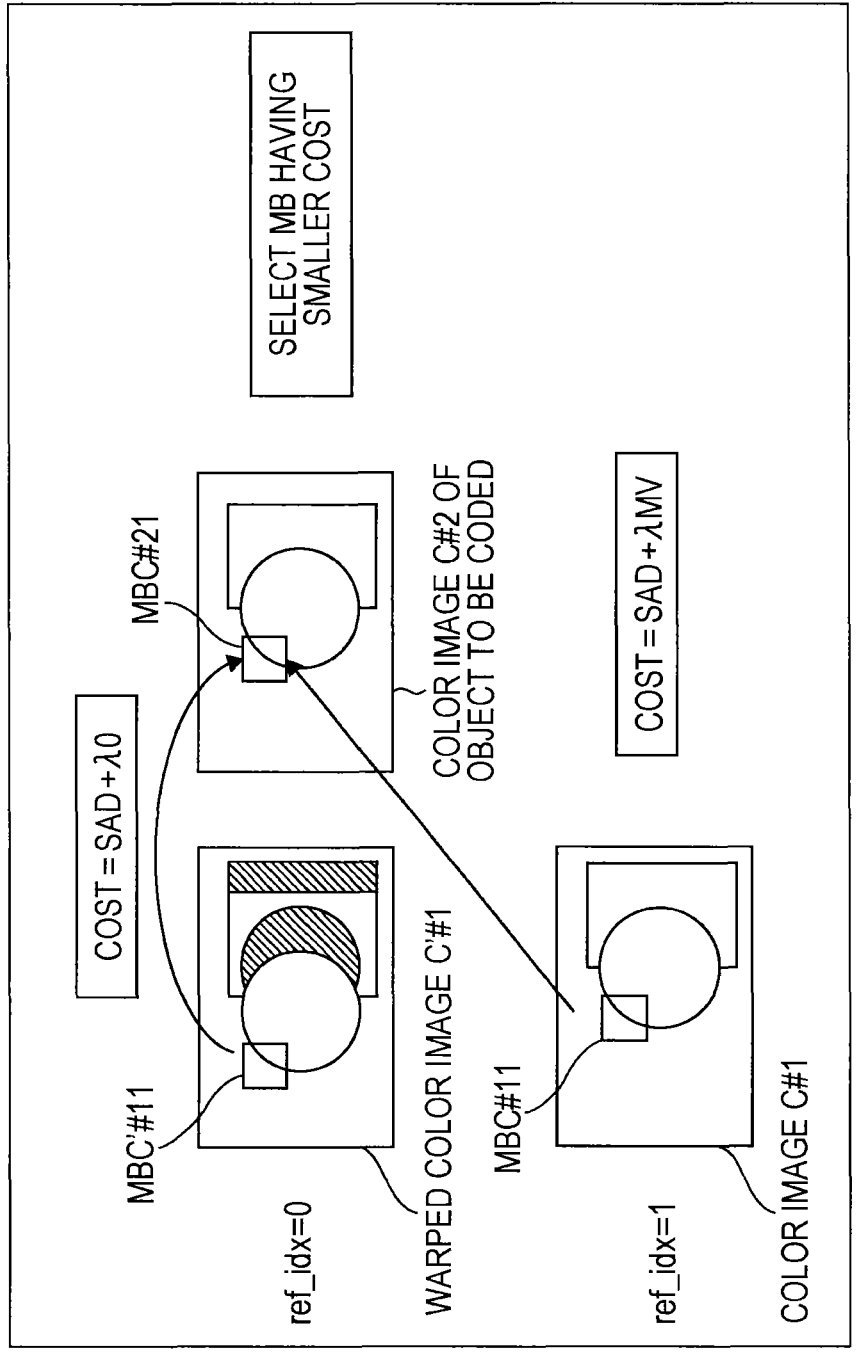
FIG. 24 is a diagram describing a warped reference allocation scheme intended for color images.

FIG. 24 is a diagram describing a warped reference allocation scheme intended for a color image.

In FIG. 24, in coding of the object block of the color image C#2, (a picture of) the warped color image C'#1 generated by warping the (locally decoded) color image C#1 and (a picture of) the color image C#1 are recognized as the pictures (candidate pictures) that can serve as the reference pictures.

When (the picture of) the warped color image C'#1 is used as the reference picture, a block at a position shifted from the position of the block MBC#21 that is the object block of the color image C#2 by the gap vector, that is, the block MBC'#11 at the same position as the object block MBC#21 is acquired by MC as the predicted image, on the assumption that the gap vector is the 0 vector.

Then, for example, the coding cost COST=COST1' required for the coding of the object block MBC#21, of when the warped color image C'#1 is used as the reference picture, is calculated according to the above-described expression (1) using the SAD that is a value corresponding to the residual between the object block MBC#21 and the block MBC'#11 as the predicted image, and the value MV corresponding to the code amount of the gap vector.

Here, the warped color image C'#1 is an image obtained by converting the color image C#1 of the viewpoint #1 into an image viewed from the viewpoint #2, and it can be presumed that there is no disparity (disparity compensation is performed) between the warped color image C'#1 and the color image C#2 of the viewpoint #2. Therefore, similarly to the warped reference allocation scheme for the disparity image, it is assumed that the gap vector is the 0 vector when the warped color image C'#1 is used as the reference picture.

Further, similarly to the warped reference allocation scheme for the disparity images, the value MV corresponding to the code amount of the gap vector employs 0 for the calculation of the coding cost by the expression (1).

Therefore, a coding cost COST1' of when the object block MBC#21 is coded using the warped color image C'#1 as the reference picture is expressed in the expression COST1'=SAD+λ×0=SAD, similarly to the warped reference allocation scheme for the disparity images.

Meanwhile, when (the picture of) the color image C#1 is used as the reference picture, the gap vector (calculated disparity vector) is detected by performing ME between the object block MBC#21 and the color image C#1.

Further, a block (corresponding block) MBC#11 of the color image C#1 at a position shifted from the position of the object block MBC#21 by the gap vector is acquired by MC as the predicted image.

Then, the coding cost COST=COST1 required for coding the object block MBC#21, of when the color image C#1 is used as the reference picture, is calculated according to the expression (1) using the SAD that is a value corresponding to the residual between the object block MBC#21 and the block MBC#11 as the predicted image, and the value MV corresponding to the code amount of the gap vector.

As described above, after the coding cost (the coding cost of the warped color image C'#1) COST1' required for coding the object block MBC#21, of when the warped color image C'#1 is used as the reference picture, and the coding cost (the coding cost of the color image C#1) COST1 required for coding the object block MBC#21, of when the color image C#1 is used as the reference picture are calculated, one having a smaller coding amount between the warped color image C'#1 and the color image C#1 is selected as the reference picture to be used for coding the object block MBC#21 based on the coding costs COST1' and the COST1.

Note that, for the same reason as the warped reference allocation scheme for the disparity images, the reference index ref_idx having the value of 0 (first value) is allocated to the warped color image C'#1, the reference index ref_idx having the value of 1 (second value) is allocated to the color image C#1.

Therefore, according to the warped reference allocation scheme for the color images, effect similar to the warped reference allocation scheme for the disparity images can be obtained.

[A Configuration Example of the Encoder 12 that Codes a Color Image by the Warped Reference Allocation Scheme]

Figure 25:
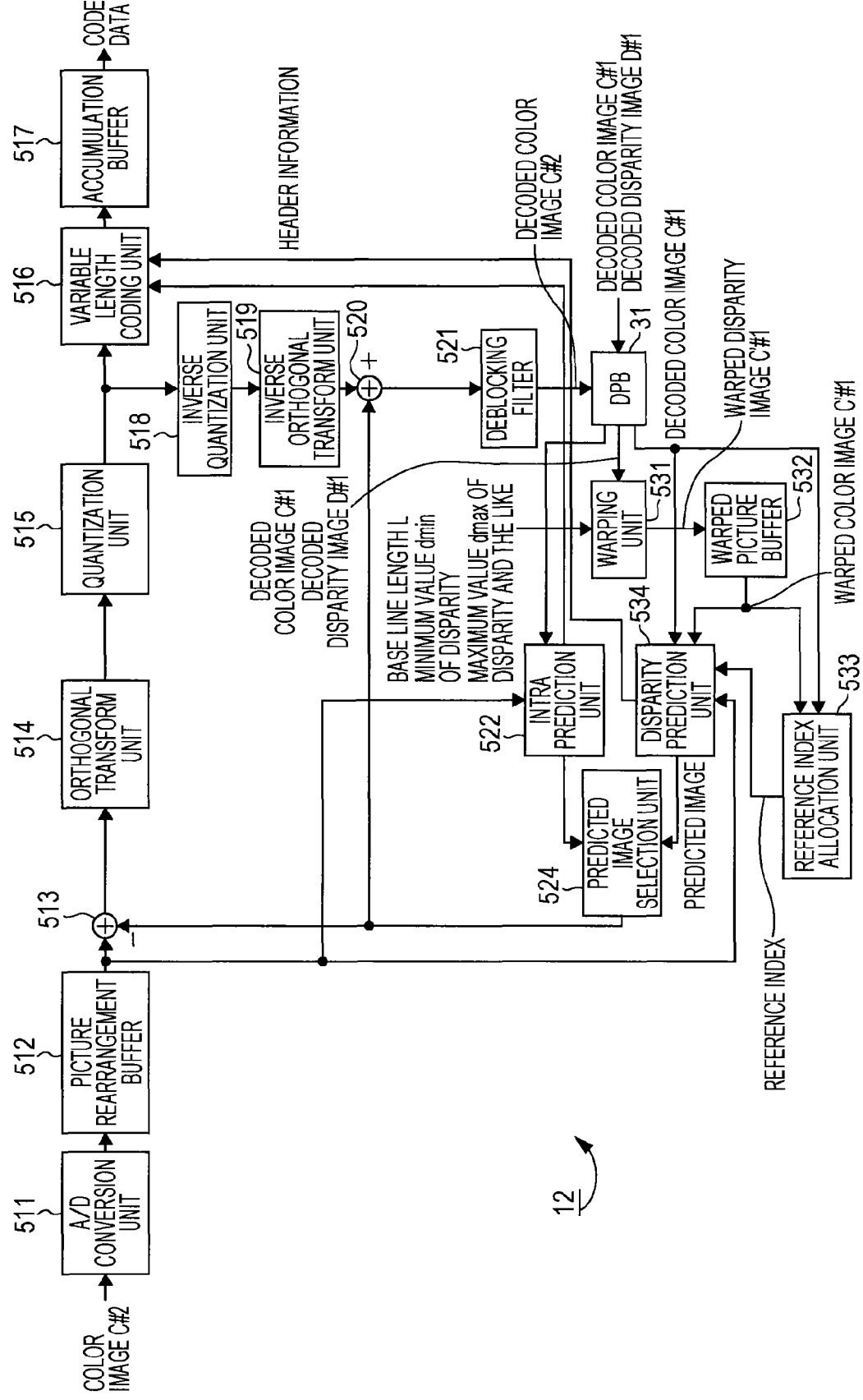
FIG. 25 is a block diagram illustrating a configuration example of an encoder 12 that codes a color image C#2 by the warped reference allocation scheme.

FIG. 25 is a block diagram illustrating a configuration example of the encoder 12 of FIG. 5 in which the color image C#2 is coded by the warped reference allocation scheme.

In FIG. 25, the encoder 12 includes an A/D conversion unit 511, a picture rearrangement buffer 512, a calculation unit 513, an orthogonal transform unit 514, a quantization unit 515, a variable length coding unit 516, an accumulation buffer 517, an inverse quantization unit 518, an inverse orthogonal transform unit 519, a calculation unit 520, a deblocking filter 521, an intra prediction unit 522, a predicted image selection unit 524, a warping unit 531, a warped picture buffer 532, a reference index allocation unit 533, and a disparity prediction unit 534.

The A/D conversion unit 511, the intra prediction unit 522, the predicted image selection unit 524, the warping unit 531, and the disparity prediction unit 534 respectively perform similar processes to the A/D conversion unit 211, the intra prediction unit 222, the predicted image selection unit 224, the warping unit 231, and the disparity prediction unit 234 of the encoder 22 of FIG. 13, except that the processes are intended for a color image instead of a disparity image.

Note that, in FIG. 25, a picture of a decoded image, that is, a picture of a color image C#2 coded and locally decoded in the encoder 12 (hereinafter, also referred to as a decoded color image) is supplied from the deblocking filter 521 to the DPB 31, and is stored as a candidate picture that can serve as the reference picture.

Further, as described in FIGS. 5 and 9, a picture of a color image (decoded color image) C#1 coded and locally decoded in the encoder 11, a picture of a disparity image (decoded disparity image) D#1 coded and locally decoded in the encoder 21, and a picture of a disparity image (decoded disparity image) D#2 coded and locally decoded in the encoder 22 are supplied to and stored in the DPB 31.

Note that, in the encoder 12, the arrows indicating that the picture of the decoded color image C#2 from the deblocking filter 521 as well as the decoded color image C#1 obtained in the encoder 11 and the decoded disparity image D#1 obtained in the encoder 21 are used for coding of the color image C#2 that is the object to be coded. Therefore, in FIG. 25, the arrow indicating that the decoded color image C#1 obtained in the encoder 11 and the decoded disparity image D#1 obtained in the encoder 21 are supplied to the DPB 31 is drawn.

Note that the decoded disparity image D#1 stored in the DPB 31 is used to generate a picture of the warped color image C'#1 that is a warped image obtained by converting the picture of the decoded color image C#1 into an image (color image) obtainable in the viewpoint #2 by warping the picture of the decoded color image C#1 stored in the DPB 31 in the warping unit 531.

That is, the warping unit 531 converts, similarly to the warping unit 231 of FIG. 13, the disparity value v that is a pixel value of each pixel of the picture of the decoded disparity image D#1 into the taken disparity vector d of each pixel according to the expression (3).

The warping unit 531 then generates a picture of the warped color image C'#1 by performing warping in which each pixel of the picture of the decoded color image C#1 is moved according to the taken disparity vector d of the pixel.

Note that, when an occlusion portion with a hole and having no pixel value is caused in the picture of the warped color image C'#1, pixels of the occlusion portion are interpolated by surrounding pixels.

Here, as described in FIG. 2, as to the warped color image C'#1 obtained by warping the color image C#1, when the occlusion portion is interpolated by the surrounding pixels, the correlation between the occlusion portion and a portion of the color image C#2 at the same position as the occlusion portion is not so high.

As a result, when the object block of the color image C#2 includes a portion at the same position as the occlusion portion of the warped color image C'#1, the coding cost of where the picture of the warped color image C'#1 is used as the reference picture is large. However, in that case, the picture of the color image C#1 that is another candidate picture is selected, and therefore, there is no problem.

Figure 26:
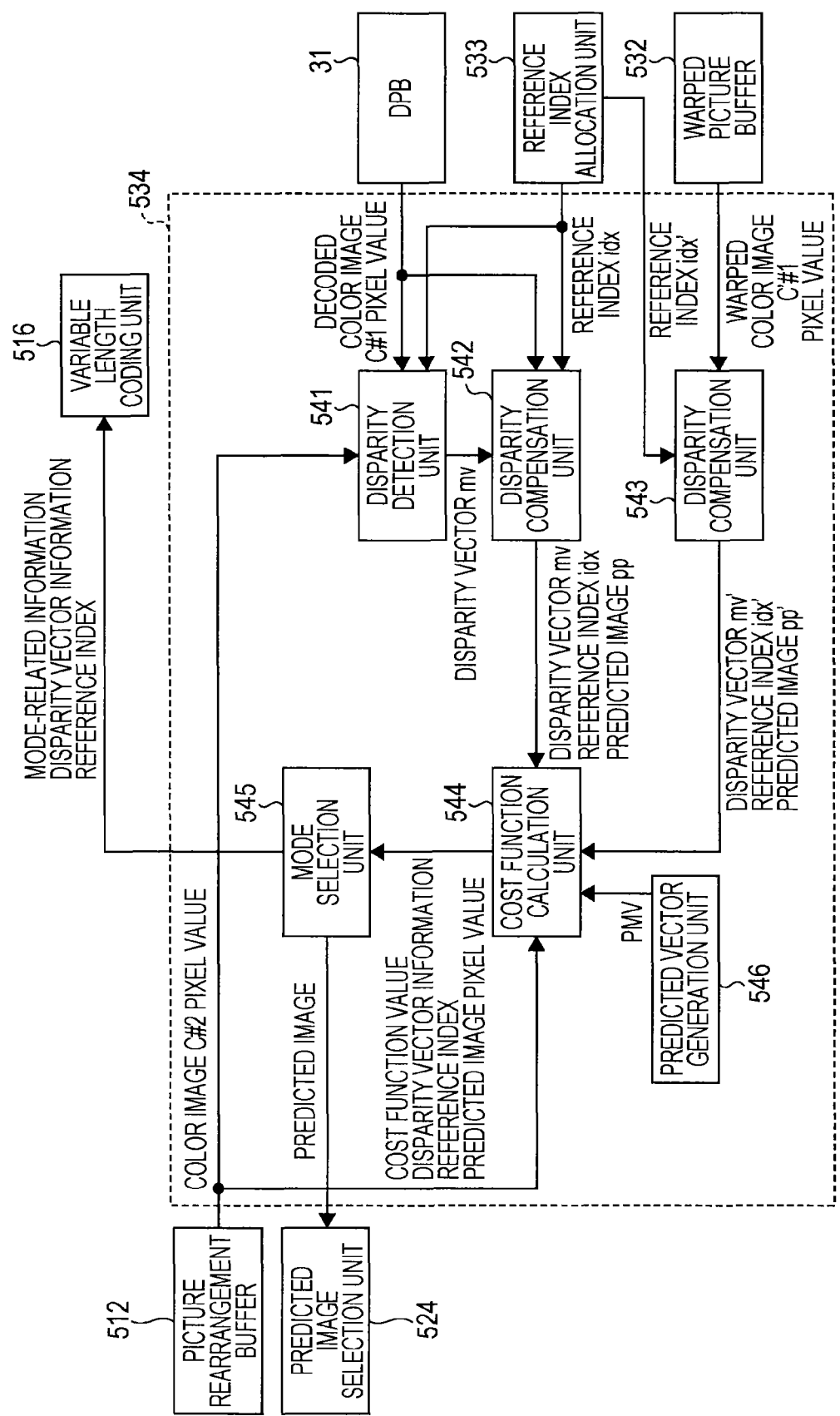
FIG. 26 is a block diagram illustrating a configuration example of a disparity prediction unit 534.

FIG. 26 is a block diagram illustrating a configuration example of the disparity prediction unit 534 of FIG. 25.

FIG. 26 is a block diagram illustrating a configuration example of the disparity prediction unit 534 of FIG. 25.

In FIG. 26, the disparity prediction unit 534 includes a disparity detection unit 541, disparity compensation units 542 and 543, a cost function calculation unit 544, a mode selection unit 545, and a predicted vector generation unit 546.

The disparity detection unit 541 and the predicted vector generation unit 546 respectively perform similar processes to the disparity detection unit 241 and the predicted vector generation unit 246 of FIG. 15 except that the processes is intended for a color image instead of a disparity image.

Figure 27:
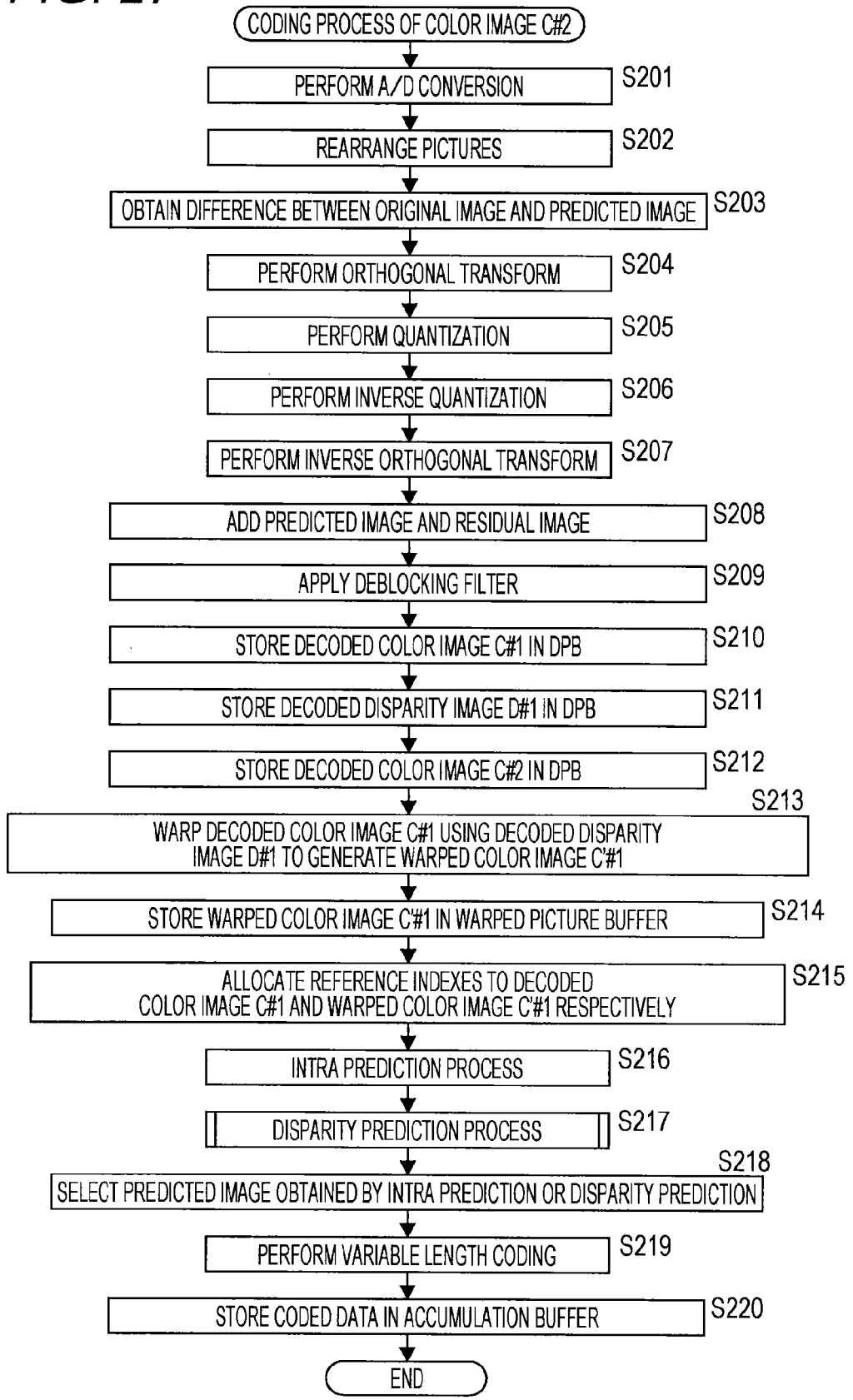
FIG. 27 is a flowchart describing a process of coding the color image C#2 of the view #2.

FIG. 27 is a flowchart describing a coding process performed by the encoder 12 of FIG. 25 in which the color image C#2 of the view #2 is coded.

In the encoder 12 of FIG. 25, similar processes to steps S11 to S19 of FIG. 16 are performed in steps S201 to S209 for a color image instead of a disparity image, so that the decoded color image C#2 obtained by the filtering in the deblocking filter 521 is supplied to the DPB 31 (FIG. 5), and the process proceeds to step S210.

In step S210, the DPB 31 waits for the decoded color image C#1 to be supplied from the encoder 21 that codes the color image C#1, the decoded color image C#1 being obtained by coding and locally decoding the color image C#1, and stores the decoded color image C#1. The process proceeds to step S211.

In step S211, the DPB 31 waits for the decoded disparity image D#1 to be supplied from the encoder 11 that codes the disparity image D#1, the decoded disparity image D#1 being obtained by coding and locally decoding the disparity image D#1, and stores the decoded disparity image D#1. The process proceeds to step S212.

In step S212, the DPB 31 stores the decoded color image C#2 from the deblocking filter 521, and the process proceeds to step S213.

In step S213, the warping unit 531 warps the picture of the decoded color image C#1 stored in the DPB 31 using the picture of the decoded disparity image D#1 stored in the DPB 31 to generate a picture of the warped color image C'#1, and supplies the generated picture to the warped picture buffer 532, and the process proceeds to step S214.

Hereinafter, in the encoder 12, similar processes to steps S23 to S29 of FIG. 16 are respectively performed in steps S214 to S220 for a color image instead of a disparity image.

Figure 28:
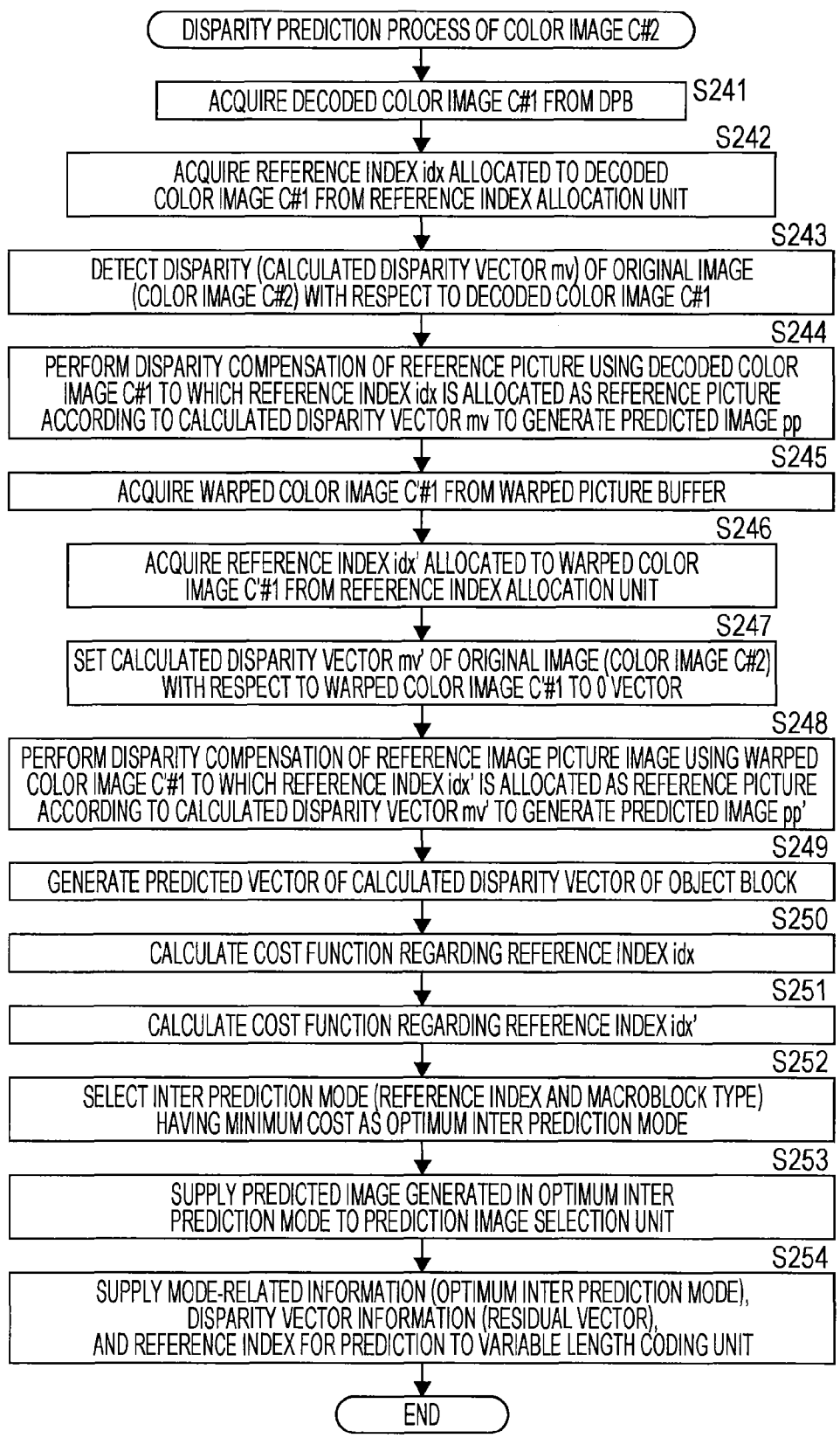
FIG. 28 is a flowchart describing a disparity prediction process.

FIG. 28 is a flowchart describing a disparity prediction process performed by the disparity prediction unit 534 of FIG. 26 (in step S217 of FIG. 27).

In the disparity prediction unit 534 of FIG. 26, similar processes to steps S41 to S54 of FIG. 17 are respectively performed in steps S241 to S254 for a color image instead of a disparity image.

[A Configuration Example of the Decoder 312 that Decodes a Color Image by the Warped Reference Allocation Scheme]

Figure 29:
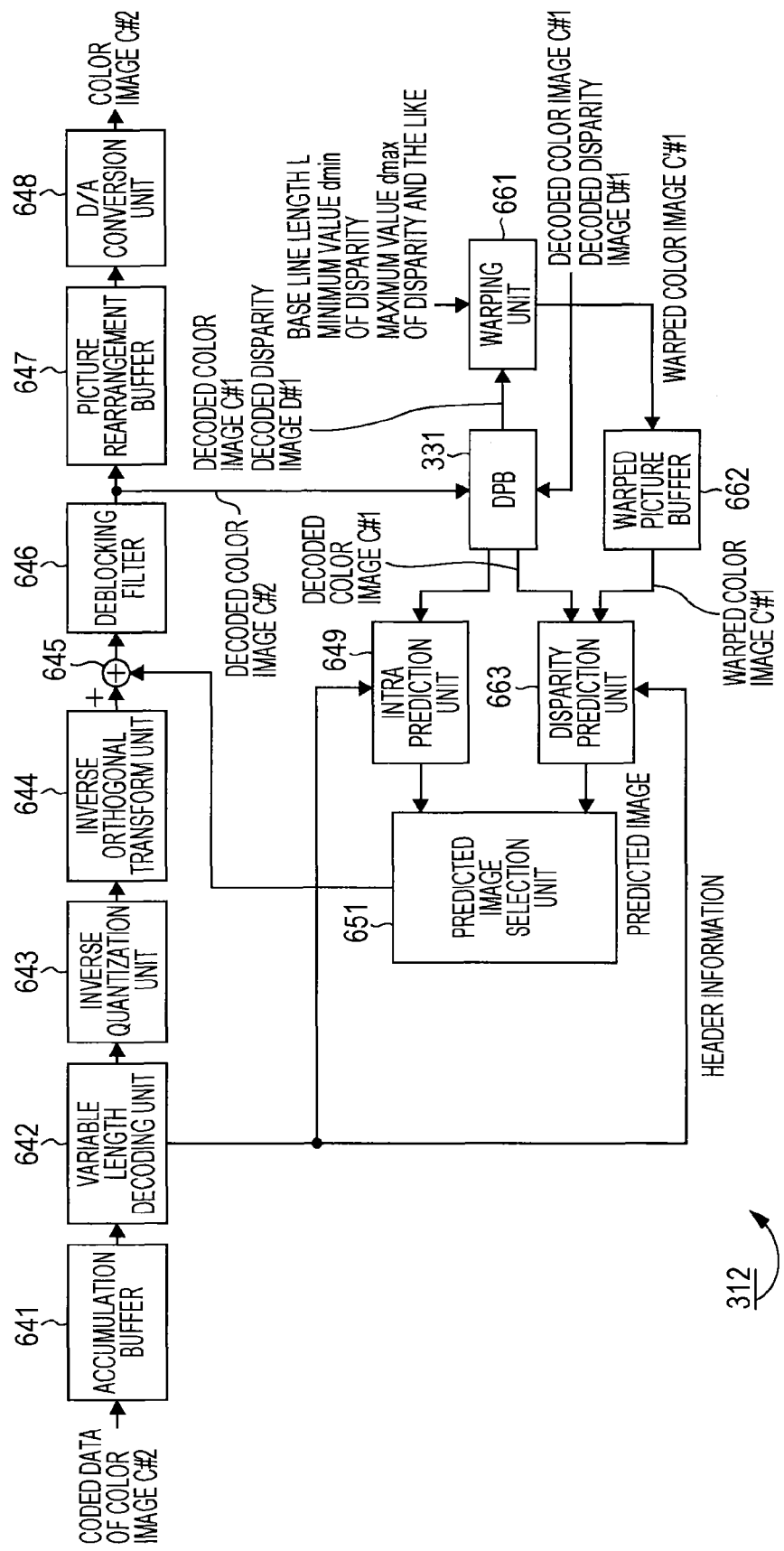
FIG. 29 is a block diagram illustrating a configuration example of a decoder 312 that decodes the color image C#2 by the warped reference allocation scheme.

FIG. 29 is a block diagram illustrating a configuration example of the decoder 312 of FIG. 18 when the encoder 12 is configured as illustrated in FIG. 25, that is, a configuration example of the decoder 312 that decodes the color image C#2 by the warped reference allocation scheme.

In FIG. 29, the decoder 312 includes an accumulation buffer 641, a variable length decoding unit 642, an inverse quantization unit 643, an inverse orthogonal transform unit 644, a calculation unit 645, a deblocking filter 646, a picture rearrangement buffer 647, a D/A conversion unit 648, an intra prediction unit 649, a predicted image selection unit 651, a warping unit 661, a warped picture buffer 662, and a disparity prediction unit 663.

The accumulation buffer 641, the intra prediction unit 649, the predicted image selection unit 651, the warping unit 661, and the disparity prediction unit 663 respectively perform similar processes to the accumulation buffer 441, the intra prediction unit 449, the predicted image selection unit 451, the warping unit 461, and the disparity prediction unit 463 of the decoder 322 of FIG. 29, except that the processes are intended for a color image instead of a disparity image.

Note that, in FIG. 29, a picture of a decoded image, that is, a picture of the decoded color image C#2 that is a color image decoded in the decoder 312 is supplied from the deblocking filter 646 to the DPB 331, and is stored as a candidate picture that can serve as the reference picture.

Further, as described in FIGS. 18 and 19, a picture of the color image (decoded color image) C#1 decided in the decoder 311, a picture of the disparity image (decoded disparity image) D#1 decoded in the decoder 321, and a picture of the disparity image (decoded disparity image) D#2 decoded in the decoder 322 are supplied to and stored in the DPB 331.

Note that, in the decoder 312, the picture of the decoded color image C#2 from the deblocking filter 646 as well as the pictures of the decoded color image C#1 obtained in the decoder 311 and of the decoded disparity image D#1 obtained in the decoder 321 are used for decoding of the color image C#2 that is the object to be decoded. Therefore, in FIG. 29, the arrow indicating that the decoded color image C#1 obtained in the decoder 311 and the decoded disparity image D#1 obtained in the decoder 321 are supplied to the DPB 331 is drawn.

Note that the decoded disparity image D#1 stored in the DPB 331 is used to generate a picture of the warped color image C'#1 that is a warped image obtained by converting the picture of the decoded color image C#1 into an image (color image) obtainable in the viewpoint #2 by warping, in the warping unit 661, the picture of the decoded color image C#1 stored in the DPB 331, similarly to the warping unit 531 of FIG. 25.

Figure 30:
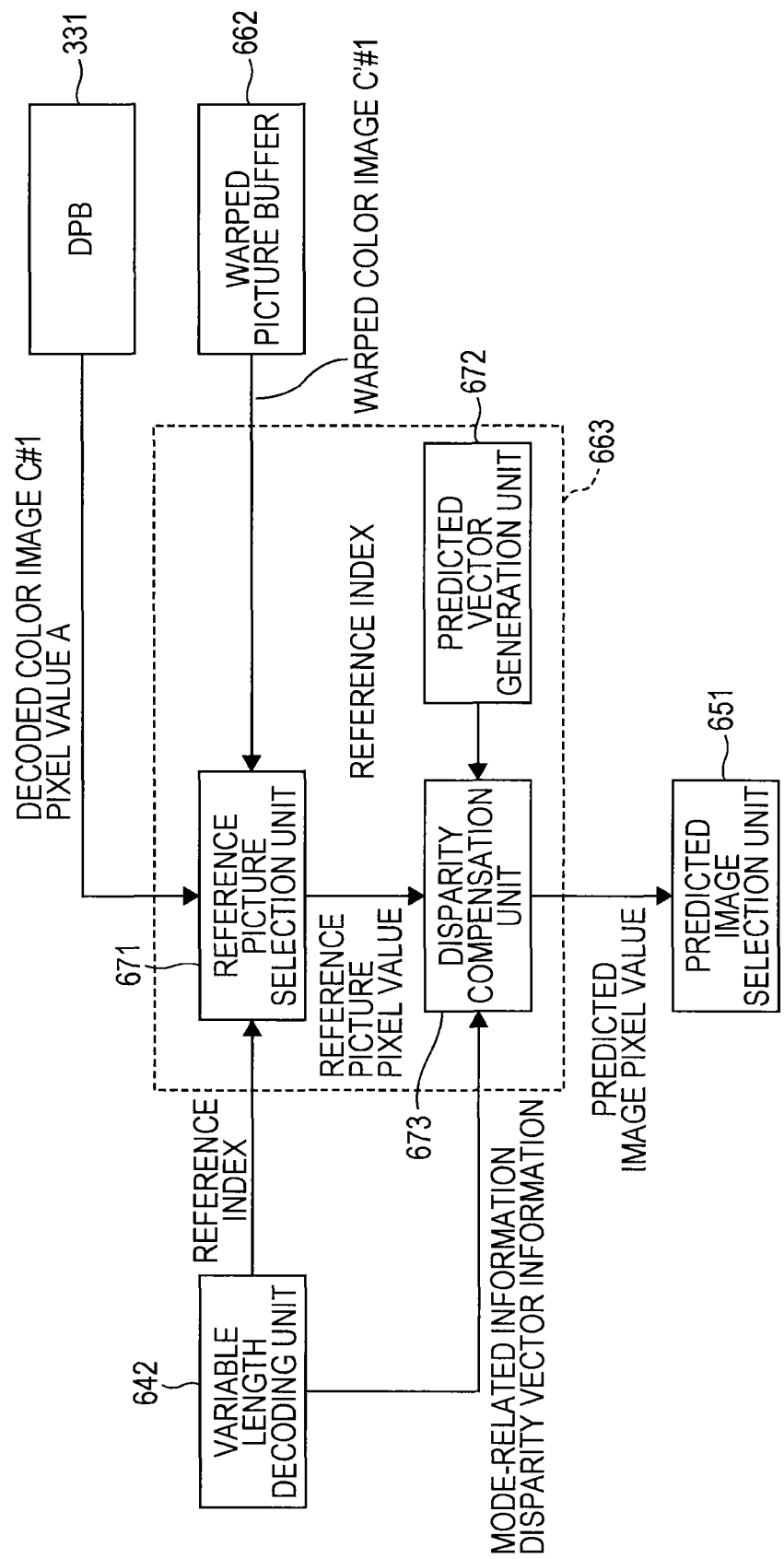
FIG. 30 is a block diagram illustrating a configuration example of a disparity prediction unit 663.

FIG. 30 is a block diagram illustrating a configuration example of the disparity prediction unit 663 of FIG. 29.

In FIG. 30, the disparity prediction unit 663 includes a reference picture selection unit 671, a predicted vector generation unit 672, and a disparity compensation unit 673.

The reference picture selection unit 671 and the disparity compensation unit 673 respectively perform similar processes to the reference picture selection unit 471 and the disparity compensation unit 473 of the disparity prediction unit 463 of FIG. 25, except that the processes are intended for a color image instead of a disparity image.

Figure 31:
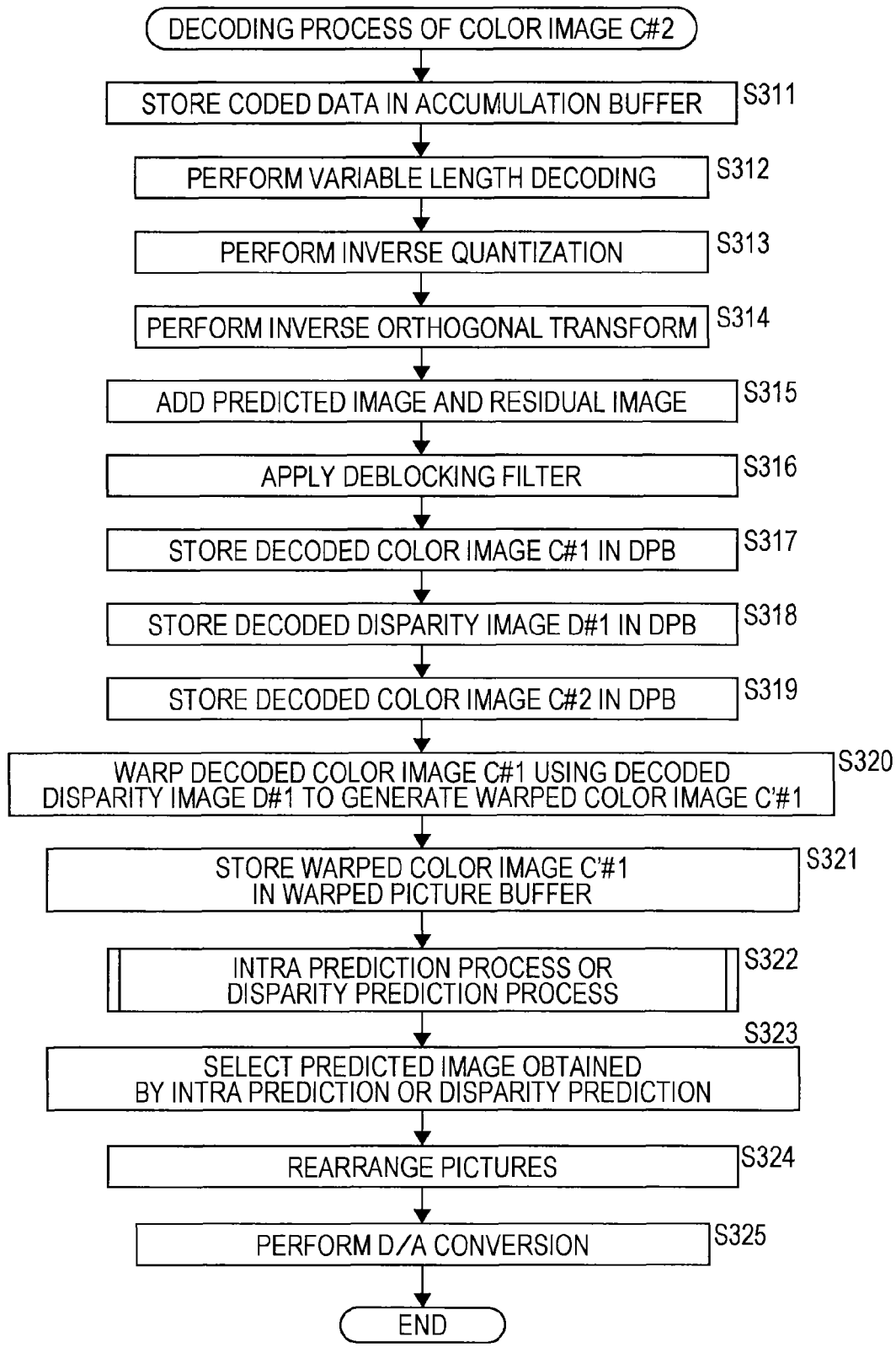
FIG. 31 is a flowchart describing a process of decoding coded data of the color image C#2 of the view #2.

FIG. 31 is a flowchart describing a decoding process performed by the decoder 312 of FIG. 29, in which coded data of the color image C#2 of the view #2 is decoded.

In the decoder 312 of FIG. 29, similar processes to steps S111 to S116 of FIG. 22 are respectively performed in steps S311 to S316 for a color image instead of a disparity image, so that the decoded color image C#2 obtained by the filtering in the deblocking filter 646 is supplied to the DPB 331, and the process proceeds to step S317.

In step S317, the DPB 331 waits for the decoded color image C#1 to be supplied from the decoder 311 that decodes the color image C#1, and stores the decoded color image C#1, and the process proceeds to step S318.

In step S318, the DPB 331 waits for the decoded disparity image D#1 to be supplied from the decoder 321 that decodes the disparity image D#1, and stores the decoded disparity image D#1, and the process proceeds to step S319.

In step S319, the DPB 331 stores the decoded color image C#2 from the deblocking filter 646, and the process proceeds to step S320.

In step S320, the warping unit 661 warps the picture of the decoded color image C#1 stored in the DPB 331 using the picture of the decoded disparity image D#1 stored in the DPB 331 to generate a picture of the warped color image C'#1, and supplies the generated picture to the warped picture buffer 662, and the process proceeds to step S321.

Hereinafter, in the decoder 312, similar processes to steps S120 to S124 of FIG. 22 are respectively performed in steps S321 to S325 for a color image instead of a disparity image.

Figure 32:
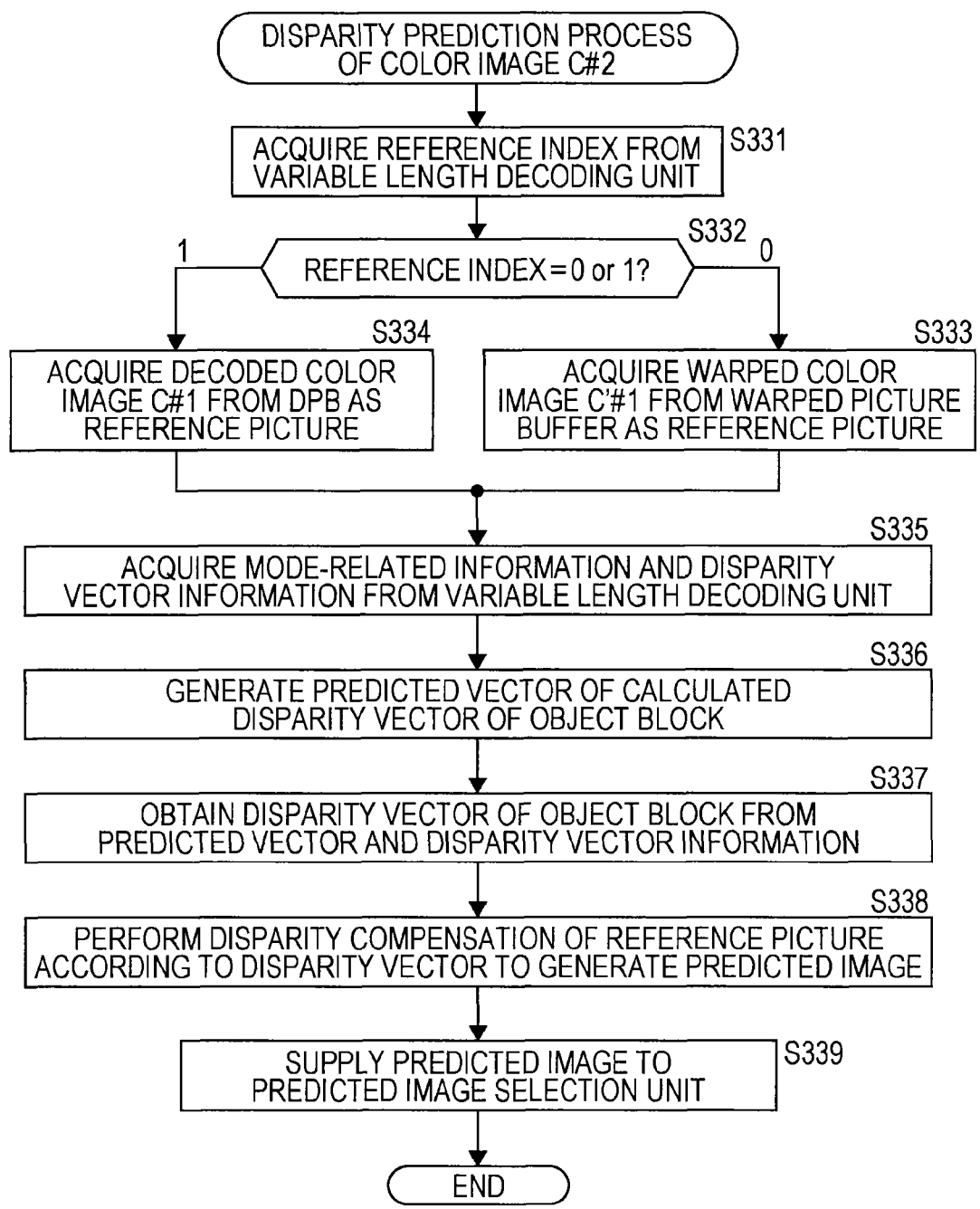
FIG. 32 is a flowchart describing a disparity prediction process.

FIG. 32 is a flowchart describing a disparity prediction process performed by the disparity prediction unit 663 of FIG. 30 (in step S322 of FIG. 31).

In the disparity prediction unit 663 of FIG. 30, similar processes to steps S131 to S139 of FIG. 23 are respectively performed in steps S331 to S339 for a color image instead of a disparity image.

[A Warped Reference Allocation Scheme Using Candidate Pictures Including a Picture Used for Time Prediction]

Figure 33:
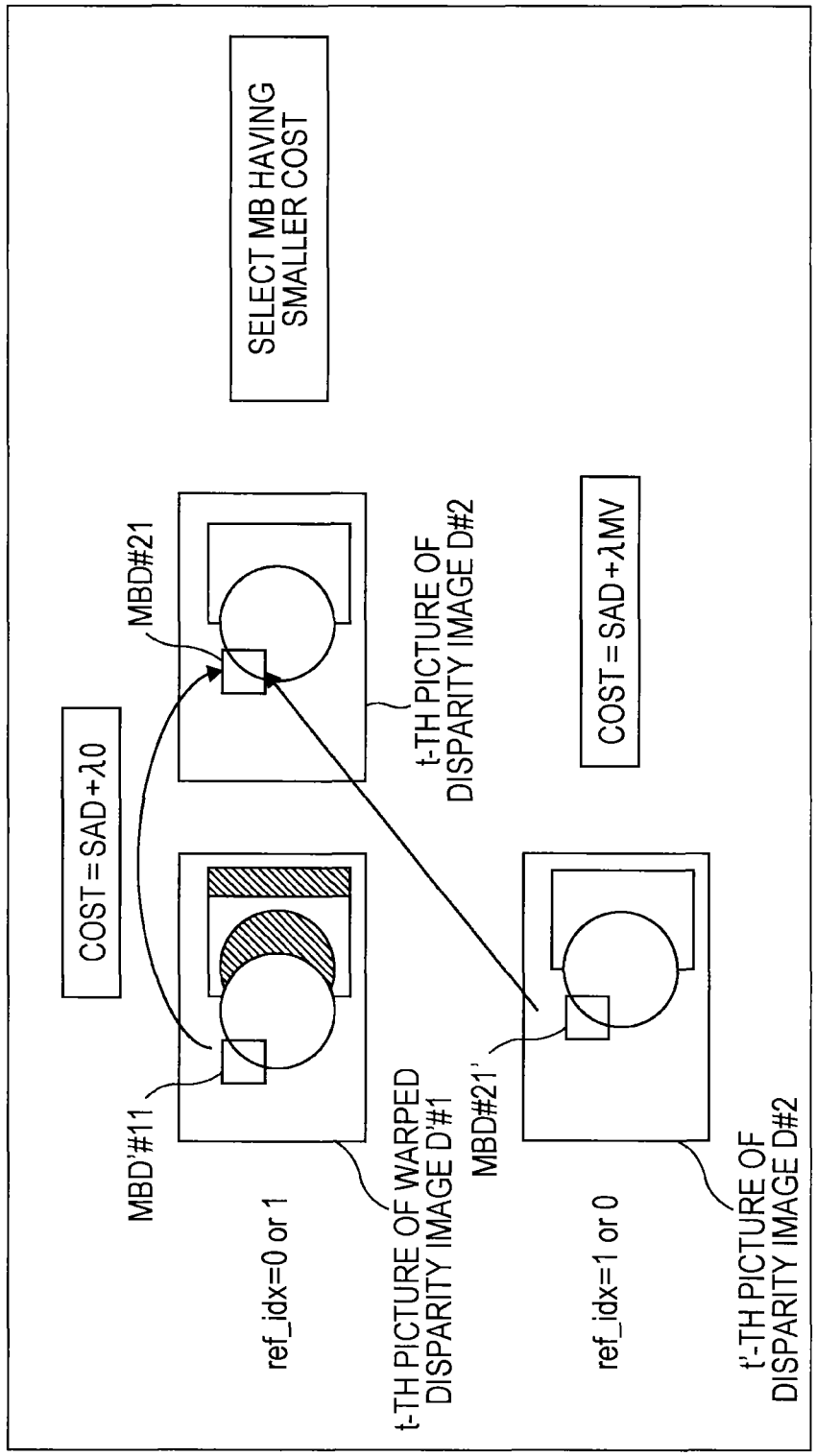
FIG. 33 is a diagram describing a warped reference allocation scheme using a candidate picture including a picture used for time prediction.

FIG. 33 is a diagram describing a warped reference allocation scheme using a candidate picture including a picture to be used for time prediction.

As described in FIG. 13, the encoder 22 (FIG. 5) is capable of performing both of the disparity prediction and the time prediction.

When both of the disparity prediction and the time prediction are performed in the encoder 22 that codes the disparity image D#2, the picture of the warped disparity image D'#1 and the picture of the decoded disparity image D#1 that might be referred in the disparity prediction as well as the picture of the decoded disparity image D#2 that might be referred in the time prediction serve as the candidate pictures, and the reference indexes are allocated.

Hereinafter, for ease of description, as the candidate pictures when both of the disparity prediction and the time prediction are performed in the encoder 22 that codes the disparity image D#2, the picture of the warped disparity image D'#1 to be referred in the disparity prediction and the picture of the decoded disparity image D#2 to be referred in the time prediction are employed.

In FIG. 33, in coding of the object block of the t-th picture as the object picture of the disparity image D#2 to be coded, the t-th picture of the warped disparity image D'#1 generated by warping the (locally decoded) disparity image D#1 and the t-th' picture of the disparity image D#2 to be coded are recognized as the pictures (candidate pictures) that can serve as the reference pictures.

Here, the t'-th picture of the disparity image D#2 that is the candidate picture is a picture decoded (locally decoded) prior to the t-th picture of the disparity image D#2 that is the picture of the object block, and stored in the DPB 31 (and the DPB 331) as the picture of the decoded disparity image D#2.

As the t'-th picture of the disparity image D#2 that is the candidate picture, for example, a picture decoded (and coded) one picture prior to the t-th picture of the disparity image D#2 that is the picture of the object block can be employed.

When the t-th picture of the warped disparity image D'#1 is used as the reference picture, a block at a position shifted from the position of the block MBD#21 that is the object block of the t-th picture of the disparity image D#2 by the gap vector, that is, the block MBD'#11 at the same position as the object block MBD#21 is acquired by MC as the predicted image, on the assumption that the gap vector is the 0 vector.

Then, for example, the coding cost COST=COST1' required for coding the object block MBD#21, of when the warped disparity image D'#1 is used as the reference picture, is calculated according to the above-described expression (1) using the SAD that is a value corresponding to the residual between the object block MBD#21 and the block MBD'#11 as the predicted image, and the value MV corresponding to the code amount of the gap vector.

Here, as illustrated in FIGS. 3 and 24, when the picture of the warped disparity image D'#1 is used as the reference picture, it is assumed that the gap vector is the 0 vector, and the value MV corresponding to the code amount of the gap vector can employ 0 for the calculation of the coding cost COST in the expression (1)

Therefore the coding cost COST1' of when the object block MBD#21 is coded using the picture of the warped disparity image D'#1 as the reference picture is expressed in the expression COST1'=SAD+λ×0=SAD, as described in FIGS. 3 and 24.

Meanwhile, when the t'-th picture of the disparity image D#2 is used as the reference picture, the gap vector that is the motion vector is detected by performing ME between the object block MBD#21 and the t'-th picture of the disparity image D#2.

Further, a block (corresponding block) MBD#21' in the t'-th picture of the disparity image D#2 at a position shifted from the position of the object block MBD#21 by the gap vector that is the motion vector is acquired by MC as the predicted image.

Then, the coding cost COST=COST1 required for coding the object block MBD#21, of when the t'-th picture of the disparity image D#2 is used as the reference picture, is calculated according to the expression (1) using the SAD that is a value corresponding to the residual between the object block MBD#21 and the block MBD#21' that is the predicted image, and the value MV corresponding to the code amount of the gap vector.

As described above, in coding of the object block MBD#21, after the coding cost (the coding cost of the picture of the warped disparity image D'#1) COST1' required for coding the object block MBD#21, of when the picture of the warped disparity image D'#1 (the picture of the same time t as the picture of the object block MBD#21) is used as the reference picture, and the coding cost (the coding cost of the picture of the disparity image D#2) COST1 required for coding the object block MBD#21, of when the picture of the disparity image D#2 (the picture of a different time t' from the picture of the object block MBD#21) is used as the reference picture are calculated, and one having a smaller coding cost between the t-th picture of the warped disparity image D'#1 and the t-th 'picture of the disparity image D#2 is selected as the reference picture to be used for coding the object block MBD#21 based on the coding costs COST1' and COST1.

Here, in coding the object block MBD#21 of the t-th picture of the disparity image D#2, a t'-th picture of the disparity image D#2 that serves as the candidate picture of a different time from the t-th picture is also referred to as a picture of another time.

In coding of the object block of the disparity image D#2, as described above, when the picture of the warped disparity image D'#1 and the picture of the disparity image D#2 of another time are employed as the candidate pictures, similarly to FIGS. 3 and 24, the reference index ref_idx having the value of 0 can be allocated to the picture of the warped disparity image D'#1, and the reference index ref_idx having the value of 1 can be allocated to the picture of the disparity image D#2 of another time.

However, when the picture of the warped disparity image D'#1 and the picture of the disparity image D#2 of another time are employed as the candidate pictures, it may not be appropriate that the reference index ref_idx having the value of 0 is allocated to the picture of the warped disparity image D'#1, and the reference index ref_idx having the value of 1 is allocated to the picture of the disparity image D#2 of another time.

That is, the picture (t-th picture) of the warped disparity image D'#1 may have a portion that does not appear in the portion that appears in the picture (t-th picture) of the disparity image D#2 to be coded, due to the effect of disparity.

Meanwhile, the picture (t'-th picture) of the disparity image D#2 of another time may have a portion that does not appear in a portion that appears in the picture (t-th picture) of the disparity image D#2 to be coded, due to an effect of motion.

When at least a part of the object block of the disparity image D#2 to be coded does not appear in the predicted image generated using the picture of the warped disparity image D'#1 as the reference picture, the residual between the object block and the predicted image becomes large, and the coding cost of the picture of the warped disparity image D'#1 becomes large.

Similarly, when at least a part of the object block of the disparity image D#2 to be coded does not appear in the predicted image generated using the picture of the disparity image D#2 of another time as the reference picture, the residual between the object block and the predicted image becomes large, and the coding cost of the picture of the disparity image D#2 of another time becomes large.

To be specific, when a scene change is happened between the picture of the disparity image D#2 to be coded and the picture of the disparity image D#2 of another time that is the candidate picture, the coding cost of the picture of the disparity image D#2 of another time becomes larger than the coding cost of the picture of the warped disparity image D'#1.

Meanwhile, when the object does not move (the object remains still) between the picture of the disparity image D#2 to be coded and the picture of the disparity image D#2 of another time that is the candidate picture, the coding cost of the picture of the disparity image D#2 of another time becomes smaller than the coding cost of the picture of the warped disparity image D'#1.

Therefore, when one having a smaller coding cost is selected as the reference picture to be used for coding of the object block where the picture of the warped disparity image D'#1 and the picture of the disparity image D#2 of another time are included in the candidate pictures, the fact that either the picture of the warped disparity image D'#1 or the picture of the disparity image D#2 of another time is more likely to be selected as the reference picture varies depending on the picture of the disparity image D#2 to be coded (object picture).

Therefore, in the warped reference allocation scheme using the candidate picture including a picture used in time prediction, a characteristic amount (hereinafter, also referred to as a prediction determination characteristic amount) is obtained, which determines which case is more often employed to code the object picture between: a case where the coding is performed using the picture of the warped disparity image D'#1 as the reference picture between the picture of the warped disparity image D'#1 that is the candidate picture and the picture of the disparity image D#2 of another time, i.e., the coding by the disparity prediction; and a case where the coding is performed using the picture of the disparity image D#2 of another time as the reference picture, i.e., the coding by the time prediction. Then, the reference index ref_idx can be allocated to each of the picture of the warped disparity image D'#1 that is the candidate picture and the picture of the disparity image D#2 of another time based on the prediction determination characteristic amount.

Figure 34:
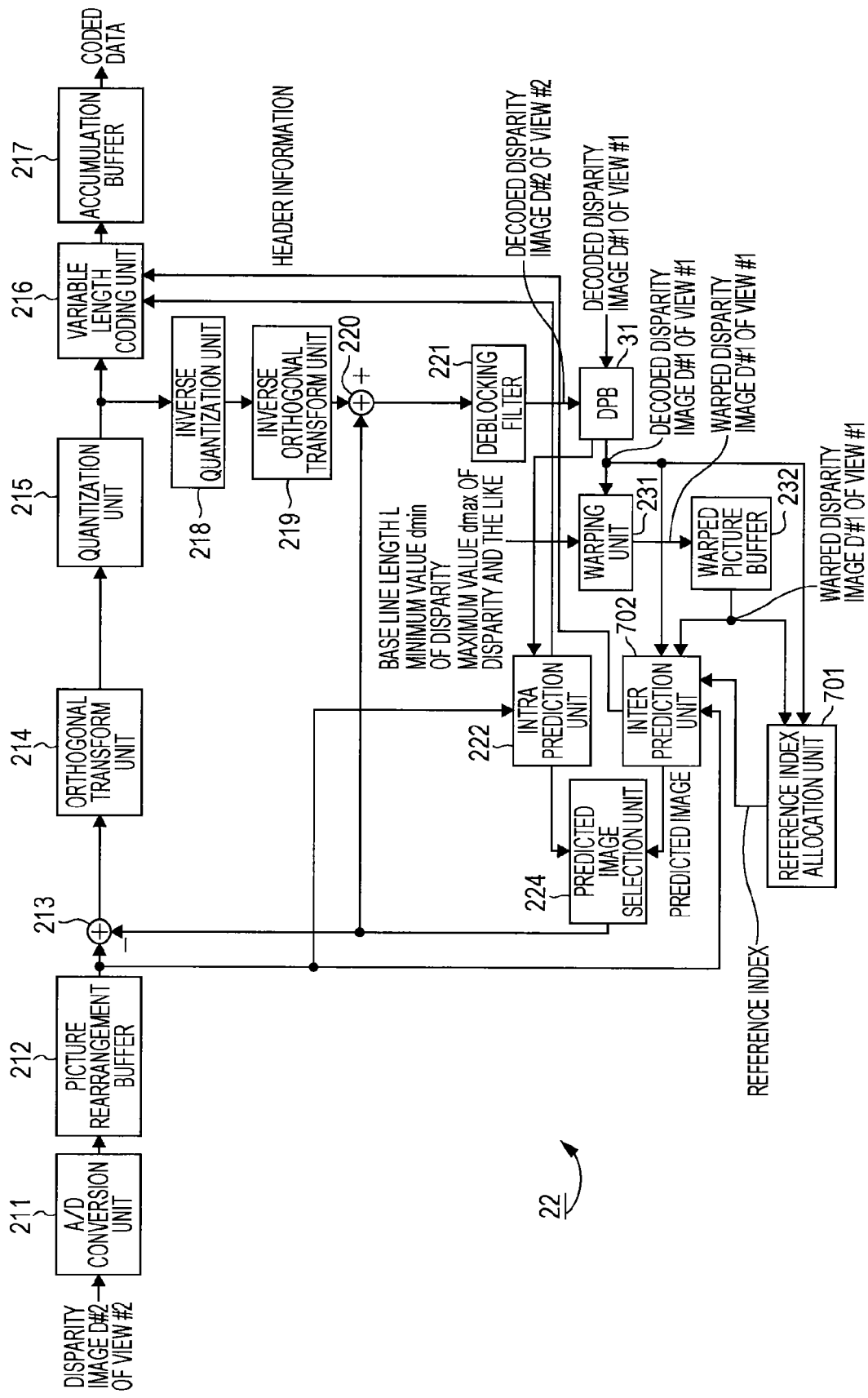
FIG. 34 is a block diagram illustrating a configuration example of the encoder 22 that codes the disparity image #2 by the warped reference allocation scheme using a candidate picture including a picture used for time prediction.

FIG. 34 is a block diagram illustrating a configuration example of the encoder 22 (FIG. 5) that codes the disparity image #2 by the warped reference allocation scheme using a candidate picture including a picture to be used for time prediction.

Note that, in the drawing, parts corresponding to the case of FIG. 13 are denoted with the same reference signs, and description thereof is hereinafter appropriately omitted.

The encoder 22 of FIG. 34 is in common with the case of FIG. 13, in that the encoder 22 includes the A/D conversion unit 211, the intra prediction unit 222, the predicted image selection unit 224, the warping unit 231, and the warped picture buffer 232.

Note that the encoder 22 of FIG. 34 is different from the case of FIG. 13 in that the encoder 22 includes a reference index allocation unit 701 and an inter prediction unit 702 in place of the reference index allocation unit 233 and the disparity prediction unit 234.

In FIG. 34, the reference index allocation unit 701 recognizes a picture of the decoded disparity image D#2 of another time stored in the DPB 31 (a coded and locally decoded picture different from the picture of the object block) and the picture of the warped disparity image D'#1 stored in the warped picture buffer 232 as the candidate pictures of the reference pictures, and allocates the reference indexes to the candidate pictures.

That is, the reference index allocation unit 701 obtains a prediction determination characteristic amount, and, in coding the picture (object picture) of the disparity image D#2 that is the object to be coded, allocates the reference index having the value of 0 and a smaller code amount to the picture that is estimated to be more likely to be selected as the reference picture from the picture of the warped disparity image D'#1 and the picture of the disparity image D#2 of another time, and allocates the reference index having the value of 1 to the other picture, according to the prediction determination characteristic amount.

The reference index allocation unit 701 then supplies the reference indexes allocated to the candidate pictures to the inter prediction unit 702.

The inter prediction unit 702 performs the inter prediction (the time prediction and the disparity prediction) of the object block using the candidate pictures to which the reference indexes are allocated in the reference index allocation unit 701, that is, the picture of the decoded disparity image D#2 of another time stored in the DPB 31 and the picture of the warped disparity image D'#1 stored in the warped picture buffer 232 as the reference pictures, and calculates a coding cost.

That is, the inter prediction unit 702 performs the disparity prediction as the inter prediction, similarly to the case of the disparity prediction unit 234 of FIG. 13, using the picture of the warped disparity image D'#1 as the reference picture on the assumption that the (calculated) disparity vector is the 0 vector, and generates the predicted image of the disparity prediction.

Further, the inter prediction unit 702 calculates a coding cost (a coding cost of the picture of the warped disparity image D'#1) required for coding (prediction coding) the object block using the predicted image of the disparity prediction.

Further, the inter prediction unit 702 uses the picture of the decoded disparity image D#2 of another time as the reference picture, and performs the time prediction (motion prediction) as the inter prediction to generate a predicted image of the time prediction.

That is, the inter prediction unit 702 detects a motion vector as a gap vector that indicates a gap between the object block and the picture of the decoded disparity image D#2 of another time. Further, the inter prediction unit 702 performs the motion compensation of the picture of the decoded disparity image D#2 of another time using the motion vector to generate the predicted image of the time prediction (obtains, as the predicted image, a block (corresponding block) of the picture of the decoded disparity image D#2 of another time at a position shifted from the object block by the motion vector as the gap vector).

Further, the inter prediction unit 702 calculates a coding cost required for coding (prediction coding) the object block using the predicted picture of the time prediction (the coding cost of the picture of the decoded disparity image D#2 of another time).

The inter prediction unit 702 then selects, as the reference picture, the picture having a smaller coding cost from the picture of the decoded disparity image D#2 of another time and the picture of the warped disparity image D'#1 that are the candidate pictures.

Further, the inter prediction unit 702 selects, as the reference index for prediction of the object block, the reference index allocated to the picture (the picture of the decoded disparity image D#2 of another time or the picture of the warped disparity image D'#1) selected as the reference picture from among the reference indexes supplied from the reference index allocation unit 701, and outputs the reference index to the variable length coding unit 216 as one of the header information.

In addition, the inter prediction unit 702 supplies, to the predicted image selection unit 224 as the reference picture, the predicted image generated by the inter prediction using the candidate picture (the picture of the decoded disparity image D#2 of another time or the picture of the warped disparity image D'#1) to which the reference index for prediction of the object block is allocated.

Note that, other than the above, the inter prediction unit 702 performs similar processes to the disparity prediction unit 234 of FIG. 13, except that the picture of the decoded disparity image D#2 is used as one of the candidate pictures in place of the picture of the decoded disparity image Ni.

Figure 35:
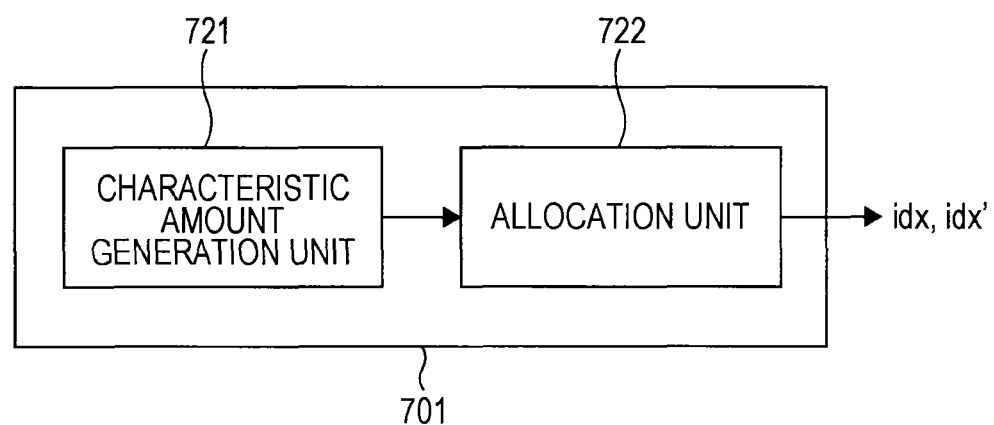
FIG. 35 is a block diagram illustrating a configuration example of a reference index allocation unit 701.

FIG. 35 is a block diagram illustrating a configuration example of the reference index allocation unit 701 of FIG. 34.

The reference index allocation unit 701 includes a characteristic amount generation unit 721 and an allocation unit 722.

The characteristic amount generation unit 721 generates a prediction determination characteristic amount of the picture (object picture of the object block, and supplies the prediction determination characteristic amount to the allocation unit 722.

The allocation unit 722 allocates one of 0 and 1 as the reference index idx' of the picture of the warped disparity image D'#1 and allocates the other of 0 and 1 as the reference index idx of the picture of the disparity image D#2 of another time based on the prediction determination characteristic amount from the characteristic amount generation unit 721, and supplies the reference indexes to the inter prediction unit 702 (FIG. 34).

That is, the allocation unit 722 determines, regarding the object picture, whether either the picture of the warped disparity image D'#1 or the picture of the disparity image D#2 of another time, which is the candidate picture, is more likely to be selected as the reference picture based on the prediction determination characteristic amount.

The allocation unit 722 then allocates the reference index having the value of 0 to the picture more likely to be selected as the reference picture from the picture of the warped disparity image D'#1 and the picture of the disparity image D#2 of another time, and allocates the reference index having the value of 1 to the other candidate picture.

Here, allocation of the reference index that is not default allocation of the MVC (AVC) can be performed by the RPLR command, as illustrated in FIG. 12.

Further, as the prediction determination characteristic amount, an average value or dispersion of the size of the gap vector (the calculated disparity vector or the motion vector) of the object block throughout the all macroblocks of the object picture when the inter prediction is performed using the candidate picture as the reference picture can be employed.

In this case, the characteristic amount generation unit 721 obtains the average value or the dispersion of the size of the calculated disparity vector as the gap block of the object block throughout the all macroblocks of the object picture when the inter prediction (disparity prediction) is performed using the picture of the warped disparity image D'#1 as the reference picture.

Further, the characteristic amount generation unit 721 obtains the average value or the dispersion of the size of the motion vector of the object block throughout the all macroblocks of the object picture when the inter prediction (time prediction) is performed using the picture of the decoded disparity image D#2 of another as the reference picture.

The allocation unit 722 allocates, on the assumption that the code amount becomes large when the size of the gap vector is large, the reference index having the value of 0 to the candidate picture having a smaller average value or smaller dispersion of the gap vector from the picture of the warped disparity image D'#1 and the picture of the disparity image D#2 of another time that are the candidate pictures, and allocates the reference index having the value of 1 to the other candidate picture.

Further, as the prediction determination characteristic amount, a sum total or an average value of an absolute value of a residual between the object block and the corresponding block of the reference picture throughout the all macroblocks when the inter prediction is performed using the candidate picture as the reference picture can be employed.

In this case, the characteristic amount generation unit 721 obtains the sum total or the average value of the absolute value of the residual between the object block and the corresponding block throughout the all macroblocks of the object picture when the inter prediction (disparity prediction) is performed using the picture of the warped disparity image D'#1 as the reference picture.

Further, the characteristic amount generation unit 721 obtains the sum total or the average value of the absolute value of the residual between the object block and the corresponding block throughout the all macroblocks of the object picture when the inter prediction (time prediction) is performed using the picture of the decoded disparity image D#2 of another as the reference picture.

The allocation unit 722 then allocates the reference index having the value of 0 to the candidate picture having a smaller sum total or average value of the absolute value of the residual from the picture of the warped disparity image D'#1 and the picture of the disparity image D#2 of another time that are the candidate pictures, and allocates the reference index having the value of 1 to the other candidate picture.

Further, as the prediction determination characteristic amount, a sum total or an average value of a coding cost throughout the all macroblock of the object picture when the inter prediction is performed using the candidate picture as the reference picture can be employed.

In this case, the characteristic amount generation unit 721 obtains the sum total or the average value of the coding cost of the object block throughout the all macroblocks of the object picture when the inter prediction (disparity prediction) is performed using the picture of the warped disparity image D'#1 as the reference picture.

Further, the characteristic amount generation unit 721 obtains the sum total or the average value of the coding cost of the object block throughout the all macroblocks of the object picture when the inter prediction (time prediction) is performed using the picture of the decoded disparity image D#2 of another time as the reference picture.

The allocation unit 722 then allocates the reference index having the value of 0 to the candidate picture having a smaller sum total or average value of the coding cost from the picture of the warped disparity image D'#1 and the picture of the disparity image D#2 of another time that are the candidate pictures, and allocates the reference index having the value of 1 to the other candidate picture.

Further, as the prediction determination characteristic amount, a ratio of the reference index for prediction, that is, the number of the reference indexes having the value of 0 and the number of the reference indexes having the value of 1 in an immediately before picture that is a picture coded immediately before the object picture can be employed.

In this case, when the number of the reference indexes having the value of 0 is larger than the number of the reference indexes having the value of 1 in the immediately before picture, the allocation unit 722 allocates the reference index to the picture of the warped disparity image D'#1 and the picture of the disparity image D#2 of another time that are the candidate pictures in coding the object picture, similarly to the coding of the immediately before picture.

Meanwhile, when the number of the reference indexes having the value of 0 is smaller than the number of the reference indexes having the value of 1 in the immediately before picture, the allocation unit 722 allocates the reference index to the picture of the warped disparity image D'#1 and the picture of the disparity image D#2 of another time that are the candidate pictures in coding the object picture, contrary to the allocation of the reference index in coding the immediately before picture.

Other than the above, as the prediction determination characteristic amount, the prediction accuracy of the predicted image of the object picture can be employed, and the reference index can be allocated to the picture of the warped disparity image D'#1 and the picture of the disparity image D#2 of another time based on the prediction accuracy.

Figure 36:
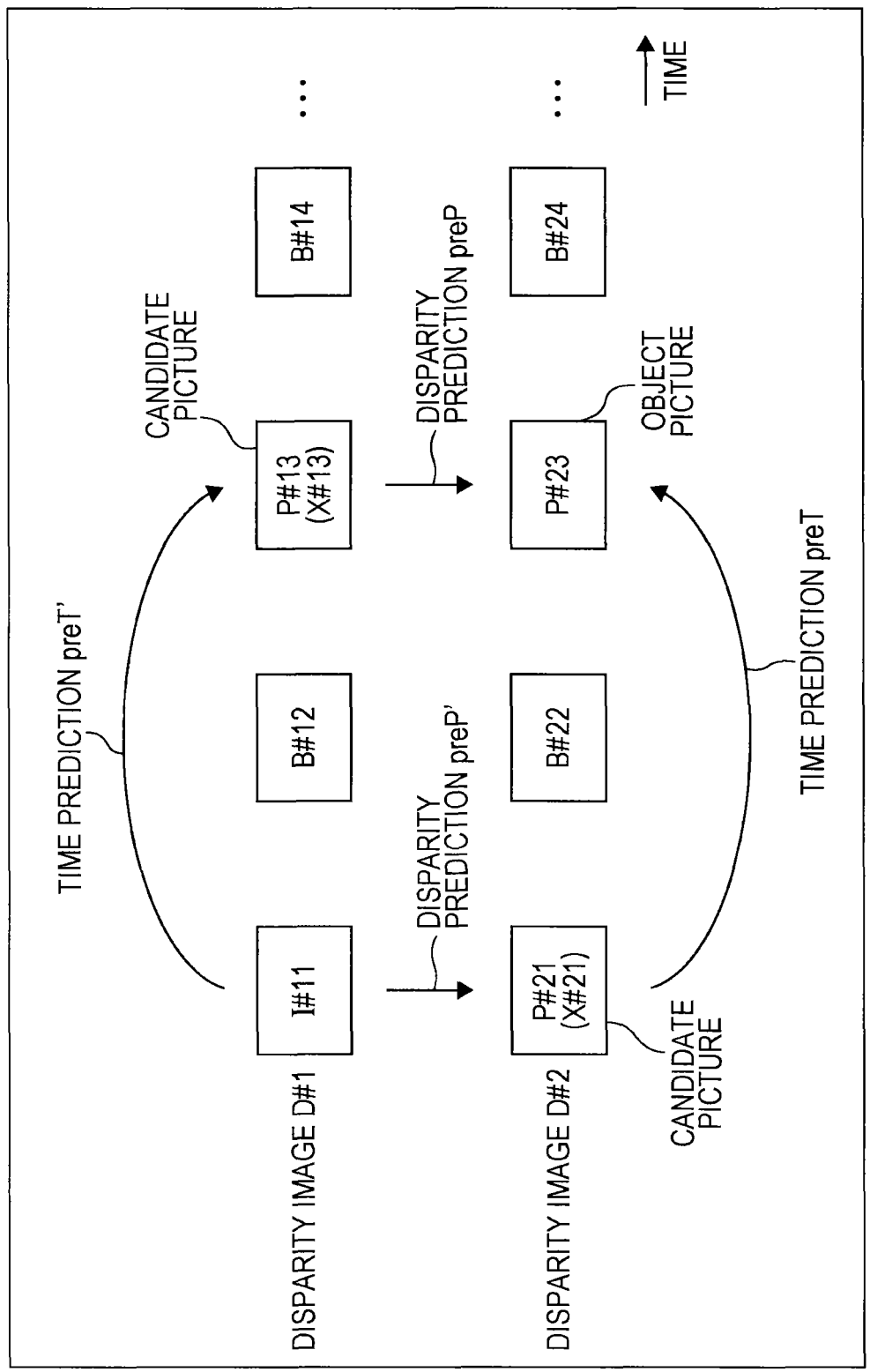
FIG. 36 is a diagram describing a method of allocating a reference index to a candidate picture based on prediction accuracy.

FIG. 36 is a diagram describing a method of allocating the reference index to the candidate picture based on the prediction accuracy in which the prediction accuracy of the predicted image of the object picture is employed as the prediction determination characteristic amount.

In FIG. 36, I picture I#11, B picture B#12, P picture P#13, and B picture B#14 as pictures of the disparity image D#1 in (display) order of time, and P picture P#21, B picture B#22, P picture P#23, and B picture B#24 as pictures of the disparity image D#2 in order of time are illustrated.

In FIG. 36, the I picture I#11 of the disparity image D#1 and the P picture P#21 of the disparity image D#2 are the pictures of the same time, and the B picture B#12 and the B picture B#22, the P picture P#13 and the P picture P#23, and the B picture B#14 and the B picture B#24 are the pictures of the same time.

Assume that the P picture P#23 of the disparity image D#2 to be coded is the object picture, and in coding the object picture P#23, the P picture P#13 of the disparity image D#1 and the P picture P#21 of the disparity image D#2 are the candidate pictures.

Note that, in the warped reference allocation scheme, instead of the P picture P#13 of the disparity image D#1 (itself), the picture of the warped image obtained by warping the P picture P#13 into a picture viewed from the viewpoint #2 is the candidate picture. However, here, for ease of description, the P picture P#13 of the disparity image D#1 is employed in place of the picture of the warped image, as the candidate picture.

Further, in FIG. 36, both of the P picture P#13 of the disparity image D#1 and the P picture #21 of the disparity image D#2 that are the candidate pictures are subjected to prediction coding using the I picture I#11 of the disparity image D#1 as the reference picture.

That is, as to the P picture P#13 of the disparity image D#1, the residual between the predicted image and the P picture P#13 is coded using the I picture I#11 of the disparity image D#1 as the reference picture, and by using the predicted image obtained by performing the time prediction preT' as the inter prediction.

Further, as to the P picture P#21 of the disparity image D#2, the residual between the predicted image and the P picture P#21 is coded using the I picture I#11 of the disparity image D#1 as the reference picture, and by using the predicted image obtained by the disparity prediction preP' as the inter prediction.

In this case, the prediction accuracy X#13 of the predicted image of the P picture P#13 generated by the time prediction preT' can be expressed in, for example, the expression $X\#13=S\times Q$.

Here, in the expression $X\#13=S\times Q$, S corresponds to a (generated) code amount when the P picture P#13 is coded, and Q corresponds to an average value of the quantization step when the P picture P#13 is coded.

In the coding of the P picture P#13, the residual between the P picture P#13 and the predicted image obtained by performing the time prediction preT' using the I picture I#11 as the reference picture is coded. Therefore, the code amount S of when the P picture P#13 is coded and the average value Q of the quantization step where (the residual of) the P picture P#13 is quantized become smaller as the residual becomes smaller, that is, the prediction accuracy of the time prediction preT' becomes higher and the predicted image generated by the time prediction preT' becomes more similar (closer) to the P picture P#13.

Therefore, the prediction accuracy X#13 expressed in the expression X#13=S×Q becomes smaller as the accuracy of the disparity prediction preP' (the accuracy of the predicted image obtained by the disparity prediction preP') is higher.

Similarly, the prediction accuracy X#21 of the predicted image of the P picture P#2 generated by the disparity prediction preP' can be expressed in, for example, the expression X#21=S'×Q'.

Here, in the expression X#21=S'×Q, S' corresponds to a code amount of when the P picture P#21 is coded, and the Q' corresponds to an average value of the quantization step where the P picture P#21 is coded.

In the coding of the P picture P#21, the residual between the P picture P#21 and the predicted image obtained by performing the disparity prediction preP' using the I picture I#11 as the reference picture. Therefore, the code amount S' of when the P picture P#21 is coded and the average value Q' of the quantization step where the (residual of) the P picture P#21 is quantized becomes smaller as the residual becomes smaller, that is, the prediction accuracy of the disparity prediction preP' becomes higher, and the predicted image generated by the disparity prediction preP' becomes more similar to the P picture P#21.

Therefore, the prediction accuracy X#21 expressed in the expression X#21=S'×Q' becomes smaller as the accuracy of the disparity prediction preP' (the accuracy of the predicted image obtained by performing the disparity prediction preP') becomes higher.

Here, the prediction accuracy X#13 expressed in the expression X#13=S×Q and the prediction accuracy X#21 expressed in the expression X#21=S'×Q' coincide with the complexity defined by Test Model (TM) 5.

Meanwhile, when the object picture P#23 is coded using the P picture P#13 of the disparity image D#1 as the reference picture, the predicted image is generated by performing the disparity prediction preP using the P picture P#13 as the reference picture, and the residual between the object picture P#23 and the predicted image is coded.

When the object picture P#23 is coded using the P picture P#21 of the disparity image D#2 as the reference picture, the predicted image is generated by performing the time prediction preT using the P picture P#21 as the reference picture, and the residual between the object picture P#23 and the predicted image is coded.

Here, assuming that there is no big change such as a scene change in the pictures I#11 and P#13 of the disparity image D#1 and in the pictures P#21 and P#23 of the disparity image D#2, it is presumed that the prediction accuracy of the disparity prediction preP (the prediction accuracy of the predicted image generated by the disparity prediction preP) using the P picture P#13 of when the object picture P#23 is coded as the reference picture is in similar extent to the prediction accuracy X#21 of the disparity prediction preP' (the prediction accuracy of the predicted image generated by the disparity prediction preP') using the I picture I#11 as the reference picture.

Similarly, the prediction accuracy of the time prediction preT where the object picture P#23 is coded using the P picture P#21 as the reference picture is in similar extent to the prediction accuracy X#13 of the time prediction preT' using the I picture I#11 as the reference picture.

Therefore, when the prediction accuracy of the predicted image of the object picture P#23 is employed as the prediction determination characteristic amount, the characteristic amount generation unit 721 obtains the prediction accuracy X#21 of the disparity prediction preP' performed when the P picture P#21, which is to serve as the reference picture of the time prediction preT of the object picture P#23, is coded, as the prediction accuracy of the disparity prediction preP using the P picture #13 as the reference picture.

Further, the characteristic amount generation unit 721 obtains the prediction accuracy X#13 of the time prediction preT' performed when the P picture P#13, which is to serve as the reference picture of the disparity prediction preP of the object picture P#23, is coded, as the prediction accuracy of the time prediction preT using the P picture #21 as the reference picture.

When the prediction accuracy (the prediction accuracy X#21 of the disparity prediction preP') of the disparity prediction preP is more favorable (the value is smaller) than the prediction accuracy (the prediction accuracy X#13 of the time prediction preT') of the time prediction preT, the allocation unit 722 allocates the reference index having the value of 0 to the P picture P#13 that is to serve as the reference picture of the disparity prediction preP, and allocates the reference index having the value of 1 to the P picture P#21 that is to serve as the reference picture of the time prediction preT.

When the prediction accuracy of the disparity prediction preP is less favorable than the prediction accuracy of the time prediction preT, the allocation unit 722 allocates the reference index having the value of 0 to the P picture P#21 that is to serve as the reference picture of the time prediction preT, and allocates the reference index having the value of 0 to the P picture P#13 that is to serve as the reference picture of the disparity prediction preP.

As described above, by allocating the reference indexes to the candidate pictures based on the prediction determination characteristic amount, the reference index having the value of 0 and a smaller code amount can be allocated to the candidate picture that is more likely to be selected as the reference picture. As a result, the coding efficiency can be improved.

Figure 37:
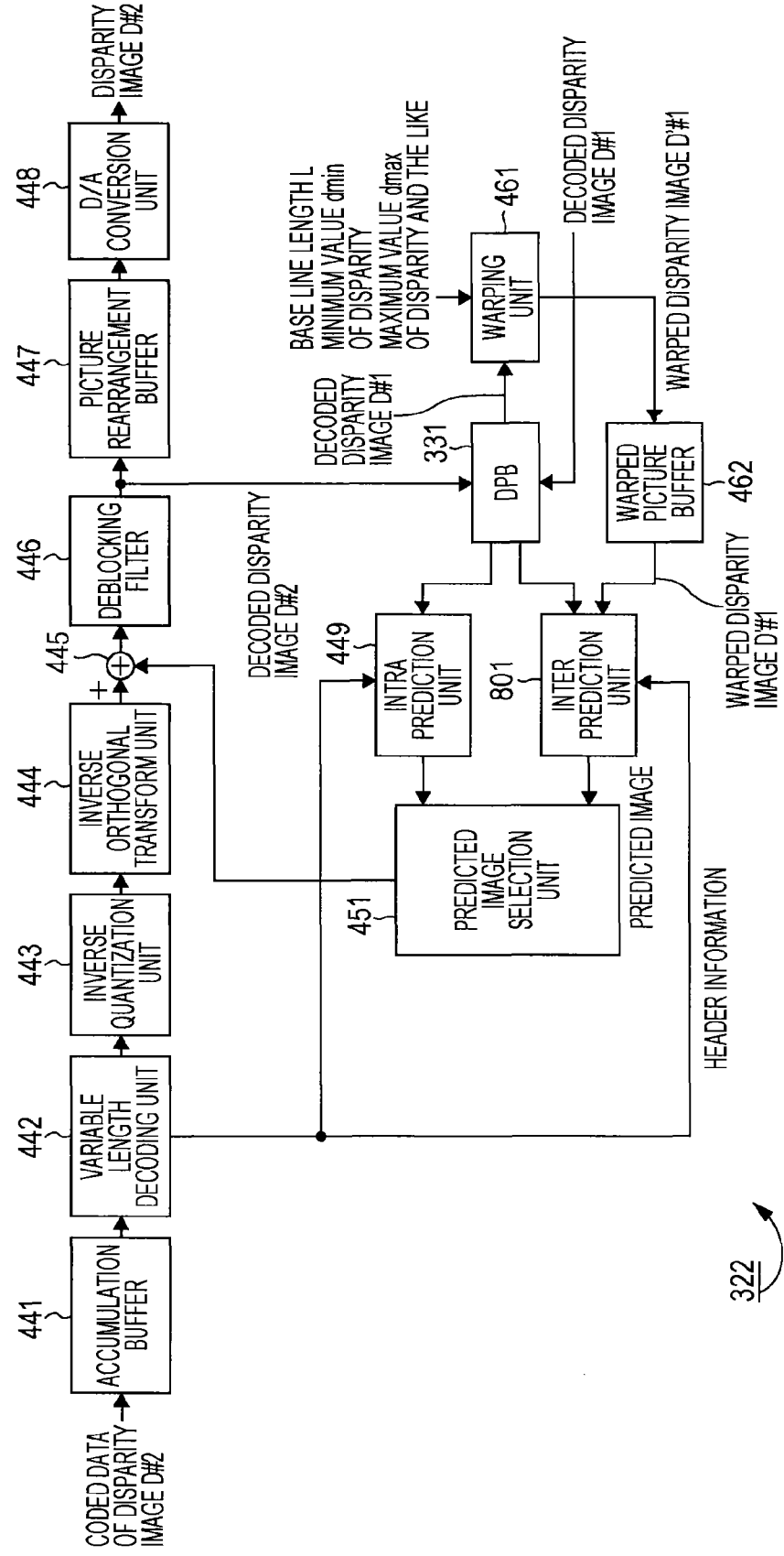
FIG. 37 is a block diagram illustrating a configuration example of the decoder 322 that decodes coded data of the disparity image #2 by the warped reference allocation scheme using a candidate picture including a picture used for time prediction.

FIG. 37 is a block diagram illustrating a configuration example of the decoder 322 (FIG. 18) that decodes coded data of the disparity image #2 by the warped reference allocation scheme using a candidate picture including a picture used for the time prediction.

Note that, in the drawings, parts corresponding to the case of FIG. 20 are denoted with the same reference signs, and description thereof is herein omitted.

The decoder 322 of FIG. 37 is in common with the case of FIG. 20 in that the accumulation buffer 441, the intra prediction unit 449, the predicted image selection unit 451, the warping unit 461, and the warped picture buffer 462 are included.

Note that the decoder 322 of FIG. 37 is different from the case of FIG. 20 in that the inter prediction unit 801 is included in place of the disparity prediction unit 463.

The inter prediction unit 801 recognizes whether the object block is coded using the predicted image generated by the inter prediction based on the header information from the variable length decoding unit 342.

When the object block is coded using the predicted image generated by the inter prediction, the inter prediction unit 801 recognizes (acquires) the reference index allocated to the reference index for prediction, that is, to the reference picture used for the generation of the predicted image of the object block based on the header information from the variable length decoding unit 342.

The inter prediction unit 801 then selects, as the reference picture, the candidate picture to which the reference index for prediction is allocated from the picture of the decoded disparity image D#2 (the picture of another time) as the candidate picture stored in the DPB 331 and the picture of the warped disparity image D'#1 as the candidate picture stored in the warped picture buffer 462.

Further, the inter prediction unit 801 recognizes the gap vector (the calculated disparity vector or the motion vector) used for the generation of the predicted image of the object block based on the header information from the variable length decoding unit 342, and performs the gap compensation (the disparity compensation or the motion compensation) according to the calculated disparity vector to generate the predicted image.

That is, the inter prediction unit 801 acquires a block (corresponding block) of the candidate picture at a position moved (shifted) from the position of the object block according to the gap vector of the object block as the predicted image.

The inter prediction unit 801 then supplies the predicted image to the predicted image selection unit 451.

As described above, the inter prediction unit 801 performs similar processes to the disparity prediction unit 463 of FIG. 20 except that the picture of the decoded disparity image D#2 of another time is used as one of the candidate pictures instead of the picture of the decoded disparity image D#1.

Note that the warped reference allocation scheme using the candidate picture including the picture used for the time prediction can be applied to the encoder 22 (FIG. 5) that codes the disparity image #2 and the decoder 322 (FIG. 18) that decodes the coded data of the disparity image #2 as well as the encoder 12 (FIG. 5) that codes the color image #2 and the decoder 312 (FIG. 18) that decodes the coded data of the color image #2.

[Description of a Computer to which the Present Technology is Applied]

Next, a series of processes described above can be performed by hardware or software. When the series of processes are performed by software, a program that configures the software is installed on a general-purpose computer, and the like.

Figure 39:
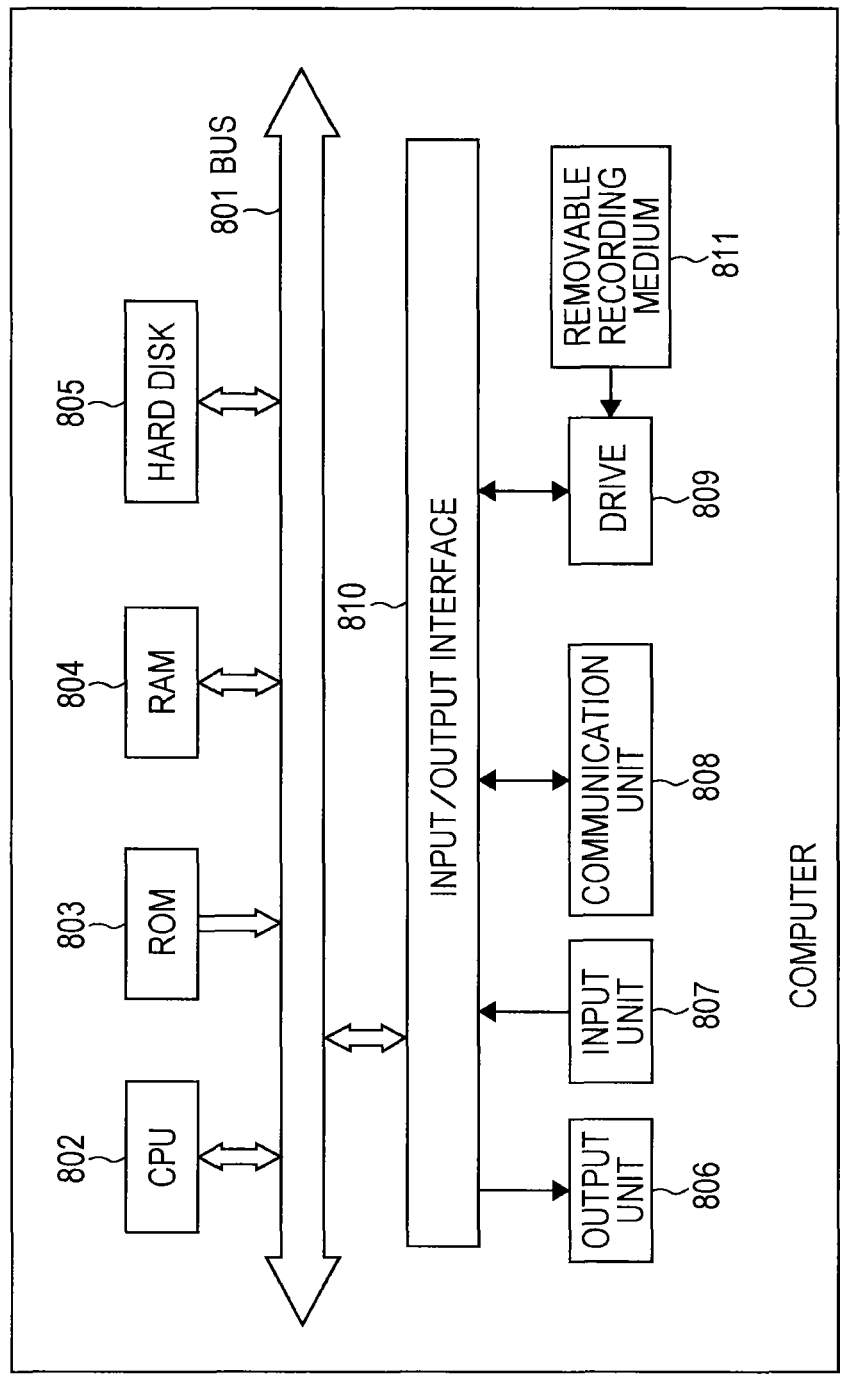
FIG. 39 is a block diagram illustrating a configuration example of one embodiment of a computer to which the present technology is applied.

Here, FIG. 39 illustrates a configuration example of one embodiment of a computer to which a program that executes the above-described series of processes is installed.

The program can be recorded in a hard disk 805 or a ROM 803 as a recording medium embedded in the computer, in advance.

Alternatively, the program can be stored (recorded) in a removable recording medium 811. Such a removable recording medium 811 can be provided as so-called packaged software. Here, examples of the removable recording medium 811 include a flexible disc, a compact disc read only memory (CD-ROM), a magneto optical (MO) disc, a digital versatile disc (DVD), a magnetic disc, and a semiconductor memory.

Note that the program can not only be installed on the computer from the removable recording medium 811 as described above, but also be downloaded to the computer and installed on the embedded hard disk 805 through the communication network or the broadcasting network. That is, the program can be wirelessly transmitted from a download site to the computer through a satellite for digital satellite broadcasting or can be wired-transmitted to the computer through a network such as a local area network (LAN) or the Internet.

The computer includes a central processing unit (CPU) 802, and an input/output interface 810 is connected to the CPU 802 through a bus 801.

The CPU 802 executes a program stored in a read only memory (ROM) 803 according to the command when a command is input through an input/output interface 810 by an input unit 807 being operated by the user. Alternatively, the CPU 802 loads the program stored in the hard disk 805 into the random access memory (RAM) 804, and executes the program.

Accordingly, the CPU 802 performs processing according to the above-described flowcharts, or processing performed according to the configuration of the above-described block diagrams. The CPU 802 then outputs a result of the processing from an output unit 806, transmits the result from a communication unit 808, and further, stores the result in the hard disk 805, through the input/output interface 810, as necessary.

Note that the input unit 807 includes a keyboard, a mouse, a microphone, and the like. Further, the output unit 806 includes a liquid crystal display (LCD), a speaker, and the like.

Here, in the present specification, the processing performed by the computer according to the program is not necessarily performed in the order described in the flowcharts in a time-series manner. That is, the processing performed by the computer according to the program includes processing performed in parallel or individually performed (for example, parallel processing or processing using objects).

Further, the program may be processed by one computer (processor) or may be subjected to distributed processing by a plurality of computers. Further, the program may be transferred to a distant computer and executed by the computer.

Note that the embodiments of the present technology is not limited by the above-described embodiments, and various modifications are possible without departing from the gist of the present technology.

That is, the present technology is not limited by coding and decoding using MVC. That is, the present technology is applicable to a case of allocating a reference index to a candidate picture, generating a predicted image, and coding and decoding images from multiple viewpoints using the predicted image.

[A Configuration Example of a Television Apparatus]

Figure 40:
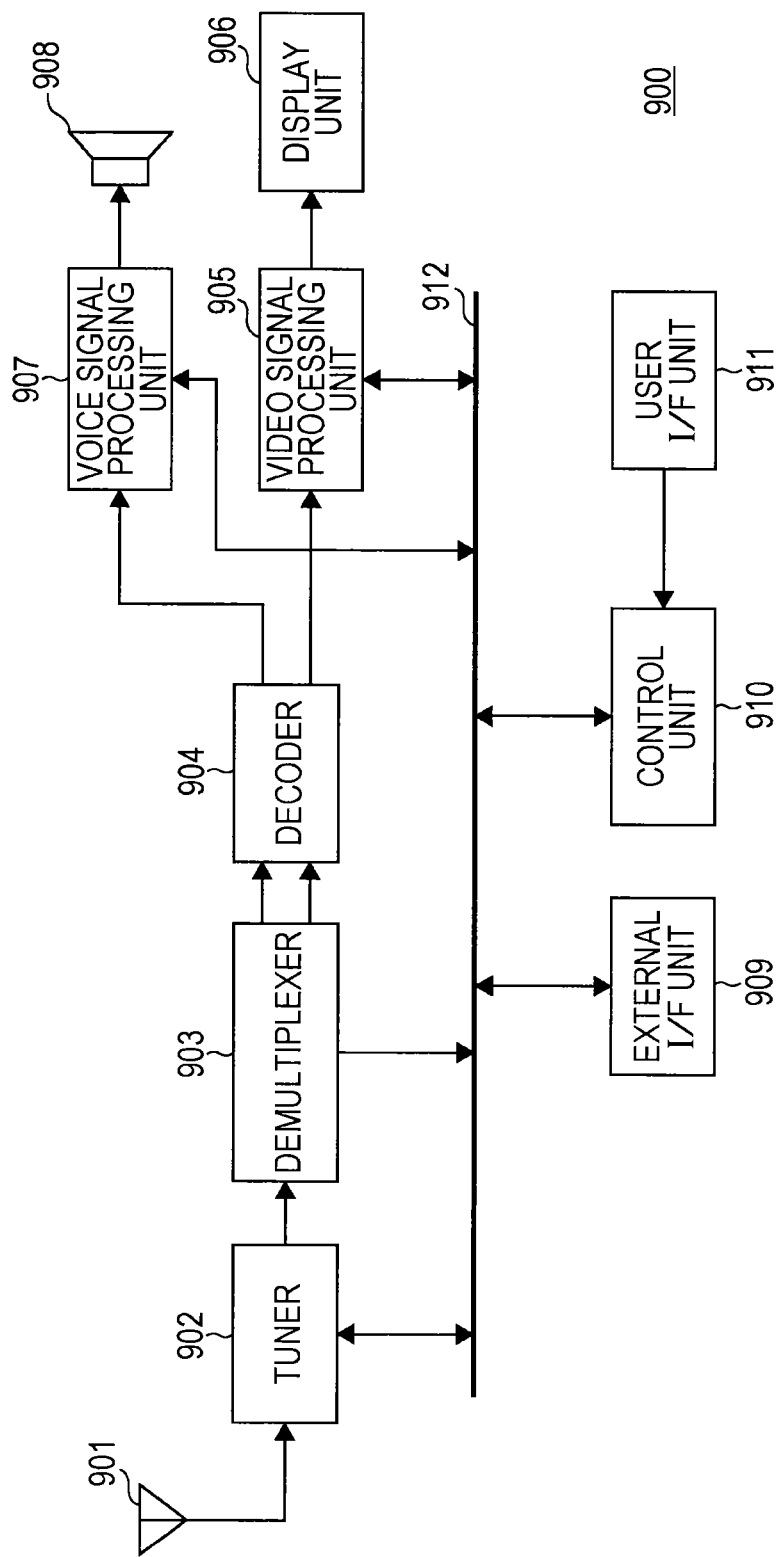
FIG. 40 is a diagram illustrating a schematic configuration example of a television apparatus to which the present technology is applied.

FIG. 40 exemplarily illustrates a schematic configuration of a television apparatus to which the present technology is applied. A television apparatus 900 includes an antenna 901, a tuner 902, a demultiplexer 903, a decoder 904, a video signal processing unit 905, a display unit 906, a voice signal processing unit 907, a speaker 908, and an external interface unit 909. The television apparatus 900 further includes a control unit 910, a user interface unit 911, and the like.

The tuner 902 selects a desired channel from broadcast wave signals received by the antenna 901, demodulates the channel, and outputs the obtained coded stream to the demultiplexer 903.

The demultiplexer 903 extracts a packet of a video and a voice of a program to be watched and listened from the coded bit stream, and outputs data of the extracted packet to the decoder 904. The demultiplexer 903 further supplies the packet of an electronic program guide (EPG), and the like, to the control unit 910. Note that, when the data is scrambled, the demultiplexer or the like decrypts the scrambled data.

The decoder 904 decodes the packet, outputs video data generated by the decoding process to the video signal processing unit 905, and outputs voice data to the voice signal processing unit 907.

The video signal processing unit 905 performs, on the video data, a noise reduction and a video process in accordance with user setting. The video signal processing unit 905 generates video data of the program to be displayed on the display unit 906, image data by a process based on an application supplied through a network, and the like. The video signal processing unit 905 further generates video data for displaying a menu screen, such as selection of items, and superimposes the video data on the video data of the program. The video signal processing unit 905 generates a driving signal based on the video data generated in this way and drives the display unit 906.

The display unit 906 drives a display device (for example, a liquid crystal display element) based on the driving signal from the video signal processing unit 905 to display a video of the program, for example.

The voice signal processing unit 907 applies a predetermined process such as a noise reduction to the voice data, performs a D/A conversion process and an amplification process of the processed voice data, and supplies the data to the speaker 908 to output the voice.

The external interface unit 909 is an interface for connecting to an external device and a network, and transmits/receives data such as video data or voice data.

The control unit 910 is connected to the user interface unit 911. The user interface unit 911 includes an operation switch and a remote control signal receiving part, and supplies an operation signal in accordance with the user operation to the control unit 910.

The control unit 910 includes a central processing unit (CPU), a memory, and the like. The memory stores, for example, a program to be executed by the CPU, various data required for the CPU to perform a process, EPG data, and data obtained through a network. The program stored in the memory is read and executed by the CPU at a predetermined timing, for example, when the television apparatus 900 is activated. The CPU executes the program to control each part so that the television apparatus 900 operates in accordance with the user operation.

Note that the television apparatus 900 includes a bus 912 for connecting the tuner 902, the demultiplexer 903, the video signal processing unit 905, the voice signal processing unit 907, and the external interface unit 909 to the control unit 910.

The television apparatus configured in this way is provided with the function of the image processing apparatus (image processing method) of the present invention in the decoder 904. Accordingly, the image quality of the decoded images of the images from multiple viewpoints can be improved.

[A Configuration Example of a Mobile Phone]

Figure 41:
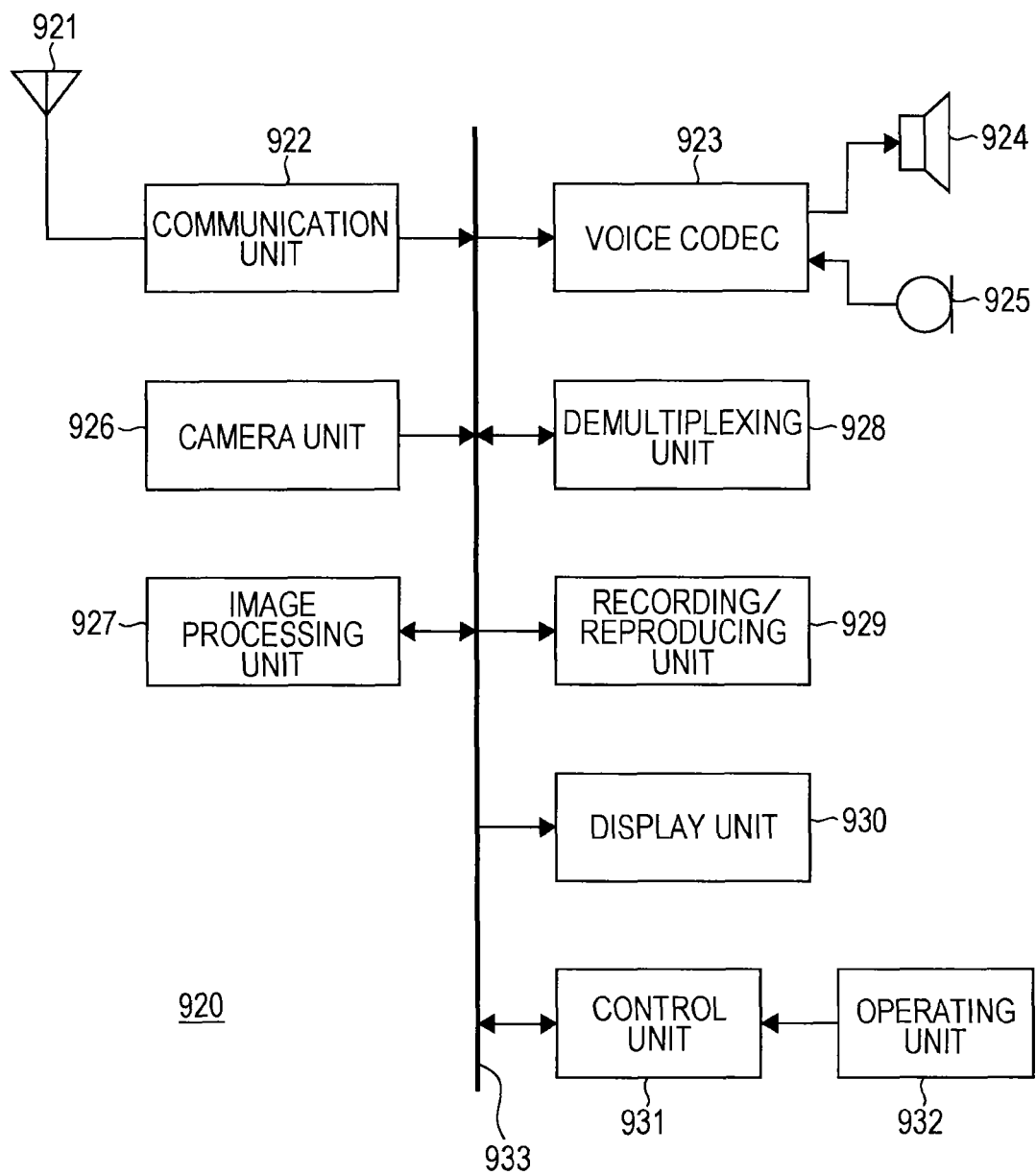
FIG. 41 is a diagram illustrating a schematic configuration example of a mobile phone to which the present technology is applied.

FIG. 41 exemplarily illustrates a schematic configuration of a mobile phone to which the present technology is applied. A mobile phone 920 includes a communication unit 922, a voice codec 923, a camera unit 926, an image processing unit 927, a demultiplexing unit 928, a recording/reproducing unit 929, a display unit 930, and a control unit 931. The units are connected to each other through a bus 933.

The communication unit 922 is connected with an antenna 921. The voice codec 923 is connected with a speaker 924 and a microphone 925. Further, the control unit 931 is connected with an operating unit 932.

The mobile phone 920 performs various operations, for example, transmission/reception of a voice signal, transmission/reception of an e-mail and image data, photographing of an image, and recording of data in various modes including a verbal communication mode, data communication mode, and the like.

In the verbal communication mode, the voice signal generated in the microphone 925 is converted into voice data and the data is compressed in the voice codec 923, and is supplied to the communication unit 922. The communication unit 922 modulates the voice data, converts the frequency, and the like to generate a transmission signal. The communication unit 922 supplies the transmission signal to the antenna 921 to transmit the signal to a base station (not illustrated). The communication unit 922 amplifies the received signal received by the antenna 921, converts the frequency, demodulates the signal, and the like, and supplies the obtained voice data to the voice codec 923. The voice codec 923 decompresses the voice data and converts the data into an analog voice signal, and outputs the signal to the speaker 924.

In the data communication mode, when an e-mail is transmitted, the control unit 931 receives character data input by the operation of the operating unit 932, and displays the input character on the display unit 930. The control unit 931 generates mail data, for example, based on a user instruction, and the like in the operating unit 932, and supplies the data to the communication unit 922. The communication unit 922 modulates the mail data, converts the frequency, and the like, and transmits the obtained transmission signal from the antenna 921. The communication, unit 922 further amplifies the received signal received by the antenna 921, converts the frequency, demodulates the signal, and the like to restore the e-mail data. The mail data is supplied to the display unit 930, and the content of the mail is displayed.

Note that the mobile phone 920 can also store the received mail data in a storage medium in the recording/reproducing unit 929. The storage medium is a given rewritable storage medium. For example, the storage medium is a semiconductor memory such as an RAM or a built-in flash memory, or a removable media such as a hard disc, a magnetic disc, an optical magneto disc, an optical disc, a USB memory, or a memory card.

In the data communication mode, when image data is transmitted, the image data generated by the camera unit 926 is supplied to the image processing unit 927. The image processing unit 927 codes the image data to generate coded data.

The demultiplexing unit 928 multiplexes, in a predetermined scheme, the coded data generated in the image processing unit 927 and the voice data supplied from the voice codec 923, and supplies the multiplexed data to the communication unit 922. The communication unit 922 modulates the multiplexed data, converts the frequency, and the like, and transmits the obtained transmission signal from the antenna 921. Further, the communication unit 922 amplifies the received signal received by the antenna 921, converts the frequency and demodulates the signal, and the like to restore the multiplexed data. The multiplexed data is supplied to the demultiplexing unit 928. The demultiplexing unit 928 separates the multiplexed data, and supplies the coded data to the image processing unit 927 and supplies the voice data to the voice codec 923. The image processing unit 927 decodes the coded data to generate image data. The image data is supplied to the display unit 930, and the received image is displayed. The voice codec 923 converts the voice data into an analog voice signal and supplies the signal to the speaker 924, and the received voice is output.

The mobile phone device configured in this way is provided with the functions of the image processing apparatus (image processing method) of the present invention in the image processing unit 927. Accordingly, the image quality of decoded images of images from multiple viewpoints can be improved.

[A Configuration Example of a Record and Reproduction Apparatus]

Figure 42:
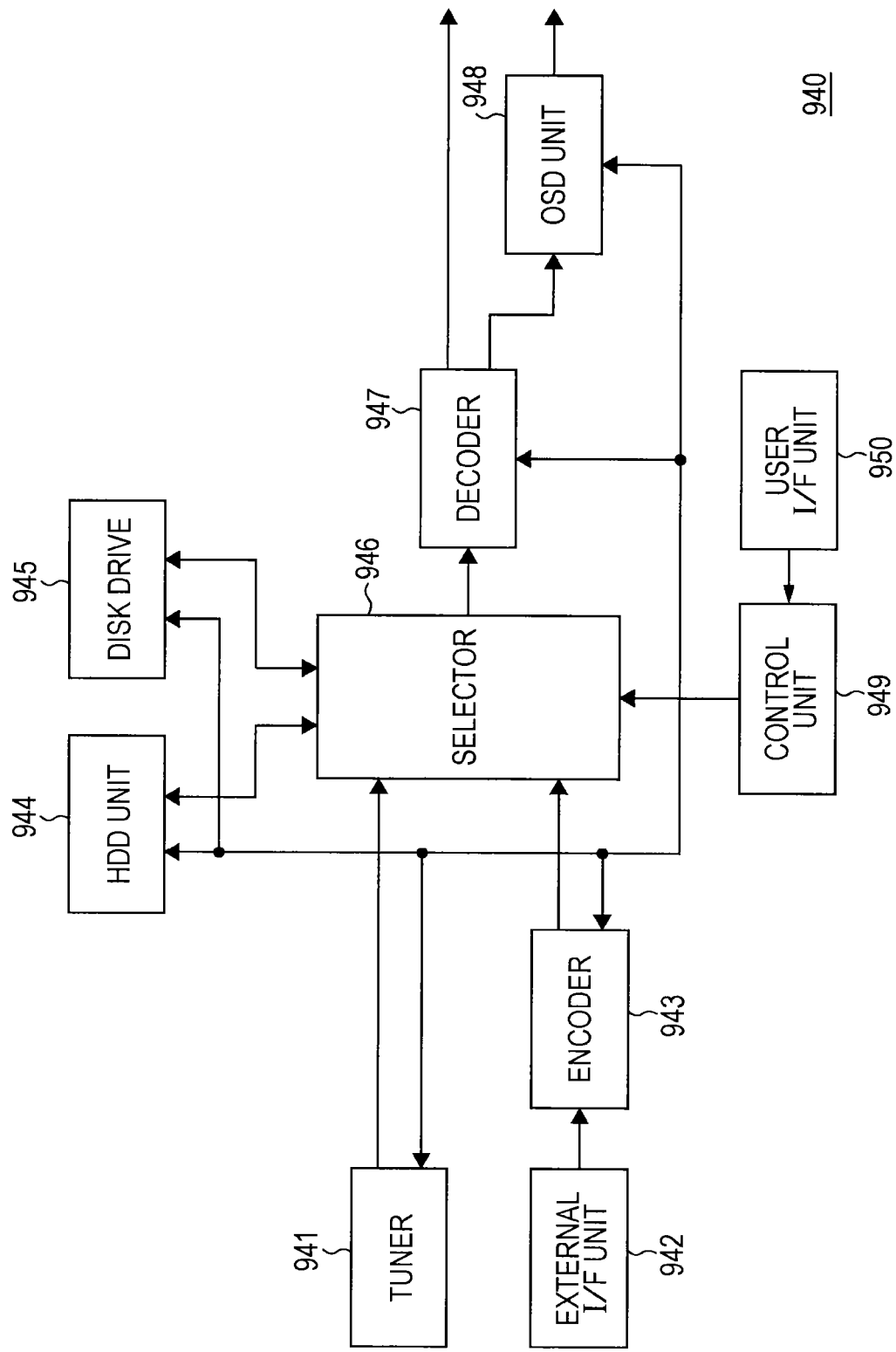
FIG. 42 is a diagram illustrating a schematic configuration example of a record and reproduction apparatus to which the present technology is applied.

FIG. 42 exemplarily illustrates a schematic configuration of a record and reproduction apparatus to which the present technology is applied. A record and reproduction apparatus 940, for example, records audio data and video data of a received broadcast program in a recording medium, and supplies the recorded data to the user at a timing according to a user's instruction. The record and reproduction apparatus 940 can also, for example, obtain the audio data and the video data from another apparatus, and record the data in a recording medium. Further, the record and reproduction apparatus 940 decodes and outputs the audio data and the video data recorded in a recording medium so that a monitor device or the like can display an image and output a voice.

The record and reproduction apparatus 940 includes a tuner 941, an external interface unit 942, an encoder 943, a hard disk drive (HDD) unit 944, a disc drive 945, a selector 946, a decoder 947, an on-screen display (OSD) unit 948, a control unit 949, and a user interface unit 950.

The tuner 941 selects a desired channel from broadcast signals received by an antenna (not illustrated). The tuner 941 demodulates the received signals of the desired channel and outputs the obtained coded bit stream to the selector 946.

The external interface unit 942 is configured from at least one of the IEEE1394 interface, a network interface unit, a USB interface, a flash memory interface, and the like. The external interface unit 942 is an interface for connecting with an external device, a network, a memory card, or the like, and receives data to be recorded such as video data and voice data.

When the video data and the voice data supplied from the external interface unit 942 have not been coded, the encoder 943 codes the data in a predetermined scheme, and outputs the coded bit stream to the selector 946.

The HDD unit 944 records contents data of a video, a voice, and the like, various programs, another data, and the like in a built-in hard disc, and reads out the data from the hard disc at the time of reproduction, and the like.

The disc drive 945 records and reproduces signals for an attached optical disc. The optical disc is, for example, a DVD disc (a DVD-Video, a DVD-RAM, a DVD-R, a DVD-RW, a DVD+R, a DVD+RW, or the like) and a Blu-ray disc.

When a video or a voice is recorded, the selector 946 selects a coded bit stream from either the tuner 941 or the encoder 943, and supplies the coded bit stream to either the HDD unit 944 or the disc drive 945. When a video or a voice is reproduced, the selector 946 supplies the coded bit stream output from the HDD unit 944 or the disc drive 945 to the decoder 947.

The decoder 947 decodes the coded bit stream. The decoder 947 supplies the video data generated by the decoding process to the OSD unit 948. The decoder 947 also outputs the voice data generated by the decoding process.

The OSD unit 948 generates video data for displaying a menu screen such as selection of items, and superimposes the video data on the video data output from the decoder 947, and outputs the superimposed data.

The control unit 949 is connected with the user interface unit 950. The user interface unit 950 is configured from an operation switch, a remote control signal reception unit, and supplies an operation signal in accordance with the user operation to the control unit 949.

The control unit 949 is configured from a CPU, a memory, and the like. The memory stores a program to be executed by the CPU, and various data required for the CPU to perform a process. The program stored in the memory is read out and executed by the CPU at a predetermined timing, for example, when the record and reproduction apparatus 940 is activated. The CPU executes the program to control each part so that the record and reproduction apparatus 940 operates in accordance with a user operation.

The record and reproduction apparatus configured in this way is provided with the function of the image processing apparatus (image processing method) of the present invention in the decoder 947. Accordingly, the image quality of the decoded images of the images from multiple viewpoints can be improved.

[A Configuration Example of an Imaging Apparatus]

Figure 43:
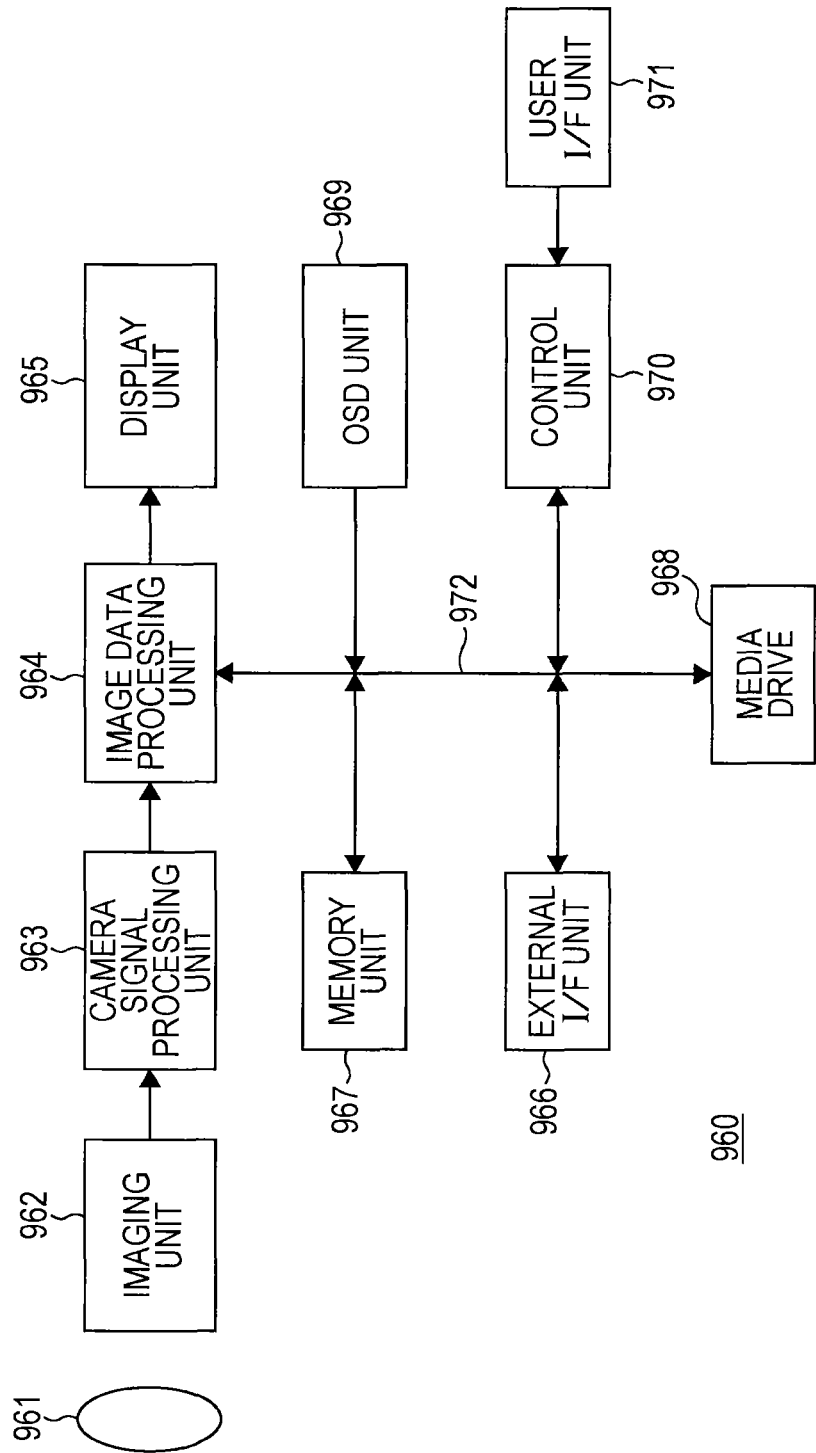
FIG. 43 is a diagram illustrating a schematic configuration example of an imaging apparatus to which the present technology is applied.

FIG. 43 exemplarily illustrates a schematic configuration of an imaging apparatus to which the present technology is applied. An imaging apparatus 960 takes an image of an object, displays an image of the object on a display unit, and records the image as image data in a recording medium.

The imaging apparatus 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. The control unit 970 is connected with a user interface unit 971. Further, the image data processing unit 964, the external interface unit 966, the memory unit 967, the media drive 968, the OSD unit 969, the control unit 970, and the like are connected to each other through a bus 972.

The optical block 961 is configured from a focus lens, an aperture mechanism, and the like. The optical block 961 forms an optical image of an object on an imaging surface of the imaging unit 962. The imaging unit 962 is configured from a CCD or a CMOS image sensor, and generates an electric signal according to the optical image by photoelectric conversion, and supplies the signal to the camera signal processing unit 963.

The camera signal processing unit 963 performs various camera signal processes, such as a knee correction, a gamma correction, and a color correction, on the electric signal supplied from the imaging unit 962. The camera signal processing unit 963 supplies image data after the camera signal process to the image data processing unit 964.

The image data processing unit 964 codes the image data supplied from the camera signal processing unit 963. The image data processing unit 964 supplies the coded data generated by the coding process to the external interface unit 966 and the media drive 968. Further, the image data processing unit 964 decodes the coded data supplied from the external interface unit 966 and the media drive 968. The image data processing unit 964 supplies image data generated by the decoding process to the display unit 965. The image data processing unit 964 further supplies, to the display unit 965, the image data supplied from the camera signal processing unit 963, and superimposes the data to be displayed obtained from the OSD unit 969 on the image data, and supplies the superimposed data to the display unit 965.

The OSD unit 969 generates data to be displayed, such as a menu screen including a symbol, a character, or graphic, and an icon, and outputs the data to the image data processing unit 964.

The external interface unit 966 is configured from a USB input/output terminal and the like, and is connected to a printer when an image is printed. The external interface unit 966 is connected with a drive, as necessary. Removable media such as a magnetic disc and an optical disc are properly attached thereto, and a computer program read out therefrom is installed on the external interface unit 966, as necessary. The external interface unit 966 further includes a network interface connected to a predetermined network such as a LAN or the Internet. For example, according to an instruction from the user interface unit 971, the control unit 970 reads out coded data from the memory unit 967 and supplies the coded data from the external interface unit 966 to another apparatus connected through a network. The control unit 970 can obtain, through the external interface unit 966, coded data or image data supplied from another apparatus through a network, and supply the data to the image data processing unit 964.

For example, given readable, writable, and removable media including a magnetic disc, an optical magneto disc, an optical disc, or a semiconductor memory are used as recording media driven in the media drive 968. The recording media can also include any types of removable media, and can be a tape device, a disc, and a memory card. Of course, the recording media can be a non-contact IC card.

The media drive 968 and recording media may be integrated and configured from a non-portable recording medium, such as a built-in hard disc drive and a solid state drive (SSD).

The control unit 970 includes a CPU, a memory, and the like. The memory stores a program to be executed by the CPU, and various data and the like required for the CPU to perform a process. The program stored in the memory is read and executed by the CPU at a predetermined timing, for example, when the imaging apparatus 960 is activated. The CPU executes the program to control each part so that the imaging apparatus 960 operates in accordance with the user operation.

The imaging apparatus configured in this way is provided with the function of the image processing apparatus (image processing method) of the present invention in the image data processing unit 964. Accordingly, the image quality of the decoded images of the images from multiple viewpoints can be improved.

REFERENCE SIGNS LIST 11, 12, 21, and 22 Encoder
31 DPB
32 Multiplexing unit
41 and 42 Camera
43 Multi-view image information generation unit
111 A/D conversion unit
112 Picture rearrangement buffer
113 Calculation unit
114 Orthogonal transform unit
115 Quantization unit
116 Variable length coding unit
117 Accumulation buffer
118 Inverse quantization unit
119 Inverse orthogonal transform unit
120 Calculation unit
121 Deblocking filter
122 Intra prediction unit
123 Inter prediction unit
124 Predicted image selection unit
211 A/D conversion unit
212 picture rearrangement buffer
213 Calculation unit
214 Orthogonal transform unit
215 Quantization unit
216 Variable length coding unit
217 Accumulation buffer
218 Inverse quantization unit
219 Inverse orthogonal transform unit
220 Calculation unit
221 Deblocking filter
222 Intra prediction unit
224 Predicted image selection unit
231 Warping unit
232 Warped picture buffer
233 Reference index allocation unit
234 Disparity prediction unit
241 Disparity detection unit
242 and 243 Disparity compensation unit
244 Cost function calculation unit
245 Mode selection unit
246 Predicted vector generation unit
301 Separation unit
311, 312, 321, and 322 Decoder
331 DPB
341 Accumulation buffer
342 Variable length decoding unit
343 Inverse quantization unit
344 Inverse orthogonal transform unit
345 Calculation unit
346 Deblocking filter
347 Picture rearrangement unit
348 D/A conversion unit
349 Intra prediction unit
350 Inter prediction unit
351 Predicted image selection unit
441 Accumulation buffer
442 Variable length decoding unit
443 Inverse quantization unit
444 Inverse orthogonal transform unit
445 Calculation unit
446 Deblocking filter
447 Picture rearrangement unit
448 D/A conversion unit
449 Intra prediction unit
451 Predicted image selection unit
461 Warping unit
462 Warped picture buffer
463 Disparity prediction unit
471 Reference picture selection unit
472 Disparity compensation unit
473 Predicted vector generation unit
511 A/D conversion unit
512 Picture rearrangement buffer
513 Calculation unit
514 Orthogonal transform unit
515 Quantization unit
516 Variable length coding unit
517 Accumulation buffer
518 Inverse quantization unit
519 Inverse orthogonal transform unit
520 Calculation unit
521 Deblocking filter
522 Intra prediction unit
524 Predicted image selection unit
531 Warping unit
532 Warped picture buffer
533 Reference index allocation unit
534 Disparity prediction unit
541 Disparity detection unit
542 and 543 Disparity compensation unit
544 Cost function calculation unit
545 Mode selection unit
546 Predicted vector generation unit 641 Accumulation buffer
642 Variable length decoding unit
643 Inverse quantization unit
644 Inverse orthogonal transform unit
645 Calculation unit
646 Deblocking filter
647 Picture rearrangement unit
648 D/A conversion unit
649 Intra prediction unit
651 Predicted image selection unit
661 Warping unit
662 Warped picture buffer
663 Disparity prediction unit
671 Reference picture selection unit
672 Disparity compensation unit
673 Predicted vector generation unit
701 Reference index allocation unit
702 Inter prediction unit
721 Characteristic amount generation unit
722 Allocation unit
801 Inter prediction unit
801 Bus
802 CPU
803 ROM
804 RAM
805 Hard disk
806 Output unit
807 Input unit
808 Communication unit
809 Drive
810 Input/output interface
811 Removable recording medium

The invention claimed is:

1. An image processing apparatus comprising:
circuitry configured to
warp, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint;
acquire a reference index indicating a reference picture to be referred to generate a predicted image of an object block to be decoded of a picture of the image of the second viewpoint; and
select the reference picture from reference picture candidates including at least the picture of the warped image based on the reference index.

2. The image processing apparatus according to claim 1, wherein
the reference picture candidates include the picture of the warped image and the picture of the image of the first viewpoint.

3. The image processing apparatus according to claim 2, wherein
a reference index having a first value is allocated to the picture of the warped image included in the reference picture candidates,
a reference index having a second value is allocated to the picture of the first viewpoint included in the reference picture candidates, and
a code amount of the reference index having the first value is smaller than a code amount of the reference index having the second value.

4. The image processing apparatus according to claim 1, wherein
the reference picture candidates include the picture of the warped image, and another-time picture of the picture of the image of the second viewpoint, the time being different from a picture of the object block.

5. The image processing apparatus according to claim 1, wherein the circuitry is further configured to:
acquire, based on a gap vector indicating a gap between a corresponding block of the reference picture corresponding to the object block, the corresponding block from the reference picture as the predicted image of the object block.

6. The image processing apparatus according to claim 1, wherein
the image of the first viewpoint is a depth image having depth information related to a disparity of each pixel of a color image having a pixel value corresponding to light from an object viewed from the first viewpoint as a pixel value, and
the image of the second viewpoint is a depth image having depth information related to a disparity of each pixel of a color image having a pixel value corresponding to light from an object viewed from the second viewpoint as a pixel value.

7. The image processing apparatus according to claim 1, wherein
the image of the first viewpoint is a color image having a pixel value corresponding to light from an object viewed from the first viewpoint, and
the image of the second viewpoint is a color image having a pixel value corresponding to light from an object viewed from the second viewpoint.

8. An image processing method, comprising the steps of:
warping, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint; and
acquiring a reference index indicating a reference picture to be referred to generate a predicted image of an object block to be decoded of a picture of the image of the second viewpoint, and selecting the reference picture from reference picture candidates including at least the picture of the warped image based on the reference index, wherein
the method is performed by a computer or processor.

9. A non-transitory computer readable medium including a program for causing a computer to:
warp, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint;
acquire a reference index indicating a reference picture to be referred to generate a predicted image of an object block to be decoded of a picture of the image of the second viewpoint; and
select the reference picture from reference picture candidates including at least the picture of the warped image based on the reference index.

10. An image processing apparatus comprising:
circuitry configured to
warp, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint;

calculate, for each of reference picture candidates referred to generate a predicted image of an object block to be coded of a picture of the image of the second viewpoint and including at least the picture of the warped image, a coding cost required for coding the object block; and select and output a reference index allocated to a reference picture candidate to be used for coding the object block from among reference indexes respectively allocated to the reference picture candidates based on the coding cost.

11. The image processing apparatus according to claim 10, wherein
the reference picture candidates include the picture of the warped image and the picture of the image of the first viewpoint.

12. The image processing apparatus according to claim 11, wherein the circuitry is further configured to:
allocate a reference index having a first value to the picture of the warped image included in the reference picture candidates, and to allocate a reference index having a second value to the picture of the first viewpoint included in the reference picture candidates, wherein
a code amount of the reference index having the first value is smaller than a code amount of the reference index having the second value.

13. The image processing apparatus according to claim 10, wherein
the reference picture candidates include the picture of the warped image, and another-time picture of the picture of the image of the second viewpoint, the time being different from a picture of the object block.

14. The image processing apparatus according to claim 10, wherein the circuitry is further configured to:
acquire, for each of the reference picture candidates, based on a gap vector indicating a gap between a corresponding block of the reference picture candidate corresponding to the object block, the corresponding block from the reference picture candidates as the predicted image of the object block, wherein when the reference picture candidate is the picture of the warped image, the circuitry acquires the predicted image, recognizing that the gap vector is a 0 vector;
calculate the coding cost by adding a value of the object block corresponding to a residual with respect to the predicted image and a value corresponding to a code amount of the friction vector; and
calculate the coding cost of the picture of the warped image, recognizing that the value corresponding to a code amount of the friction vector is 0.

15. The image processing apparatus according to claim 10, wherein
the image of the first viewpoint is a depth image having depth information related to a disparity of each pixel of a color image having a pixel value corresponding to light from an object viewed from the first viewpoint as a pixel value, and
the image of the second viewpoint is a depth image having depth information related to a disparity of each pixel of a color image having a pixel value corresponding to light from an object viewed from the second viewpoint as a pixel value.

16. The image processing apparatus according to claim 10, wherein
the image of the first viewpoint is a color image having a pixel value corresponding to light from an object viewed from the first viewpoint, and
the image of the second viewpoint is a color image having a pixel value corresponding to light from an object viewed from the second viewpoint.

17. An image processing method comprising the steps of:
warping, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint;
calculating, for each of reference picture candidates referred to generate a predicted image of an object block to be coded of a picture of the image of the second viewpoint and including at least the picture of the warped image, a coding cost required for coding the object block; and
selecting and outputting a reference index allocated to a reference picture candidate to be used for coding the object block from among reference indexes respectively allocated to the reference picture candidates based on the coding cost, wherein
the method is performed by a computer or processor.

18. A non-transitory computer readable medium including a program for causing a computer to:
warping unit configured to warp, between an image of a first viewpoint and an image of a second viewpoint different from the first viewpoint, a picture of the image of the first viewpoint to generate a picture of an warped image obtained by converting the picture of the image of the first viewpoint into an image obtainable in the second viewpoint;
calculate, for each of reference picture candidates referred to generate a predicted image of an object block to be coded of a picture of the image of the second viewpoint and including at least the picture of the warped image, a coding cost required for coding the object block; and
select and output a reference index allocated to a reference picture candidate to be used for coding the object block from among reference indexes respectively allocated to the reference picture candidates based on the coding cost.

* * * * *